(12) United States Patent
Cai et al.

(10) Patent No.: US 8,913,535 B2
(45) Date of Patent: Dec. 16, 2014

(54) SYSTEMS AND METHODS FOR UPLINK FEEDBACK FOR HIGH-SPEED DOWNLINK PACKET ACCESS (HSPDA)

(75) Inventors: Lujing Cai, Morganville, NJ (US); Fengjun Xi, Huntington Station, NY (US); Diana Pani, Montreal (CA); Benoit Pelletier, Roxboro (CA); Christopher Cave, Dollard-des-Ormeaux (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 82 days.

(21) Appl. No.: 13/250,062

(22) Filed: Sep. 30, 2011

(65) Prior Publication Data

US 2012/0257568 A1 Oct. 11, 2012

Related U.S. Application Data

(60) Provisional application No. 61/388,979, filed on Oct. 1, 2010, provisional application No. 61/431,247, filed on Jan. 10, 2011, provisional application No. 61/475,047, filed on Apr. 13, 2011.

(51) Int. Cl.
*H04W 4/00* (2009.01)
*H04L 1/16* (2006.01)
*H04L 1/18* (2006.01)

(52) U.S. Cl.
CPC ............ *H04L 1/1614* (2013.01); *H04L 1/1854* (2013.01)
USPC ............................. 370/311; 370/252; 370/328

(58) Field of Classification Search
USPC ................... 370/236, 252, 311, 328, 336, 338
See application file for complete search history.

(56) References Cited

U.S. PATENT DOCUMENTS

| 8,514,820 B2 | 8/2013 | Cai et al. |
| 2006/0133323 A1 | 6/2006 | Obuchi et al. |
| 2008/0159427 A1* | 7/2008 | Kang et al. .................... 375/260 |
| 2008/0161003 A1 | 7/2008 | Brueck et al. |

(Continued)

FOREIGN PATENT DOCUMENTS

| JP | 2011-142516 | 7/2011 |
| WO | WO 2009/020876 A1 | 2/2009 |
| WO | WO 2009/120797 A1 | 10/2009 |
| WO | WO 2011/140504 | 11/2011 |

OTHER PUBLICATIONS

3rd Generation Partnership Project (3GPP), R1-091599, "HS-DPCCH design for DC-HSDPA and MIMO", Qualcomm Europe, 3GPP TSG-RAN WG1 #56bis, Seoul, South Korea, Mar. 23-27, 2009, 21 pages.

(Continued)

*Primary Examiner* — Brian D Nguyen
(74) *Attorney, Agent, or Firm* — Condo Roccia Koptiw LLP

(57) ABSTRACT

Systems and method for uplink feedback for multipoint transmission of high-speed downlink packet access (MP-HSDPA) that may improve downlink transmission efficiency and cell coverage. For example, Channel Quality Indicator (CQI) and/or Precoding Control Indicator (PCI) that may be calculated to accommodate the needs of coordinated dynamic network scheduling. Additionally, various frame structures may be generated for the uplink feedback that may carry multiple CQI and HARQ-ACK feedbacks from MP-HSDPA. The frame structures may also address asynchronous downlink transmissions between two cells. Moreover, HS-DPCCH power offset settings for both CQI and HARQ-ACK fields that may be modified and/or created to ensure reliable uplink feedback transmission.

7 Claims, 30 Drawing Sheets

(56) References Cited

U.S. PATENT DOCUMENTS

| | | | |
|---|---|---|---|
| 2009/0196192 A1* | 8/2009 | Lim et al. | 370/252 |
| 2010/0061284 A1* | 3/2010 | Chen et al. | 370/311 |
| 2010/0323746 A1* | 12/2010 | Zhang et al. | 455/522 |
| 2010/0331035 A1* | 12/2010 | Bark et al. | 455/522 |
| 2011/0014875 A1* | 1/2011 | Chao et al. | 455/63.1 |
| 2011/0098076 A1* | 4/2011 | Kim et al. | 455/522 |
| 2011/0199990 A1* | 8/2011 | Chang et al. | 370/329 |

OTHER PUBLICATIONS

3rd Generation Partnership Project (3GPP), R1-104157, "On deploying DC-HSDPA UEs in Single Frequency Networks", Qualcomm Incorporated, 3GPP TSG RAN WG1 Meeting #61-bis, R1-104157, Dresden, Germany, Jun. 29-Jul. 2, 2010, 13 pages.

3rd Generation Partnership Project (3GPP), R1-104913,"Multi-cell transmission techniques for HSDPA", NSN, Nokia, 3GPP TSG-RAN WG1 Meeting #62, R1-104913, Madrid, Espana, Aug. 23-27, 2010, 10 pages.

3rd Generation Partnership Project (3GPP), R1-104383,"Discussion on SFDC-HSDPA", Alcatel-Lucent, Alcatel-Lucent Shanghai Bell, 3GPP TSG-RAN WG1 Meeting #62, R1-104383, Madrid, Spain, Aug. 23-27, 2010, 3 pages.

3rd Generation Partnership Project (3GPP), TS 25.211 V10.0.0, "3rd Generation Partnership Project; Technical Specification Group Radio Access Network; Physical channels and mapping of transport channels onto physical channels (FDD) (Release 10)", Sep. 2010, 58 pages.

3rd Generation Partnership Project (3GPP), TS 25.212 V10.0.0, "3rd Generation Partnership Project; Technical Specification Group Radio Access Network; Multiplexing and channel coding (FDD) (Release 10)", Sep. 2010, 114 pages.

3rd Generation Partnership Project (3GPP), TS 25.213 V10.0.0, "3rd Generation Partnership Project; Technical Specification Group Radio Access Network; Spreading and modulation (FDD) (Release 10)", Sep. 2010, 39 pages.

3rd Generation Partnership Project (3GPP), TS 25.214 V10.0.0, "3rd Generation Partnership Project; Technical Specification Group Radio Access Network; Physical layer procedures (FDD) (Release 10)", Sep. 2010, 99 pages.

3rd Generation Partnership Project (3GPP), RP-101439, "Proposed Study Item on HSDPA Multipoint Transmission", Nokia Siemens Networks, 3GPP TSG RAN Meeting #50, Istanbul, Turkey, Dec. 7-10, 2010, 5 pages.

3rd Generation Partnership Project (3GPP), TS 25.402 V10.0.0, "Technical Specification Group Radio Access Network, Synchronisation in UTRAN Stage 2 (Release 10)", Mar. 2011, 1-51.

3rd Generation Partnership Project (3GPP), RP-111375, "HSDPA Multiflow Data Transmission", Qualcomm Inc, Orange, Nokia Siemens Networks, Ericsson, ST-Ericsson, T-Mobile USA, Alcatel-Lucent, Huawei, 3GPP TSG RAN Meeting #53, Sep. 13-16, 2011, 7 pages.

3rd Generation Partnership Project (3GPP), RP-111207, "HSDPA Multipoint Transmission", 3GPP TR 25.872 V2.0.0, TSG RAN Meeting #53, Sep. 2011, 29 pages.

3rd Generation Partnership Project, (3GPP), R1-112983, "Considerations on Uplink for Introducing Multiflow Data Transmission" Mobile Competence Centre, 650, Route DES Lucioles, F-06921 Sophia-Antipolis Cedex, France, vol. Ran WGI, no. Zhuhai, Oct. 4, 2011, 5 pages.

* cited by examiner

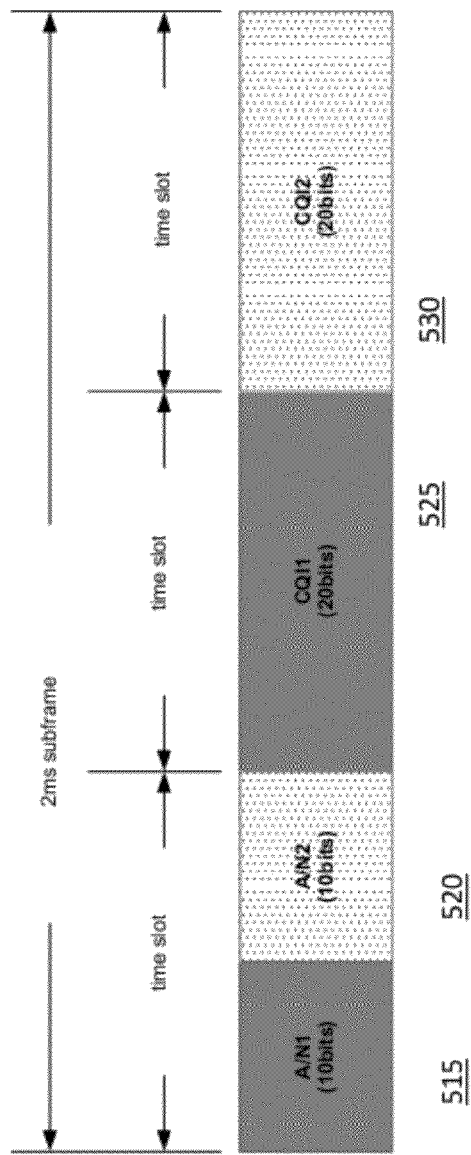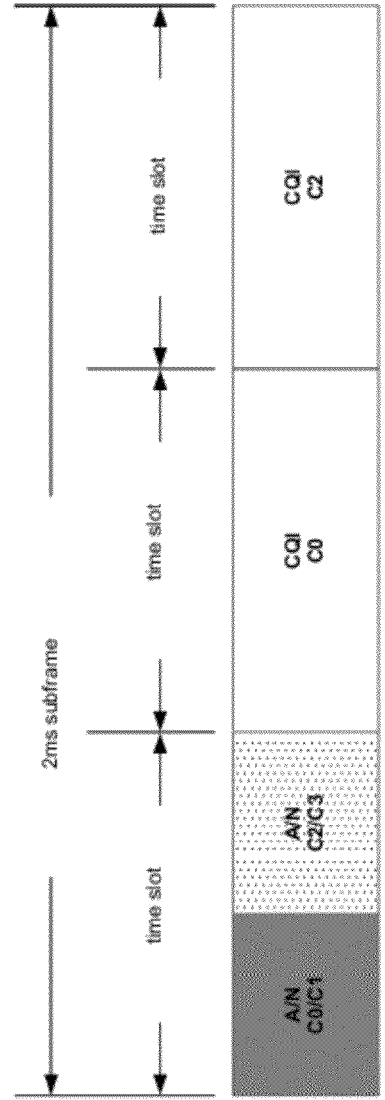
FIG. 23
FIG. 24

SYSTEMS AND METHODS FOR UPLINK FEEDBACK FOR HIGH-SPEED DOWNLINK PACKET ACCESS (HSPDA)

CROSS REFERENCE TO RELATED APPLICATIONS

This application claims benefit of U.S. Provisional Application Ser. No. 61/388,979 that was filed on Oct. 1, 2010; U.S. Provisional Application Ser. No. 61/475,047 that was filed on Apr. 13, 2011; and U.S. Provisional Application Ser. No. 61/431,247 that was filed on Jan. 10, 2011, the contents of which are hereby incorporated by reference herein.

BACKGROUND

Multiple Point High-Speed Downlink Packet Access (MP-HSDPA) transmissions have recently drawn attention for its potential to improve user experience at the cell edge of a wireless network. MP-HSDPA may be implemented in a number of ways depending on how the downlink transmission from the cell is collaborated. For example, MP-HSDPA may be implemented as HS-DDX, Multiflow Aggregation (MF), HS-SFN, or Dynamic Sector Switch (DSS).

MP-HSDPA technologies rely on coordinated network scheduling that may allow data packets to be aggregated or switched between different cells. To support multipoint transmission and maximize its benefit it may be desirable to provide improved techniques for uplink feedback to be received by multiple serving base stations.

SUMMARY

MP-HSDPA relies on coordinated network scheduling that may allow data packets to be aggregated or switched between different cells, for example, on a TTI to TTI basis. To achieve optimum spectrum efficiency and peak data rate, particularly at cell edge, it may be important to inform the network of the channel conditions over each propagation path from the cells to the UE and/or the reception status of downlink data.

Channel Quality Indicators (CQI) may be an effective way of reporting channel conditions to a network. For example, CQI may be used in HSDPA to indicate the best code rate for a particular measurement interval based on Signal to Interference and Noise Ratio (SINR) estimated at UE. When applied to MP-HSDPA, however, the conventional way of calculating CQI may become problematic because inference avoidance or signal enhancement techniques may be dynamically applied. The signal quality and inference sources pertaining to a specific UE may vary according to the network scheduling. As result, the conventionally calculated CQI may either underestimate or overestimate the real channel conditions.

If MIMO or beamforming (BF) technologies are deployed simultaneously with MP-HSDPA, cross-cell coordination among the weights applied on the multiple antennas cross multiple cells may become important to maximize the system gain from MP-HSDPA for MIMO or BF configured users. Control of the multiple antennas may be achieved, for example, by reporting Preferred Precoding Indication (PCI) to the network.

The CQI/PCI report may be carried by an uplink feedback control channel, such as HS-DPCCH, for assisting downlink data transmissions. This control channel may also carry a HARQ-ACK field that may indicate the correct reception of the downlink data packets. Because the uplink feedback control channel may operate in the same frequency as the downlink data transmission, only one HS-DPCCH may be available. In one example embodiment, a HS-DPCCH is disclosed that may carry multiple CQI reports and HARQ-ACK messages to support the optimal operation of MP-HSDPA.

In accordance with embodiments of the present disclosure, systems and methods to provide uplink feedback, such as High Speed Dedicated Physical Control Channel (HS-DPCCH) feedback, are disclosed that may improve downlink transmission efficiency and UE cell coverage for Multiple Point HSDPA transmissions (MP-HSDPA). Systems and methods for calculating Channel Quality Indicator (CQI) and/or Precoding Control Indicator (PCI) that may be used to accommodate the needs of coordinated dynamic network scheduling and to optimize the benefits of the multiple point transmissions are also disclosed. Moreover, various frame structures for the uplink feedback that may carry multiple CQI and HARQ-ACK feedbacks from MP-HSDPA and may address asynchronous downlink transmissions issues between two cells are disclosed. In addition, cell-dependent HS-DPCCH power offset settings for both CQI and HARQ-ACK fields that may ensure reliable uplink feedback transmission for the cells involved in SFMC operations are disclosed.

Systems and methods for uplink feedback for high-speed downlink packet access (HSDPA) transmission are disclosed. According to an aspect, a method may be implemented at user equipment. The method may include estimating a common pilot channel (CPICH) strength value in the same time transmission interval (TTI) interval. Further, the method may include communicating the CPICH strength value to a network.

Systems and methods for uplink feedback for high-speed downlink packet access (HSDPA) are disclosed. According to an aspect, a method may comprise receiving multiple CQI values at a network component. The network component may then identify the multiple CQI values.

Systems and methods for providing uplink feedback in multiple point high-speed downlink packet access (MP-HSDPA) are disclosed. According to an embodiment, a first time of arrival for a first sub-frame received from a first downlink may be determined. A second time of arrival for a second sub-frame received from a second downlink may be determined. A first feedback message may be generated using the first sub-frame. A second feedback message may be generated using the second sub-frame. An allowance parameter may be determined. The allowance parameter may indicate a time slot for transmitting uplink feedback. A pairing rule using the first time of arrival, the second time of arrival, and the allowance parameter may be determined. The pairing rule may enable the first feedback message and the second feedback message to be combined into a composite feedback message. A time offset may be determined. The time offset may indicate the number of time slots between the first time of arrival and a transmission of the composite feedback message. The composite feedback message may be transmitted using the time offset.

Systems and methods for providing reception of uplink feedback in multiple point transmission of high-speed downlink packet access (MP-HSDPA) are disclosed. According to an embodiment, a sub-frame may be transmitted in a downlink. An uplink feedback may be received. A time of arrival for the uplink feedback may be determined. A pairing rule may be determined using the time of arrival and the sub-frame. The pairing rule may determine when to associate the uplink feedback with the sub-frame.

Systems and methods for improving the reliability of uplink feedback in high-speed downlink packet access (HS- DPA) transmission by adjusting the power offset for the uplink feedback are disclosed. According to an embodiment, a transmit power control commands (TPC) from a downlink. The received TPC commands may be processed on an N-slot cycle. TPC_cmd_average may be calculated based on the received TPC command. A transmit power boost may be determined when the TPC_cmd_average is greater than a threshold. The power offset for the uplink feedback may be adjusted using the transmit power boost.

Systems and methods for reporting a channel quality indicator (CQI) in multipoint high-speed downlink packet access (MP-HSDPA) using CQI reporting patterns are disclosed to report multiple CQI messages. To reduce overhead, multiple feedback cycles may be used by which the CQI reports may be divided into groups with each being configured with different CQI feedback cycles. The CQI reports may then be transmitted according to the reporting pattern to indicate the CQI type.

BRIEF DESCRIPTION OF THE DRAWINGS

A more detailed understanding may be had from the following description, given by way of example in conjunction with the accompanying drawings wherein:

FIG. 23 depicts an example embodiment for arranging ACK/NACK and CQI into two messages in a sub-frame;

FIG. 24 depicts an example embodiment of HARQ-ACK mapping for DF-4C;

DETAILED DESCRIPTION OF ILLUSTRATIVE EMBODIMENTS

Figure 1A:
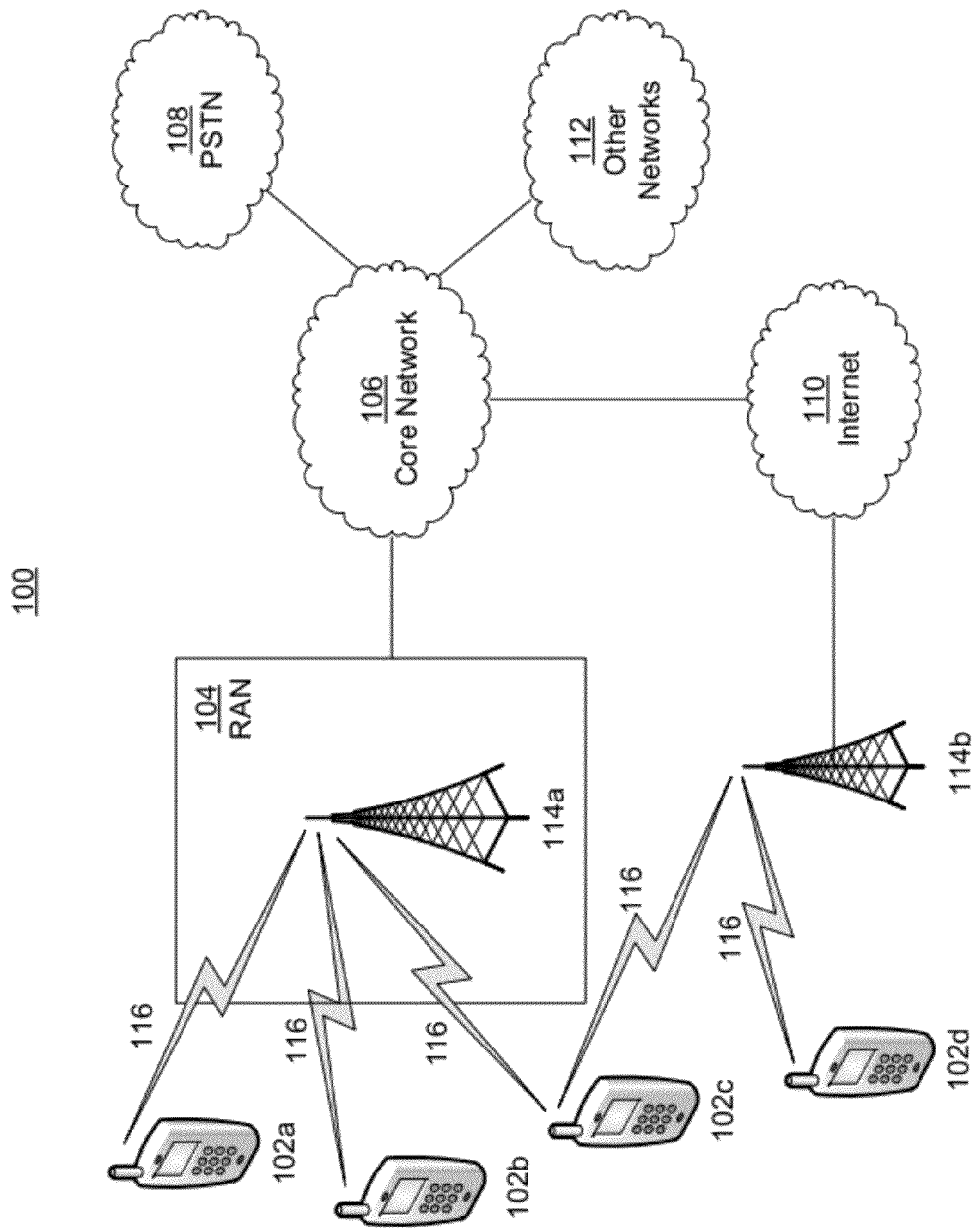
FIG. 1A is a system diagram of an example communications system in which one or more disclosed embodiments may be implemented.

Multiple Point High-Speed Downlink Packet Access (MP-HSDPA) transmissions have recently drawn attention for its potential to improve user experience at the cell edge of a wireless network. MP-HSDPA may involve multiple cells operating in the same or different frequency. MP-HSDPA may be implemented in a number of schemes depending on how the downlink transmission from the cell is collaborated. For example, SFMC-HSDPA may be implemented as HS-DDT, Multiflow Aggregation (MF), HS-SFN, or Dynamic Sector Switch (DSS). The MP-HSPA schemes may also be applied to dual or multi-frequency operation.

In HS-DDTx, the HSDPA downlink transmission from the neighbor interfering cell may be jointly scheduled. This may reduce interference to the User Equipment (UE) by not scheduling any data transmissions (Data DTXed) in the sub-frame if scheduling the data transmission may create strong interference to the cell currently serving the UE. This interference avoidance technology may occur via smart scheduling from the network over a number of coordinated cells or sectors.

In Multiflow Aggregation (MF), independent data flows may be transmitted to the same UE from several cells operating in the same frequency using native scrambling codes for the cells. The UE may be capable of receiving HS-PDSCH of several cells and may be scheduled to receive HSDPA data from these cells simultaneously. When the network is not fully loaded, spatial aggregating gain may be obtained by utilizing cells that have spare capacity to increase the aggregate data flow.

In HS-SFN, the concept of Single-frequency networks (SFN) from Multimedia Broadcast Multicast Service (MBMS) (such as those in LTE as well as WCDMA) may be extended to HSDPA data transmission. For example, the same data or signal may be scheduled to transmit across multiple cells in the network and the UE may receive the signal transmitted across the multiple cells. HS-SFN may combine the transmit power of multiple sectors and at the same time may remove the strongest interference for a particular UE in a particular time transmission interval (TTI).

In Dynamic Sector Switch (DSS), UEs with a single Rx antenna may not be able to suppress cell interference as effectively as UEs equipped with receiver diversity. Instead of simultaneously transmitting to the UE from both the serving and the secondary serving cells in the same frequency, a packet from the stronger of these two cells may be scheduled and transmitted in a TTI based on CQI feedback. This may be equivalent to dynamically switching the serving cell of the UE on a per-TTI basis.

As described above, MP-HSDPA technologies rely on coordinated network scheduling that may allow data packets to be switched promptly between different cells. To achieve optimum spectrum efficiency and peak data rate, particularly at cell edge, it may be important to inform the network about the channel condition over each propagation path from the cells to the UE, which may initially be estimated at the UE. Therefore, it may be desirable to provide improved techniques for uplink feedback for MP-HSDPA.

In accordance with embodiments of the present disclosure, systems and methods to provide uplink feedback, such as High Speed Dedicated Physical Control Channel (HS-DPCCH) feedback, that may improve downlink transmission efficiency and UE cell coverage for Multiple Point HSDPA transmissions (MP-HSDPA) are disclosed. Systems and methods for calculating Channel Quality Indicator (CQI) and/or Precoding Control Indicator (PCI) that may be used to accommodate the needs of coordinated dynamic network scheduling and to optimize the benefits of the multiple point transmissions are also disclosed. Moreover, various frame structures for the uplink feedback that may carry multiple CQI and HARQ-ACK feedbacks from MP-HSDPA and may address asynchronous downlink transmissions issues between two cells are disclosed. In addition, cell-dependent HS-DPCCH power offset settings for both CQI and HARQ-ACK fields that may ensure reliable uplink feedback transmission for the cells involved in SFMC operations are disclosed.

Although example systems and methods described herein are often described as being applied to same frequency multiple cell transmission, it should be understood that they are generally applicable to any multiple cell/multiple point transmission technologies, either involving use of the same frequency or different frequencies (DF). Therefore, same frequency (SF) and different frequency (DF) are considered interchangeable in the present disclosure.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA).

WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1X, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
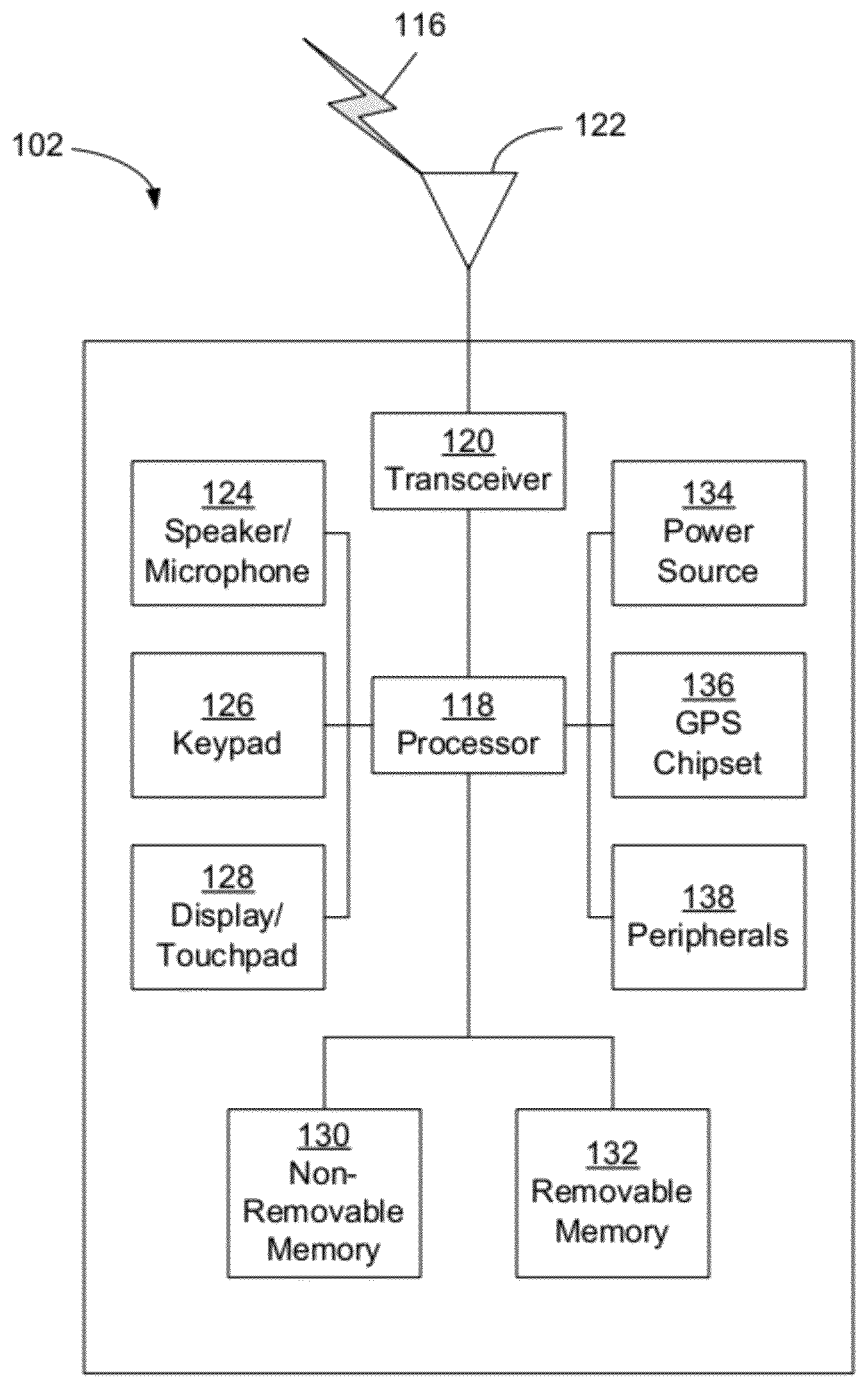
FIG. 1B depicts a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 106, removable memory 132, a power source 134, a global positioning system (GPS) chipset 136, and other peripherals 138. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 106 and/or the removable memory 132. The non-removable memory 106 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
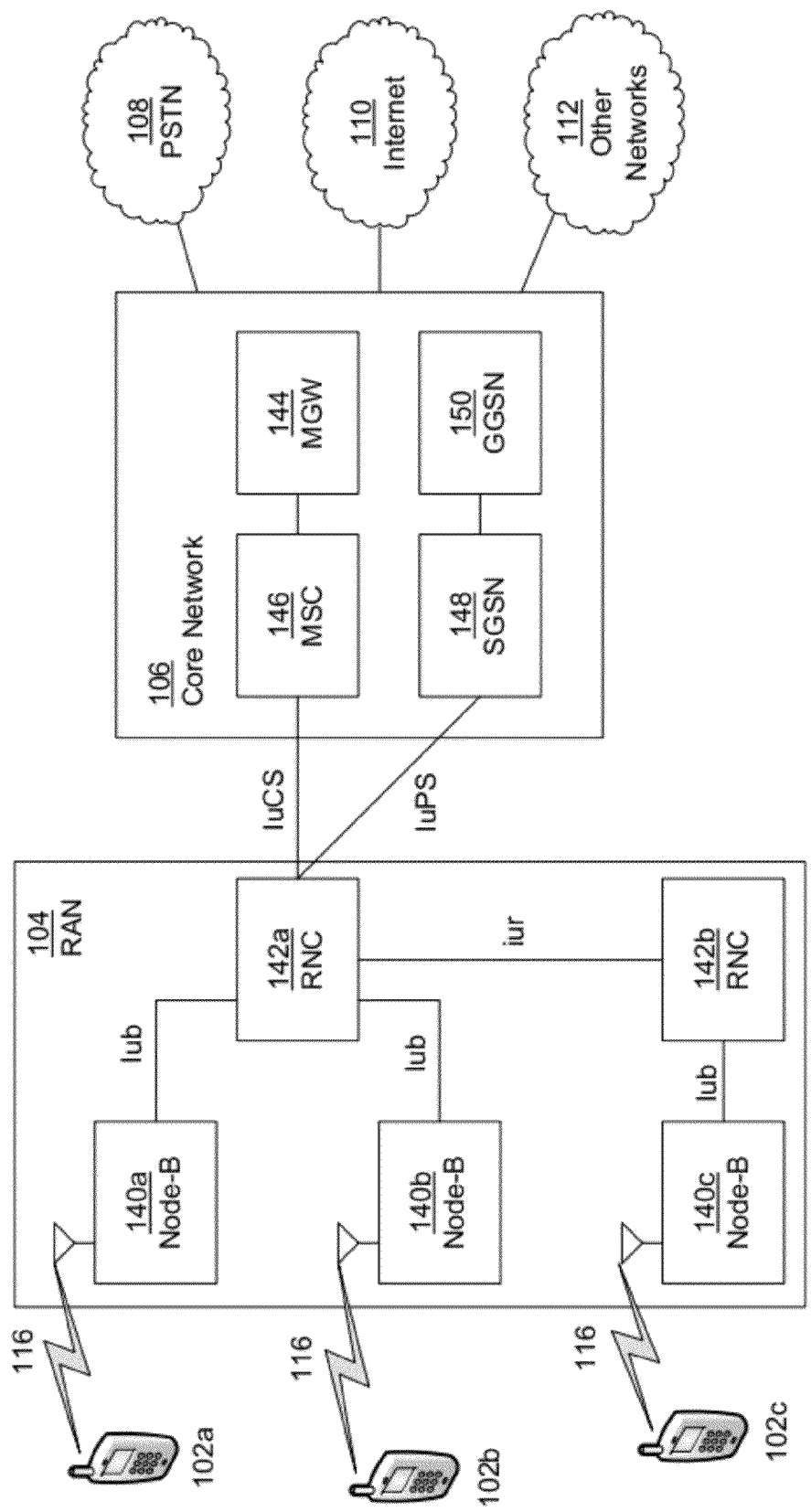
FIG. 1C depicts a system diagram of an example radio access network (RAN) and an example core network that may be used within the communications system illustrated in FIG. 1A.

FIG. 1C is a system diagram of the RAN 104 and the core network 106 according to an embodiment. As noted above, the RAN 104 may employ a UTRA radio technology to communicate with the WTRUs 102a, 102b, 102c over the air interface 116. The RAN 104 may also be in communication with the core network 106. As shown in FIG. 1C, the RAN 104 may include Node-Bs 140a, 140b, 140c, which may each include one or more transceivers for communicating with the WTRUs 102a, 102b, 102c over the air interface 116. The Node-Bs 140a, 140b, 140c may each be associated with a particular cell (not shown) within the RAN 104. The RAN 104 may also include RNCs 142a, 142b. It will be appreciated that the RAN 104 may include any number of Node-Bs and RNCs while remaining consistent with an embodiment.

As shown in FIG. 1C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macrodiversity, security functions, data encryption, and the like.

The core network 106 shown in FIG. 1C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 104 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional landline communications devices.

The RNC 142a in the RAN 104 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

Figure 1D:
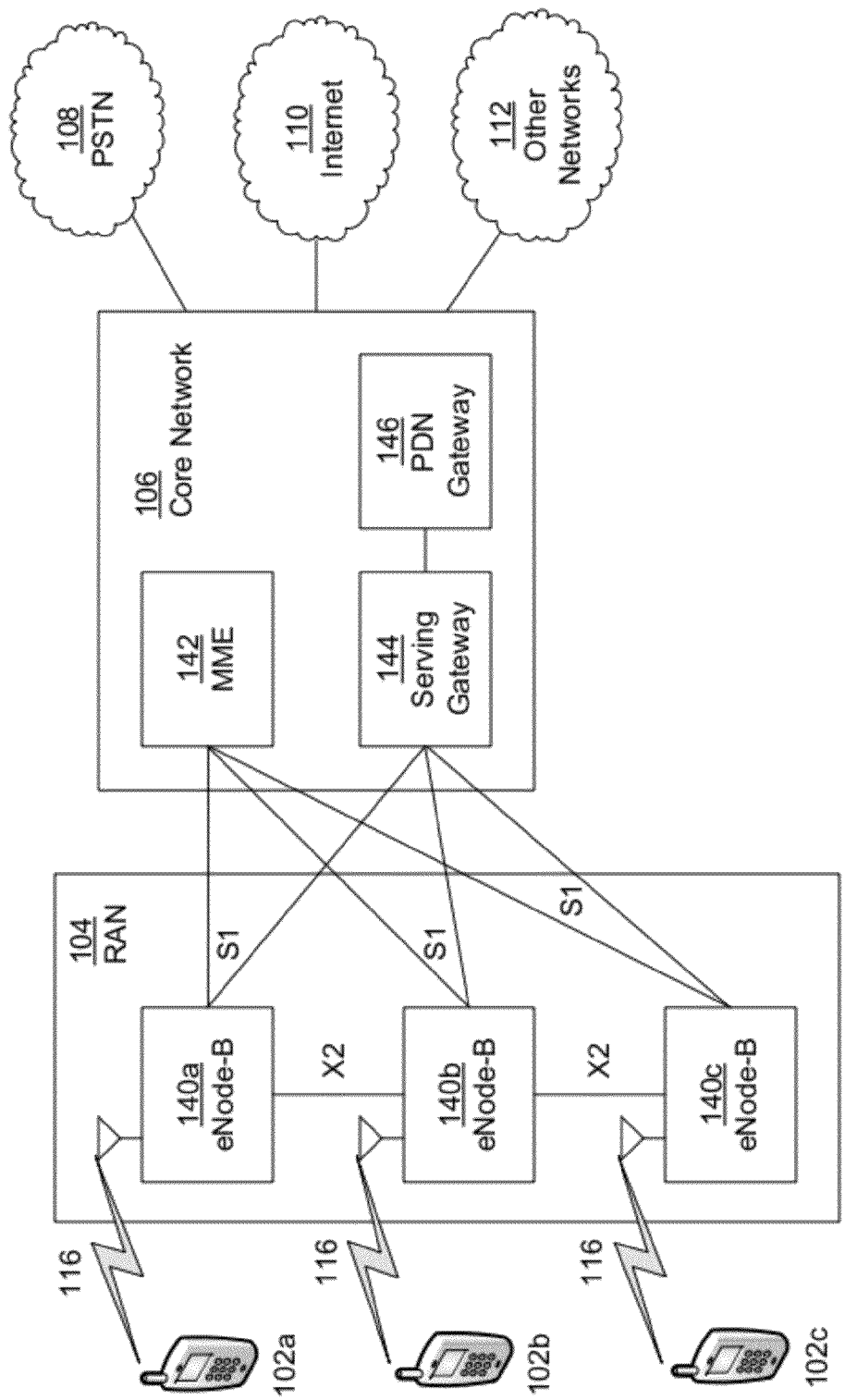
FIG. 1D depicts a system diagram of another exemplary RAN and core network according to an embodiment.

FIG. 1D is a system diagram of the RAN 104 and the core network 106 according to an embodiment. As noted above, the RAN 104 may employ an E-UTRA radio technology to communicate with the WTRUs 102a, 102b, 102c over the air interface 116. The RAN 104 may also be in communication with the core network 106.

The RAN 104 may include eNode-Bs 140a, 140b, 140c, though it will be appreciated that the RAN 104 may include any number of eNode-Bs while remaining consistent with an embodiment. The eNode-Bs 140a, 140b, 140c may each include one or more transceivers for communicating with the WTRUs 102a, 102b, 102c over the air interface 116. In one embodiment, the eNode-Bs 140a, 140b, 140c may implement MIMO technology. Thus, the eNode-B 140a, for example, may use multiple antennas to transmit wireless signals to, and receive wireless signals from, the WTRU 102a.

Each of the eNode-Bs 140a, 140b, 140c may be associated with a particular cell (not shown) and may be configured to handle radio resource management decisions, handover decisions, scheduling of users in the uplink and/or downlink, and the like. As shown in FIG. 1D, the eNode-Bs 140a, 140b, 140c may communicate with one another over an X2 interface.

The core network 106 shown in FIG. 1D may include a mobility management gateway (MME) 142, a serving gateway 144, and a packet data network (PDN) gateway 146. While each of the foregoing elements are depicted as part of the core network 106, it will be appreciated that any one of these elements may be owned and/or operated by an entity other than the core network operator.

The MME 142 may be connected to each of the eNode-Bs 142a, 142b, 142c in the RAN 104 via an S1 interface and may serve as a control node. For example, the MME 142 may be responsible for authenticating users of the WTRUs 102a, 102b, 102c, bearer activation/deactivation, selecting a particular serving gateway during an initial attach of the WTRUs 102a, 102b, 102c, and the like. The MME 142 may also provide a control plane function for switching between the RAN 104 and other RANs (not shown) that employ other radio technologies, such as GSM or WCDMA.

The serving gateway 144 may be connected to each of the eNode Bs 140a, 140b, 140c in the RAN 104 via the S1 interface. The serving gateway 144 may generally route and forward user data packets to/from the WTRUs 102a, 102b, 102c. The serving gateway 144 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 144 may also be connected to the PDN gateway 146, which may provide the WTRUs 102a, 102b, 102c with access to packet-switched networks, such as the Internet 110, to facilitate communications between the WTRUs 102a, 102b, 102c and IP-enabled devices.

The core network 106 may facilitate communications with other networks. For example, the core network 106 may provide the WTRUs 102a, 102b, 102c with access to circuit-switched networks, such as the PSTN 108, to facilitate communications between the WTRUs 102a, 102b, 102c and traditional land-line communications devices. For example, the core network 106 may include, or may communicate with, an IP gateway (e.g., an IP multimedia subsystem (IMS) server) that serves as an interface between the core network 106 and the PSTN 108. In addition, the core network 106 may provide the WTRUs 102a, 102b, 102c with access to the networks 112, which may include other wired or wireless networks that are owned and/or operated by other service providers.

Figure 1E:
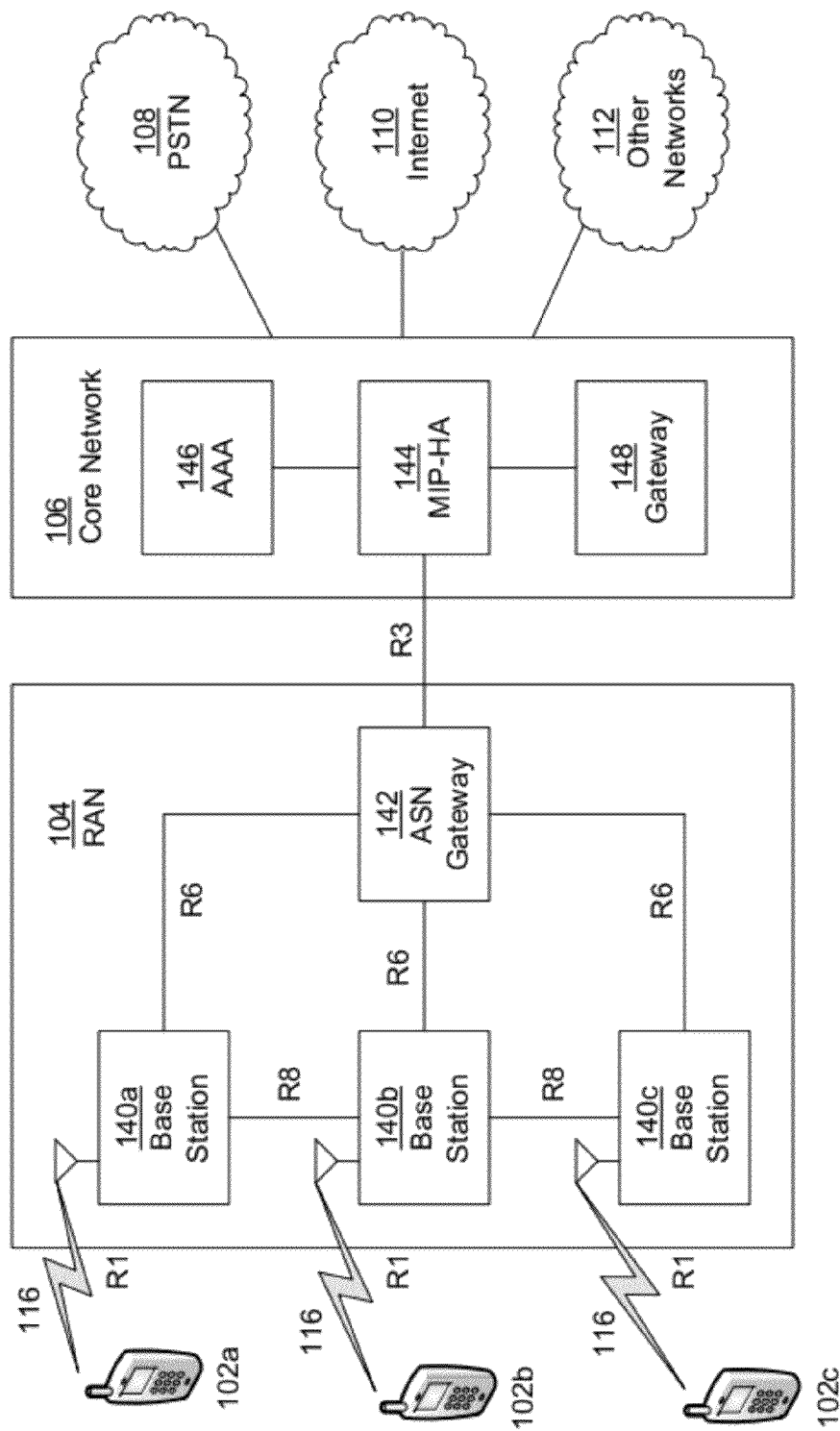
FIG. 1E depicts a system diagram of another exemplary RAN and core network according to an embodiment.

FIG. 1E is a system diagram of the RAN 104 and the core network 106 according to an embodiment. The RAN 104 may be an access service network (ASN) that employs IEEE 802.16 radio technology to communicate with the WTRUs 102a, 102b, 102c over the air interface 116. As will be further discussed below, the communication links between the different functional entities of the WTRUs 102a, 102b, 102c, the RAN 104, and the core network 106 may be defined as reference points.

As shown in FIG. 1E, the RAN 104 may include base stations 140a, 140b, 140c, and an ASN gateway 142, though it will be appreciated that the RAN 104 may include any number of base stations and ASN gateways while remaining consistent with an embodiment. The base stations 140a, 140b, 140c may each be associated with a particular cell (not shown) in the RAN 104 and may each include one or more transceivers for communicating with the WTRUs 102a, 102b, 102c over the air interface 116. In one embodiment, the base stations 140a, 140b, 140c may implement MIMO technology. Thus, the base station 140a, for example, may use multiple antennas to transmit wireless signals to, and receive wireless signals from, the WTRU 102a. The base stations 140a, 140b, 140c may also provide mobility management functions, such as handoff triggering, tunnel establishment, radio resource management, traffic classification, quality of service (QoS) policy enforcement, and the like. The ASN gateway 142 may serve as a traffic aggregation point and may be responsible for paging, caching of subscriber profiles, routing to the core network 106, and the like.

The air interface 116 between the WTRUs 102a, 102b, 102c and the RAN 104 may be defined as an R1 reference point that implements the IEEE 802.16 specification. In addition, each of the WTRUs 102a, 102b, 102c may establish a logical interface (not shown) with the core network 106. The logical interface between the WTRUs 102a, 102b, 102c and the core network 106 may be defined as an R2 reference point, which may be used for authentication, authorization, IP host configuration management, and/or mobility management.

The communication link between each of the base stations 140a, 140b, 140c may be defined as an R8 reference point that includes protocols for facilitating WTRU handovers and the transfer of data between base stations. The communication link between the base stations 140a, 140b, 140c and the ASN gateway 215 may be defined as an R6 reference point. The R6 reference point may include protocols for facilitating mobility management based on mobility events associated with each of the WTRUs 102a, 102b, 100c.

As shown in FIG. 1E, the RAN 104 may be connected to the core network 106. The communication link between the RAN 104 and the core network 106 may defined as an R3 reference point that includes protocols for facilitating data transfer and mobility management capabilities, for example. The core network 106 may include a mobile IP home agent (MIP-HA) 144, an authentication, authorization, accounting (AAA) server 146, and a gateway 148. While each of the foregoing elements are depicted as part of the core network 106, it will be appreciated that any one of these elements may be owned and/or operated by an entity other than the core network operator.

The MIP-HA may be responsible for IP address management, and may enable the WTRUs 102a, 102b, 102c to roam between different ASNs and/or different core networks. The MIP-HA 144 may provide the WTRUs 102a, 102b, 102c with access to packet-switched networks, such as the Internet 110, to facilitate communications between the WTRUs 102a, 102b, 102c and IP-enabled devices. The AAA server 146 may be responsible for user authentication and for supporting user services. The gateway 148 may facilitate interworking with other networks. For example, the gateway 148 may provide the WTRUs 102a, 102b, 102c with access to circuit-switched networks, such as the PSTN 108, to facilitate communications between the WTRUs 102a, 102b, 102c and traditional landline communications devices. In addition, the gateway 148 may provide the WTRUs 102a, 102b, 102c with access to the networks 112, which may include other wired or wireless networks that are owned and/or operated by other service providers.

Although not shown in FIG. 1E, it will be appreciated that the RAN 104 may be connected to other ASNs and the core network 106 may be connected to other core networks. The communication link between the RAN 104 the other ASNs may be defined as an R4 reference point, which may include protocols for coordinating the mobility of the WTRUs 102a, 102b, 102c between the RAN 104 and the other ASNs. The communication link between the core network 106 and the other core networks may be defined as an R5 reference, which may include protocols for facilitating interworking between home core networks and visited core networks.

It is noted that in the present disclosure, a CQI may be used interchangeably throughout the present disclosure with PCI, or both CQI and PCI.

Figure 2:
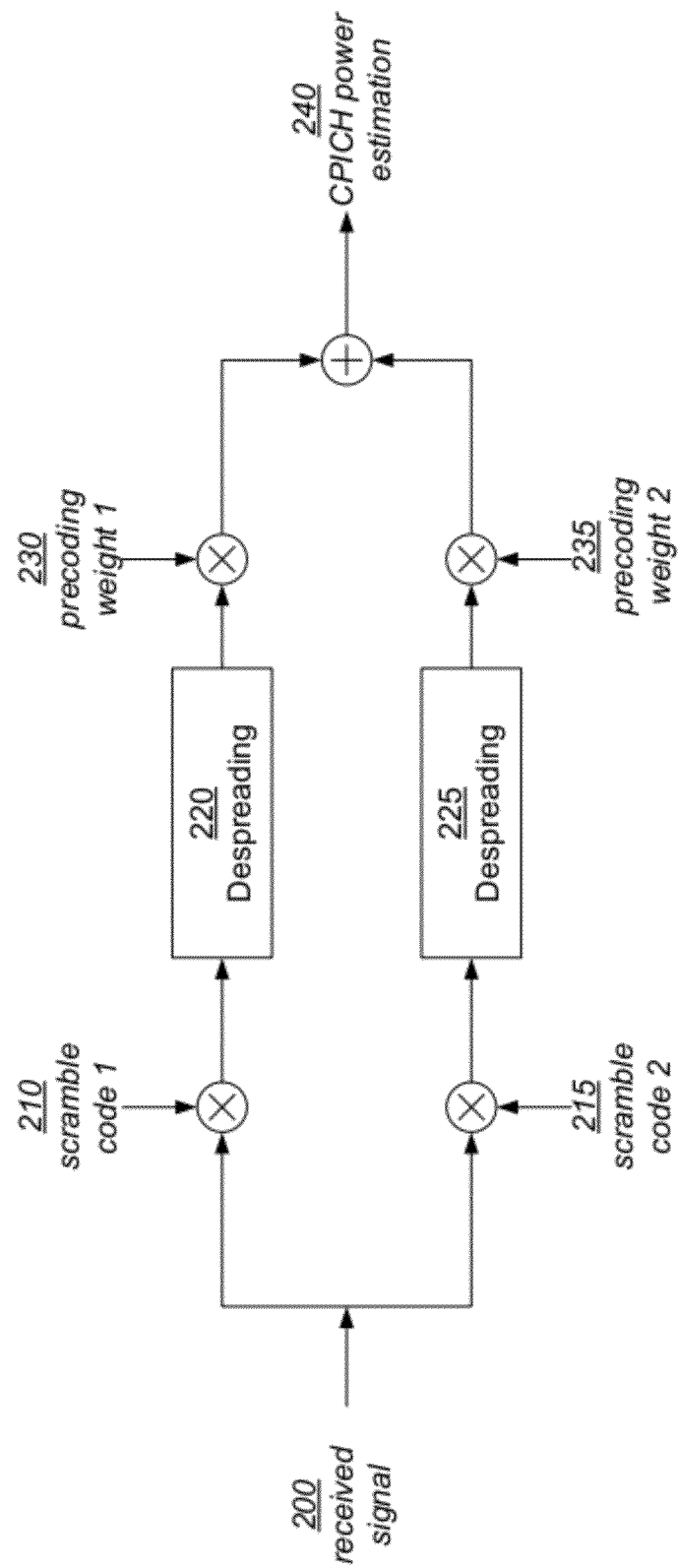
FIG. 2 depicts an example embodiment for estimating common pilot channel (CPICH) signal strength.

FIG. 2 depicts an example embodiment for estimating common pilot channel (CPICH) signal strength. This may be done for example, to calculate a channel quality indicator (CQI).

The CQI may be an index that indicates the downlink data transmission rate expressed in terms of transport block size, modulation type and number of parallel codes preferred by UE. The CQI may be calculated by estimating common pilot channel (CPICH) signal strength and interference/noise power, then mapping it to a composite index from a predefined table in accordance with the designed block error rate.

With MP-HSDPA, the CQI measurement procedure at the UE may be impacted when interference avoidance or signal enhancement techniques are utilized.

The CQI may be a tabulated value measured and reported by the UE with respect to its best capability of receiving the HS-PDSCH data under certain specified measurement conditions and error probability.

The CQI measurement may be performed assuming a certain value of the total received HS-PDSCH power. Since CQI may need to be reported when HS-PDSCH may not be present in a received signal, the power of the downlink pilot CPICH may be used as reference to derive what may be needed. Incorrect use of the reference CPICH power in the CQI measurement may lead to either overestimated or underestimated CQIs, which may result in a loss of UE throughput or excessive data error. For a single point transmission, the reference to the CPICH power may be used as follows:

$$P_{HSPDSCH} = P_{CICH} + \Gamma + \Delta \text{ in dB}$$

where $P_{HSPDSCH}$ and $P_{CPICH}$ are the HS-PDSCH and CPICH power, respectively. The measurement power offset $\Gamma$ may be signaled by higher layers and the reference power adjustment $\Delta$ may be a parameter specified in a suitable CQI table.

During MP-HSDPA operation, such as the HS-SFN scheme, more than two transmission signals may be involved in the transmission of data. FIG. 2 illustrates a diagram of an example of estimating reference CPICH power where the combining processing may be summation. For example, the CPICH signals received at the UE from different serving cells may be combined as if they are passing through the same processing path as HS-PDSCH. At 200, the UE may receive signals from one or more cells involved in joint transmission. The CPICHs from the cells involved in the joint transmission may utilize different scramble codes while the HS-PDSCHs may not. The received signals may be split such that each signal may be individually descrambled according to their own scramble code, for example, at 210 and 215. This may be done, for example, to estimate each of the individual CPICH signals. At 220 and 225 the descrambled CPICH signals may be dispread. If there are any cross-cell precoding weights applied to HS-PDSCH, the same precoding weights may be applied to the CPICH signals at 230 and 235. The CPICH signals may then be combined to provide a CPICH power estimation at 240. For example, the UE may be in joint transmission mode and may assume a total received HS-PDSCH power for the purpose of CQI reporting as follows:

$$P_{HSPDSCH} = P_{CPICH} + \Gamma + \Delta \text{ in dB,}$$

where $P_{CPICH}$ denotes the power of the combined received CPICH from both serving cells in the joint transmission and may be determined as if the same scrambling code and transmitter weights had been applied to the CPICHs.

The reference CPICH power may also be calculated from estimating the CPICH power of the primary serving cell, and making use of channel estimation results already available at the UE. For example, $\hat{h}_1$ may be the estimated channel coefficient at symbol level for the primary cell and $\hat{h}_2$ may be the estimated channel coefficient at symbol level for the secondary serving cell. The reference CPICH power may be estimated as follows:

$$P_{CPICH} = \hat{P}_{CPICH1} \frac{|w_1 \hat{h}_1 + w_2 \hat{h}_2|^2}{|w_1 \hat{h}_1|}$$

where $\hat{P}_{CPICH1}$ may be the estimated receive power for the CPICH from the primary serving cell and $w_1$ and $w_2$ may be the cross-cell precoding weights if any of the cross-cell transmit diversity techniques are utilized.

In another example embodiment, CQI may be defined for use when the UE may be configured in joint transmission mode. For the purpose of CQI reporting, the UE may assume a total received HS-PDSCH power of $$P_{HSPDSCH} = P_{CPICH} + \Gamma + \Delta \text{ in dB,}$$

where $P_{CPICH}$ may denote the power of the combined received CPICH from both serving cells in the joint transmission and may be determined from the scaled power of received CPICH of the primary serving cell. The scaling factor may be determined by the channel estimation result and cross-cell precoding weights for both serving cells in order to make $P_{CPICH}$ proportional to $P_{PDCSH}$.

A number of other ways of defining the reference CPICH power may also be adopted. For example, the CPICH power from a different cell may be individually estimated and the reference CPICH power may be the total of them:

$$P_{CPICH} = \hat{P}_{CPICH1} + \hat{P}_{CPICH2}$$

In another example, the reference CPICH may be defined by taking the maximum of the CPICH powers from the serving cells in the joint transmission:

$$P_{CPICH} = \max(\hat{P}_{CPICH1}, \hat{P}_{CPICH2})$$

In another example, the reference CPICH may be defined by taking the average of the CPICH powers from the serving cells:

$$P_{CPICH} = (\hat{P}_{CPICH1} + \hat{P}_{CPICH2})/2$$

In another example, the reference CPICH may be defined by using the CPICH power from the primary serving cell:

$$P_{CPICH} = \hat{P}_{CPICH1}$$

In some scenarios, only the channel quality information related to the serving cell may be necessary to report to Node B for the HS-PDSCH data scheduling. While scheduling coordination between various cells may be made possible by the multipoint transmission schemes, such as HS-DDTx and HS-SFN, the signal and interference conditions at UE receiver may vary dynamically as a function of the scheduling decision made at Node B. Knowing CQI information at a particular transmission time interval (TTI) at the node B scheduler may allow the coordinated scheduling to be used to optimize the UE throughput. Although when and how a coordinated scheduling event occurred may be made known to the Node B scheduler via interchange control information between the cells, successfully predicting the current CQI from the reported estimate may require the UE to report the impact of the inference conditions at the UE caused by the DTXed or joint transmission.

In an embodiment, the UE may be allowed to report the CPICH power from its dominant interference cell via the CQI field of HS-DPCCH. With use of this reported information, Node B may be capable of factoring in the noise source changes and making corresponding modifications based on the reported CQI if it anticipates coordinated scheduling events in the incoming TTI.

To realize this embodiment, a CQI format may allows the CPICH power of dominant interfering cell to be incorporated into the CQI calculation. For example, a method for calculating an assistive CQI may include the received signal being processed by the scrambling code used by the dominant interfering cell and the channelization code for CPICH to extract the CPICH component in the signal. The CPICH signal power $P_{CPICH, int}$ may be estimated for the dominant interfering cell. The total interference power $P_{int}$ may be estimated at UE (including the dominant interfering cell and excluding the serving cell), which may be the same as the one used for regular CQI estimation. The CPICH SIR=$P_{CPICH,int}/P_{int}$ may be estimated. The assistive CQI may be obtained by finding a mapping relation between CQI and CPICH SIR derived in a pre-defined mapping table or by a pre-defined formula. If type B CQI format is used, the additional PCI field may be used to indicate which cell in the active set may be the dominant interference cell and which cell may be capable of supporting up to 4 cells in its two bit field.

Upon receiving the assistive CQI and by comparing to the regular CQI it receives, the Node B may drive the CPICH power of the interfering cell in relation to the CPICH power of the primary serving cell. The information may then be used to optimize the Node B' scheduling by getting more accurate CQI.

Assistive CQI may also be defined, based on an unrestricted observation interval, as the UE reporting the highest tabulated assistive CQI value for the dominant interfering cell as if it was used for HS-PDSCH transmission in the same noise and interference conditions as that encountered the serving cell. For the purpose of assistive CQI reporting, the UE may assume a total received HS-PDSCH power of $$P_{HSPDSCH}=P_{CPICH,int}+\Gamma+\Delta \text{ in dB,}$$

where $P_{CPICH,int}$ may denote the power of CPICH used by the dominant interfering cell. In the terminology used for the multipoint transmission, the dominant interference cell may be fixed to a particular cell and referred to as the secondary serving cell.

In another embodiment, the reporting format for the assistive CQI may be completely modified by introducing a new lookup table with new set of tabulate values that defines the relative CPICH power of the interfering cell in relation to the CPICH power of the primary serving cell. An example of such a table is given as follows:

TABLE 1

| Assistive CQI table | |
|---|---|
| Assistive CQI | $P_{CPICH, int}/P_{CPICH}$ (dB) |
| 0 | Reserved |
| 1 | −6.0 |
| 2 | −5.5 |
| 3 | −5.0 |
| 4 | −4.5 |
| 5 | −4.0 |
| 6 | −3.5 |
| 7 | −3.0 |
| 8 | −2.5 |
| 9 | −2.0 |
| 10 | −1.5 |
| 11 | −1.0 |
| 12 | −0.5 |

TABLE 1-continued

| Assistive CQI table | |
|---|---|
| Assistive CQI | $P_{CPICH, int}/P_{CPICH}$ (dB) |
| 13 | 0.0 |
| 14 | 0.5 |
| 15 | 1.0 |
| 16 | 1.5 |
| 17 | 2.0 |
| 18 | 2.5 |
| 19 | 3.0 |
| 20 | 3.5 |
| 21 | 4.0 |
| 22 | 4.5 |
| 23 | 5.0 |
| 24 | 5.5 |
| 25 | 6.0 |
| 26 | 6.5 |
| 27 | 7.0 |
| 28 | 7.5 |
| 29 | 8.0 |
| 30 | Reserved |
| 31 | Reserved |

The assistive CQI that reports the relative power of the CPICH for the interfering cell may be described as follows:

Based on an unrestricted observation interval, the UE may report the ratio of the CPICH power of the dominant interfering cell over that of the primary serving cell. The assistive CQI mapping to the power ratio may be specified in Table 1.

Figure 3:
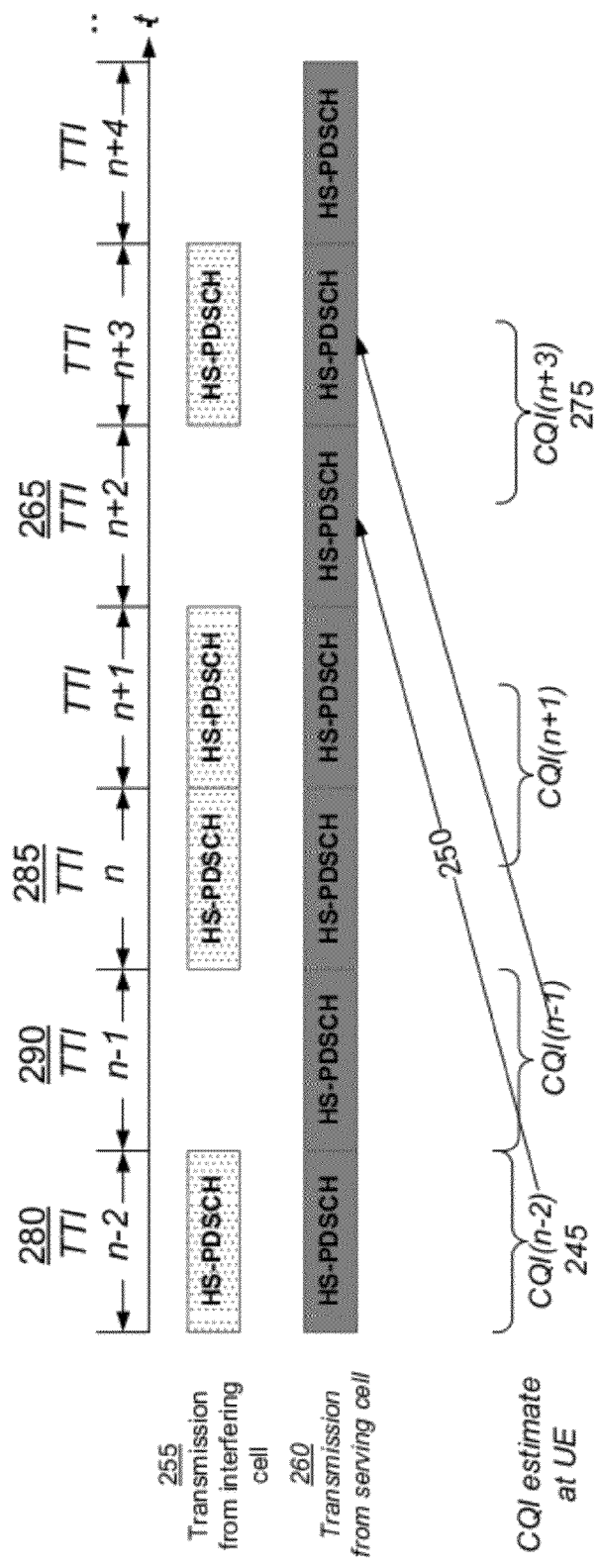
FIG. 3 depicts an example embodiment for CQI estimation for network scheduling.

FIG. 3 depicts an example embodiment for CQI estimation that may be used for network scheduling. This may be done for example, to provide more accurate CQI calculation by anticipating interferences and/or signal level changes. For example, FIG. 3 shows an example that may be used for correct CQI estimation when coordinated scheduling is employed by network for the purpose of interference avoidance or signal enhancement.

Assuming for illustration purpose that at 245 CQI (n−2) is calculated during (n−2)th Transmission Time Interval (TTI) period at 280, in which interfering cell 255 is transmitting HS-PDSCH to another UE. Interfering cell 255 may be creating interference to the reception of current UE from its serving cell 260. As indicated by the arrow 250, when CQI (n−2) at 245 is used for scheduling at 265 for TTI interval n+2 and the network decides to coordinate the transmission of the interfering cell by shutting off its HS-DPSCH transmission, the indicated transport block size at 245 in CQI(n−2) may be underestimated since the interference is not factored out. Similarly, an overestimated situation may occur at 270 for CQI (n−1), where presence of the interference is not accounted for.

If the CQI calculation is performed by averaging across TTI boundary as is the case at 275 for CQI(n+3), it may also be difficult for Node B to perform optimal scheduling.

In accordance with embodiments of the present disclosure, techniques are provided to have multiple CQIs estimated at the UE in the same TTI interval by compensating the presence/absence of the interference signals from the second cell, such as the interfering cell 255. If multi-cell signal combining techniques may be used, the CQI calculation may consider it and report the capacity that the channel may support.

These CQI values may be reported to network via the uplink feedback channel HS-DPCCH so that optimized network scheduling may be performed.

Examples of how CQI calculation may be addressed for the MP-HSDPA technologies disclosed in the following paragraphs.

In an example embodiment, CQI calculation may be performed for HS-DDT. HS-DDTx technology aims mainly at providing interference avoidance by coordinated network scheduling. Thus, it may be beneficial to have two sets of CQIs estimated and reported simultaneously on TTI basis, with one set reporting the channel quality with inference avoidance accounted for, and the other set without. These two sets of CQIs may be presented by $CQI_{IA}$ and $CQI_{NA}$ respectively, where IA stands for Interference Avoidance, and NA stands for No Avoidance of interference.

During a interfered TTIs, such as (n−2)th TTI at 280 or nth TTI at 285 in FIG. 3, calculating $CQI_{NA}$ may be occur conventionally. For example, calculating $CQI_{NA}$ may comprise:
1. Processing a received signal by using the scrambling code used by serving cell and the channelization code for CPICH to extract the CPICH component in the received signal
2. Estimating the CPICH signal power $P_{CPICH}$
3. Estimating the interference power $P_{int}$ contributed from all other cells
4. Estimating the CPICH SIR=$P_{CPICH}/P_{int}$
5. Obtaining CQI by finding a mapping relation between CQI and CPICH SIR derived in a pre-defined mapping table or by a pre-defined formula, which may combine multiple factors (such as HOM and use of an advanced receiver) to offset in order to provide a more accurate CQI calculation.

When calculating $CQI_{IA}$ in the same TTI, some interference components generated from the coordinated interfering cell may need to be removed because a measurement may have been made during the interfered TTIs. For example, in one embodiment, when only HS-PDSCH is DTXed for the coordinated interfering cell, the interference power contributed by this HS-PDSCH channel may be estimated and removed from the CPICH SIR estimation. Calculating $CQI_{IA}$ may comprise:
1. Processing a received signal using the scrambling code used by the serving cell and the channelization code for CPICH to extract the CPICH component in the received signal
2. Estimating the CPICH signal power $P_{CPICH}$
3. Estimating the interference power $P_{int}$ contributed from all other cells
4. Processing the received signal using the scrambling code used by the interfering cell and the channelization code for CPICH to extract the CPICH component transmitted by the interfering cell
5. Estimating the CPICH signal power $P_{CPICH, int}$ from the interfering cell
6. Offsetting $P_{CPICH, int}$ to derive the HS-PDSCH power from the interfering cell $$P_{HS-DPSCH,int} = P_{CPICH, int}(G_{HS-DPSCH}/G_{CPICH})^2$$

where $G_{HS-DPSCH}/G_{CPICH}$ is the ratio of scaling factors of HS-DPSCH and CPICH used for the interfering cell, which is assumed to be known to the UE. Otherwise, it may be estimated.

7. Defining a residue factor, $R_{res}$, that reflects residue power level relative to the signal after applying different descrambling and channelization codes from the ones used at the transmitter. This parameter may be a function of the spreading factor and the channelization code used. It may be obtained from either theoretical analysis or from simulation. In cases where not all the channelization codes are used for the HS-DPSCH transmission to the UE, $R_{res}$ may be calculated or estimated based on the portion that is actually used for this UE.

8. Calculating the total inference power, that may be the offset, by removing the power contributed by the interfering HS-PSCH:

$$P'_{int} = P_{int} - P_{HS-DPSCH,int} R_{res}$$

9. Estimating the modified CPICH SIR:

$$CPICH\ SIR = P_{CPICH}/P'_{int}$$

10. Obtaining $CQI_{IA}$ by finding a mapping relation between CQI and CPICH SIR derived in a pre-defined mapping table or by a pre-defined formula.

If HS-SCCH is also DTXed in the coordinated interfering cell, 6 to 8 (shown above) may also applied to the power of HS-SCCH of the interfering cell. Note that a different value of $R_{res}$ may be or may not be used.

$P_{CPICH}$ may also be expressed in terms of energy per chip (Ec) or energy per bits (Eb), in either dB or linear scale. Noise power may also be expressed in terms of the noise power spectral density (Ioc).

During a non-interfered TTIs, such as (n−1)th TTI at 290 or (n+2)th TTI at 265 in FIG. 3, calculating $CQI_{IA}$ may be straightforward as the signal components being DTXed may already be excluded from the signal. On the other hand, calculating $CQI_{NA}$ may require modification of the inference power, which may follow 10 of the method described above; however, 8 may need to be modified as follows:
8. Calculating the total inference power, which may be the offset, by adding the power contributed by the interfering HS-PSCH $$P'_{int} = P_{int} + P_{HS-DPSCH,int} R_{res}$$

Note that the power estimations in the above procedures, either for signal or interference, may be conducted by averaging over the data within a TTI interval.

Figure 4:
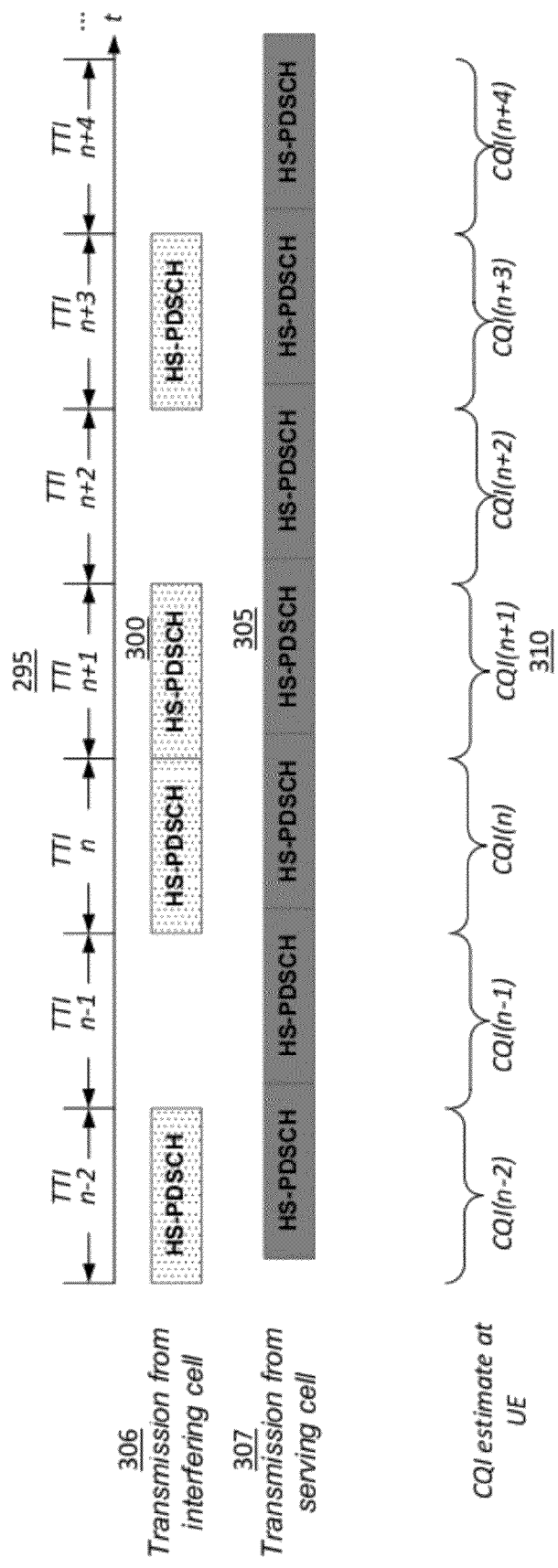
FIG. 4 depicts an example embodiment for CQI estimation when the TTI boundaries are not aligned.

FIG. 4 depicts an example embodiment for CQI estimation when the TTI boundaries are not aligned. In case that the TTI boundaries of the two cells may not be synchronized, i.e., a time offset exists, the averaging may follow the TTI boundary of the interference cell, as shown in FIG. 4. For example, FIG. 4 illustrates CQI estimation when the TTI boundaries may not be aligned. As shown in FIG. 4, at 295, TTI (N+1) occurs, which may be aligned with HS-PDSCH 300 from the interfering cell 306. However, the TTI boundary of HS-PDSCH 305, which was transmitted from the serving cell 307, does not aligned with HS-PDSCH 300. At 310, CQI (n+1) may be generated In an example embodiment, CQI calculation may be performed for MF. In a MF operation, the cells involved in multipoint transmission may be defined as a primary cell and a plurality of secondary cells or multipoint cells. CQI reports may be prepared for each cell. As such, N CQI reports may need to be estimated by the UE, where N may be the number of configured cells that may be jointly used for simultaneous downlink data transmission. Optionally, N may be the number of active cells. Each of the CQI reports may be calculated by applying its own scramble code used by the associated cell.

Figure 5:
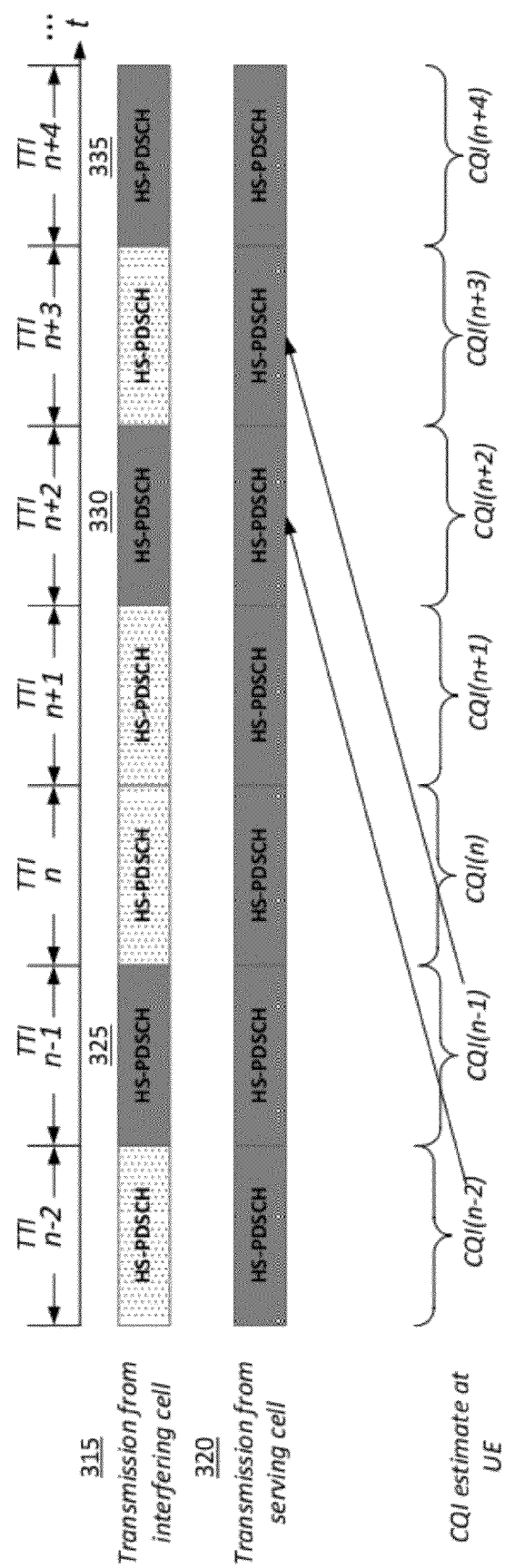
FIG. 5 depicts an example embodiment for HS-SFN transmission.

In an example embodiment, CQI calculation may be performed for HS-SFN. FIG. 5 depicts an example embodiment for HS-SFN transmission. For example, FIG. 5 illustrates the HS-SFN transmission, where the signal transmitted from the interfering cell at (n−1)th, (n+2)th, and (n+4)th TTIs use the same signal with the same scramble code as the serving cell. As shown in FIG. 5, HS-PDSCH 325, HS-PDSCH 330, and HS-PDSCH 335 may be transmitted by interfering cell 315 and may use the same signal and scramble code as transmissions from serving cell 320.

In HS-SFN, the network scheduler may coordinate the interfering cell by allowing it to transmit the same data using the same scramble code, rather than just shutting its data transmission off. This may avoid the interference and may enhance the signal strength for the HSDPA data transmission to the UE. Estimation of two sets of CQIs may be desirable for the optimum network scheduling: $CQI_{SE}$ to indicate the channel quality for the case when the inferring cell may be used for signal enhancement, and $CQI_{INT}$ to indicate the channel quality for the case when the inferring cell may be interfering. They may be calculated differently depending on the signal status of the current TTI.

During a interfered TTIs, such as (n−2)th TTI or nth TTI in FIG. 5, calculating $CQI_{INT}$ may be straightforward. For example, $CQI_{INT}$ may be calculated using conventional method of calculating CQIs.

While calculating $CQI_{SE}$, both signal and interference power may need to be compensated to account for the fact that both inference avoidance and signal enhancement techniques may be employed. In one example embodiment, the following may be performed:

1. The received signal may be processed by the scrambling code used by serving cell and the channelization code for CPICH to extract the CPICH component in the signal
2. The CPICH signal power $P_{CPICH}$ may be estimated.
3. The interference power $P_{int}$ contributed from other cells may be estimated.
4. The received signal may be processed by the scrambling code used by interfering cell and the channelization code for CPICH to extract the CPICH component transmitted by the interfering cell
5. The CPICH signal power $P_{CPICH,\,int}$ from the interfering cell may be estimated.
6. $P_{CPICH,\,int}$ may be offset to derive the HS-PDSCH power from the interfering cell $$P_{HS\text{-}DPSCH,int} = P_{CPICH,\,int}(G_{HS\text{-}DPSCH}/G_{CPICH})^2$$

where $G_{HS\text{-}DPSCH}/G_{CPICH}$ may be the ratio of scaling factors of HS-DPSCH and CPICH used for the interfering cell, which may assumed to be known to the UE. Otherwise, it may be estimated.

7. A residue factor, $R_{res}$, which may reflect residue power level relative to the signal after applying different descrambling and channelization codes from the ones used at transmitter may be defined. This parameter may be a function of the spreading factor and channelization code used. It may be obtained from either theoretical analysis or from simulation. In cases where not all the channelization codes are used for the HS-DPSCH transmission to a UE, $R_{res}$ may be calculated or estimated based on the portion that is actually used for this UE.
8. The total inference power may be the offset by removing the power contributed by the interfering HS-PSCH $$P'_{int} = P_{int} - P_{HS\text{-}DPSCH,int} R_{res}$$

9. The CPICH power may be compensated by $$P'_{CPICH} = P_{CPICH} + P_{CPICH,int}$$

10. The modified CPICH SIR $$CPICH\ SIR = P'_{CHIPCH}/P'_{int}$$

11. $CQI_{SE}$ may be obtained by finding a mapping relation between CQI and CPICH SIR derived in a pre-defined mapping table or by a pre-defined formula, similar to the conventional cases.

The CPICH power in 9 may be compensated in a number of ways. For example, the CPICH power in 9 may be compensated by $$P'_{CPICH} = \left(1 + \left|\frac{\hat{h}_2}{\hat{h}_1}\right|^2\right) P_{CPICH} \qquad \text{Equation 1}$$

where $\hat{h}_1$ and $\hat{h}_2$ may be the channel estimation results for serving and the interfering cells respectively.

In another example, the CPICH power in 9 may be compensated by $$P'_{CPICH} = P_{CPICH} + (\beta_2/\beta_1) P_{CPICH,int} \qquad \text{Equation 2}$$

where $$\beta_1 = \frac{G_{HSPDSCH,1}}{G_{CPICH,1}} \text{ and } \beta_2 = \frac{G_{HSPDSCH,2}}{G_{CPICH,2}}$$

may be the HS-PSCH to CPICH power ratio for the serving and interfering cell respectively.

In another example, the CPICH power in 9 may be compensated by $$P'_{CPICH} = \left(1 + \left|\frac{\hat{h}_2 \beta_2}{\hat{h}_1 \beta_1}\right|^2\right) P_{CPICH}$$

During a non-interfered TTIs, such as (n−1)th TTI or (n+2)th TTI in FIG. 5 $CQI_{INT}$ may be calculated. For example, the following may be used to calculate $CQI_{INT}$:

1. The received signal may be processed using the scrambling code used by the serving cell and the channelization code for CPICH.
2. The CPICH signal power $P_{CPICH}$ may be estimated.
3. The interference power $P_{int}$ contributed from other cells may be estimated.
4. The received signal may be processed using the scrambling code used by the interfering cell and the channelization code for CPICH.
5. The CPICH signal power $P_{CPICH,\,int}$ from the interfering cell may be estimated.
6. $P_{CPICH,\,int}$ may be offset to derive the HS-PDSCH power from the interfering cell:

$$P_{HS\text{-}DPSCH,int} = P_{CPICH,\,int}(G_{HS\text{-}DPSCH}/G_{CPICH})^2$$

where $G_{HS\text{-}DPSCH}/G_{CPICH}$ may be the ratio of scaling factors of HS-DPSCH and CPICH may be used for the interfering cell, which may assumed to be known to the UE. Otherwise, it can be estimated.

7. A residue factor, $R_{res}$, which may reflect residue power level relative to the signal after applying different descrambling and channelization codes from the ones used at transmitter, may be defined. In cases where not all the channelization codes are used for the HS-DPSCH transmission to the UE, $R_{res}$ may be calculated or estimated based on the portion that is actually used for the UE.
8. The total inference power may be the offset by adding the power contributed by the interfering HS-PSCH $$P'_{int} = P_{int} + P_{HS\text{-}DPSCH,int} R_{res}$$

9. The modified CPICH SIR may be estimated:

$$CPICH\ SIR = P_{CPICH}/P'_{int}$$

10. $CQI_{INT}$ may be obtained by finding a mapping relation between CQI and CPICH SIR derived in a pre-defined mapping table or by a pre-defined formula.

The following may be used to calculate $CQI_{SE}$:
1. The received signal may be processed using the scrambling code used by serving cell and the channelization code for CPICH to extract the CPICH component in the signal.
2. The CPICH signal power $P_{CPICH}$ may be estimated.
3. The interference power $P_{int}$ contributed from other cells may be estimated.
4. The received signal may be processed by the scrambling code used by interfering cell and the channelization code for CPICH to extract the CPICH component transmitted by the interfering cell
5. The CPICH signal power $P_{CPICH, int}$ from the interfering cell may be estimated.
6. The CPICH power may be compensated by:

$$P'_{CPICH} = P_{CPICH} + P_{CPICH,int}$$

CPICH may also be calculated using the equations 1-3 as shown above.
7. The modified CPICH SIR may be estimated:

$$CPICH\ SIR = P'_{CHIPCH}/P'_{int}$$

8. $CQI_{SE}$ may be obtained by finding a mapping relation between CQI and CPICH SIR derived in a pre-defined mapping table or by a pre-defined formula.

Methods of TTI boundary alignment while averaging the signal/interference power described herein may also apply to the cases where HS-SFN may be deployed.

In an example embodiment, CQI calculation may be performed for DSS. In MP-HSDPA employing DSS, the serving cell may be switched between two cells (or possibly more than two). Because one cell may be in operation to transmit to the UE at a time, the concept of two sets of CQIs for IA or NA used for HS-DDTx may still be used. For example, $CQI_{IA}$ and $CQI_{NA}$ may be calculated by following the procedures described herein. Because the interfering cell may also be considered as one of the serving cells, an additional pair of $CQI_{IA}$ and $CQI_{NA}$ may need to be estimated at the UE, for example, by using the scramble code associated with the second serving cell.

In a summary of the various method embodiments for calculating CQI presented above, the UE in may need to estimate two categories of CQIs and report to the network on a per TTI basis: the one of higher value with the MP-HSDPA enabled, and the other one of lower value without MP-HSDPA. If necessary, the UE may need to anticipate the interference or signal level changes in order to get correct estimation of the corresponding CQIs. Referring to the former as 'upper CQI' and the later as 'lower CQI', they may be defined as demonstrated in the following paragraphs when the UE is configured in MP transmission mode:

For an upper CQI, based on an unrestricted observation interval, the UE may report the highest tabulated CQI value for which a single HS-DSCH sub-frame formatted with the transport block size, number of HS-PDSCH codes and modulation corresponding to the reported or lower CQI value may be received with a transport block error probability that may not exceed 0.1 in a 3-slot reference period ending 1 slot before the start of the first slot in which the reported CQI value may be transmitted. This may assume that the configured MP transmission may be operating in the observation interval. If the CQI is measured during an observation interval in which the configured MP transmission may not be operating, the UE may anticipate the variations of the interference or signal levels in the CQI measurement as if the configured MP transmission is used.

For the lower CQI, based on an unrestricted observation interval, the UE may report the highest tabulated CQI value for which a single HS-DSCH sub-frame formatted with the transport block size, number of HS-PDSCH codes and modulation corresponding to the reported or lower CQI value may be received with a transport block error probability that may not exceed 0.1 in a 3-slot reference period ending 1 slot before the start of the first slot in which the reported CQI value may be transmitted. This may assume that the configured MP transmission may not operating in the observation interval. If the CQI is measured during an observation interval in which the configured MP transmission may be operating, the UE may anticipate the variations of the interference or signal levels in the CQI measurement as if no MP transmission is used.

In the embodiments disclosed below, the terms "cell 1" and "cell 2" are used. However, the numbering of cell 1 and cell 2 may not distinguish whether the cell is a primary or secondary cell. For example, cell 1 may be the primary serving cell and cell 2 may be the secondary serving cell. Additionally, cell 2 may be the primary serving cell and cell 1 may be the secondary serving cell. Moreover, other naming may also be associated with the cell 1 and cell 2 without distinction.

Figure 6:
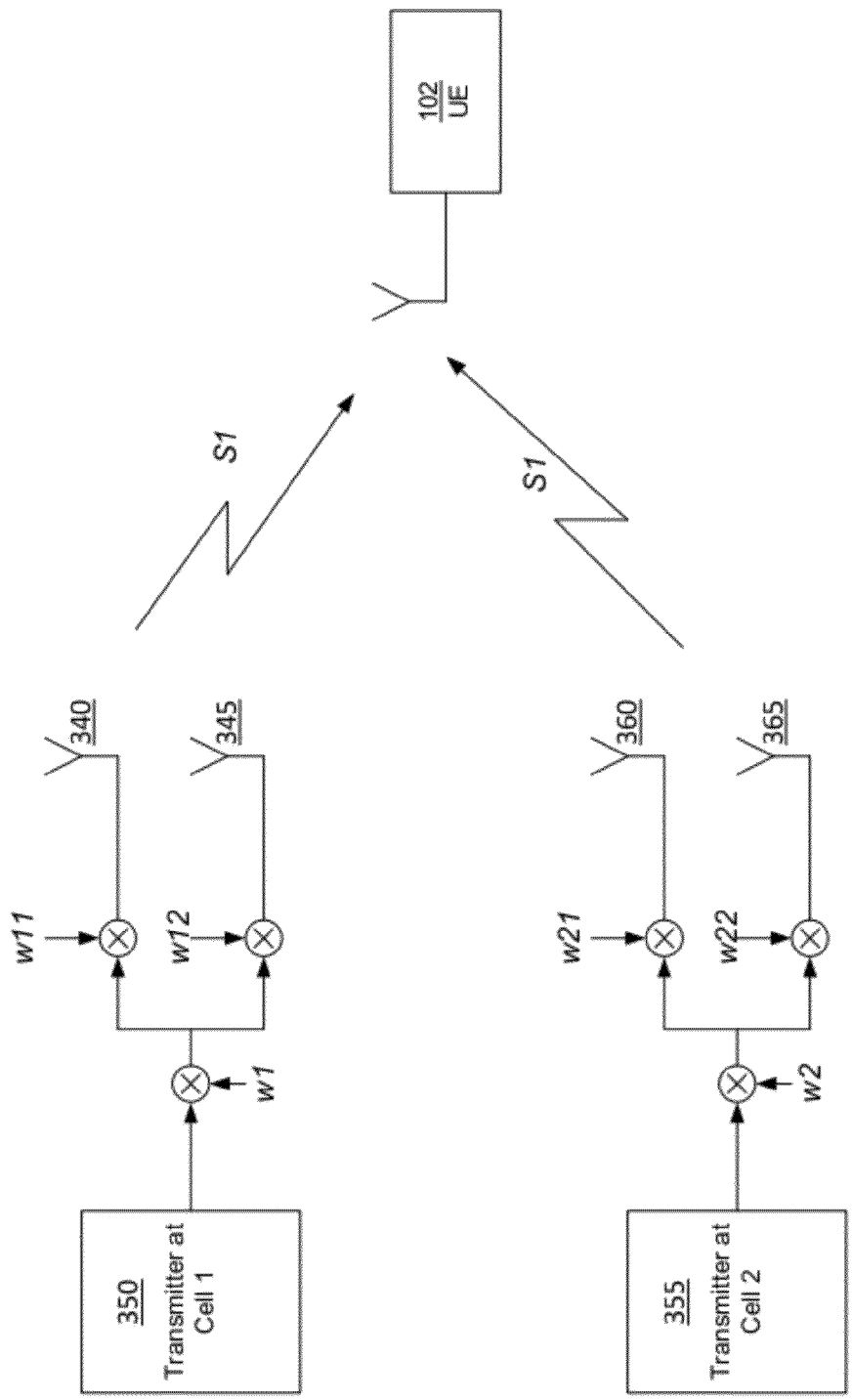
FIG. 6 depicts an example embodiment for joint transmission with global precoding when transmitter diversity may be configured.

FIG. 6 depicts an example embodiment for joint transmission with global precoding when transmitter diversity may be configured.

The multiple transmission (MP-HSDPA) techniques described herein may improve the UE throughput at the cell edge. For example, as part of coordinated operation among the multiple cells involved in the transmission, the precoding weights applied to the multiple antennas on each site may be jointly optimized. In addition, global precoding across multiple cells may also be possible for further performance enhancement.

Examples of how the precoding weights may be configured and designed in the context of MP-HSDPA are provided in the following paragraphs.

In one example embodiment, cross-cell precoding weight optimization may be performed. Different phase and possibly amplitude adjustment may be applied to transmitted signals at each individual cell to maximize the benefit of multipoint transmission. These adjustments are expressed mathematically as a complex precoding weight. Such operation may be referred to as cross-cell precoding as the optimization may be achieved by relying on the coordination among multiple cells.

In an example embodiment, cross-cell precoding may be performed for joint transmission, such as HS-SFN. FIG. 6 illustrates a diagram of an example system having joint transmission with global precoding when transmitter diversity may be configured. In FIG. 6, for each cell, such as transmitter cell 350 and transmitter cell 355, at least two antennas, such as antennas 340 and 345, may be used to support beamforming in downlink transmission with transmit diversity. Attennas 360 and 365 may also be used to support beamforming. Two sets of precoding weights, one for each cell, may be required for the purposed of realizing transmit diversity with multiple antennas. For example, precoding weights w11 and w12 may be used for transmitter cell 350, and precoding weights w21 and w22 may be used for transmitter cell 355. As both cells may transmit the same data in the MP-HSDPA configuration, it may be helpful to form another layer of transmitter diversity by applying additional phase or amplitude adjustments to each cell in addition to the antenna-specific precoding. The additional phase or amplitude adjustments may be jointly optimized across the multiple cells and may be realized by concatenating the global precoding weights, as denoted by w1 and w2 in FIG. 6.

Denoting the related precoding weights in a vector form:

$$W = \begin{bmatrix} w_1 \\ w_2 \end{bmatrix}, W^1 = \begin{bmatrix} w_{11} \\ w_{12} \end{bmatrix}, W^2 = \begin{bmatrix} w_{21} \\ w_{22} \end{bmatrix},$$

In one example embodiment, one of the criterions to find the optimal global precoding vector may be as follows:

$$W_{opt} = \operatorname*{argmax}_{W} W^H H^H HW$$

where H may be the cross-site CSI matrix, which is related to CSI matrix of each cell by:

$$H = [H_1 W^1 H_2 W^2]$$

To signal the selection of the precoding weights to Node B, a codebook-based method may be used as follows:

$$w_{11}, w_{21} = 1/\sqrt{2}$$

$$w_{12}, w_{22} \in \left\{ \frac{1+j}{\sqrt{2}}, \frac{1-j}{\sqrt{2}}, \frac{-1+j}{\sqrt{2}}, \frac{-1-j}{\sqrt{2}} \right\}$$

Additionally, the cross-cell precoding may be applied by using the same codebook above or with the one with finer granularity, for example:

$$w_1 = 1/\sqrt{2}$$

$$w_2 \in \left\{ \frac{e^{\frac{j(n-1)\pi}{8}}}{\sqrt{2}}, n = 1, 2, \ldots, 8 \right\}$$

Three sets of PCIs may need to be signaled to Node B in the uplink feedback: two for $w_{12}$ and $w_{22}$, and one for the cross-cell precoding coefficient $w_2$.

Figure 7:
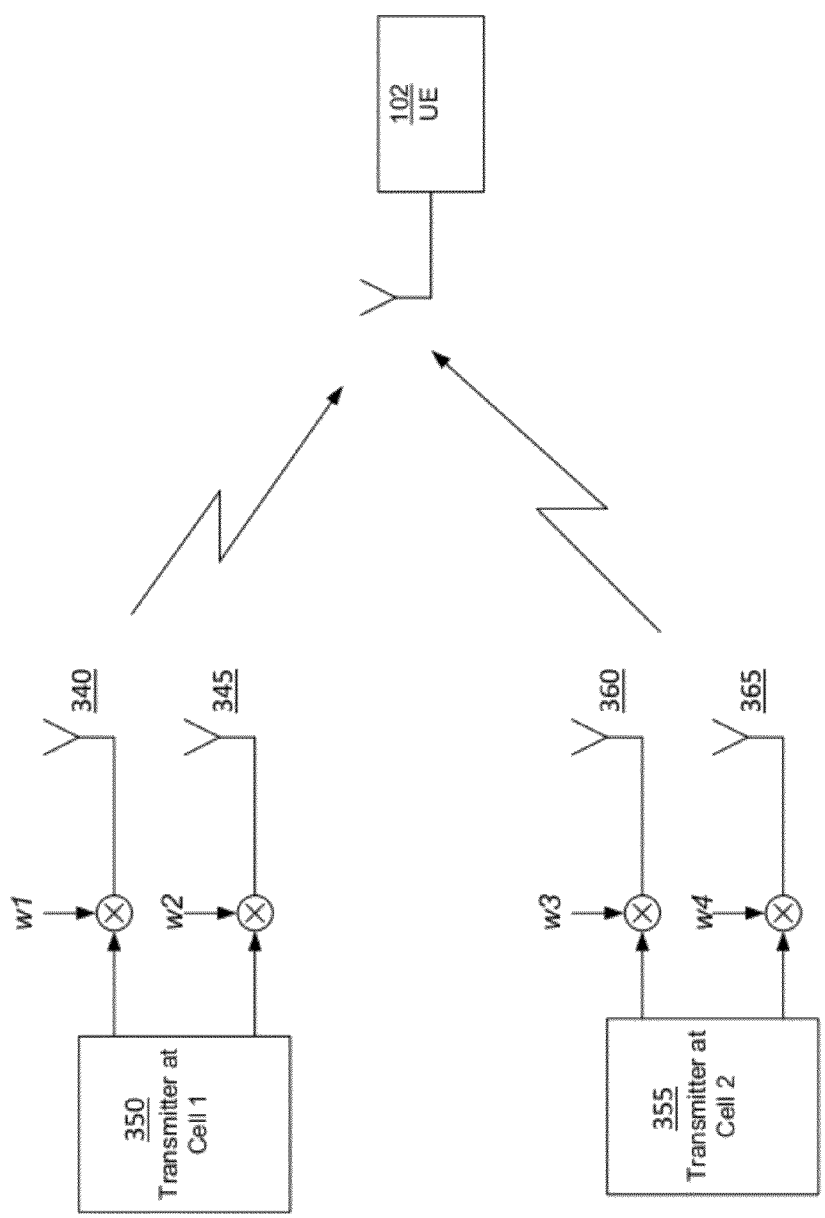
FIG. 7 depicts an example embodiment diagram for joint transmission with transmit diversity.

FIG. 7 depicts an example embodiment diagram for joint transmission with transmit diversity. In an embodiment, $w_1$ and $w_2$ may be combined into the antenna specific precoding weights and the resulting precoding may be denoted by $w_1$ $w_2$, $w_3$, $w_4$. Such a configuration is shown in FIG. 7, which illustrates a diagram of joint transmission with transmit diversity.

The value of the precoding weights may be selected from the codebook:

$$w_1 = 1/\sqrt{2}$$

$$w_2, w_3, w_4 \in \left\{ \frac{e^{\frac{j(n-1)\pi}{N}}}{\sqrt{2}}, n = 1, 2, \ldots, N \right\}$$

where N may be the codebook size.

Figure 8:
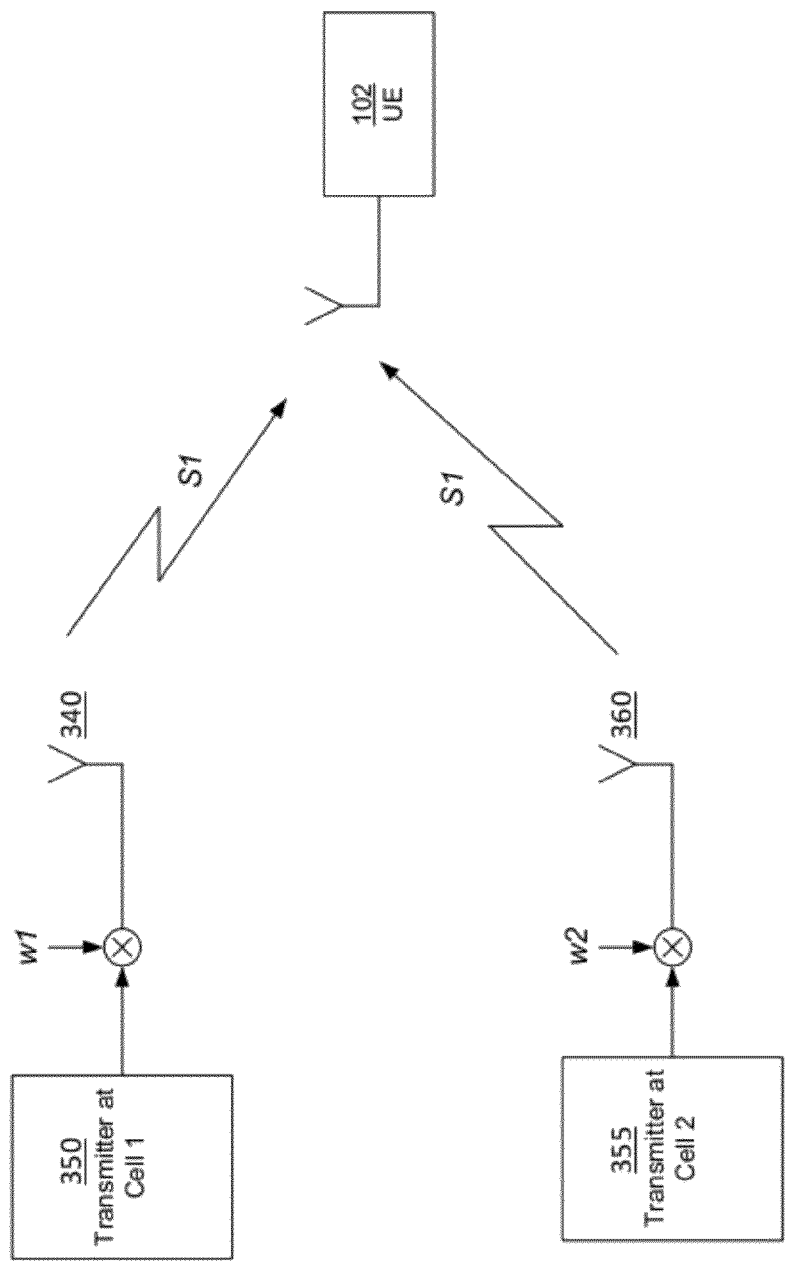
FIG. 8 depicts an example embodiment for cross-site transmit diversity with a single antenna at a cell.

FIG. 8 depicts an example embodiment for cross-site transmit diversity with a single antenna at a cell. When one antenna is configured in a cell, the cross-cell precoding weights may be determined by:

$$w_1 = 1/\sqrt{2}$$

$$w_2 \in \left\{ \frac{e^{\frac{j(n-1)\pi}{N}}}{\sqrt{2}}, n = 1, 2, \ldots, N \right\}$$

where N may be the codebook size. For example, N may be an integer calculated from the power of 2.

Figure 9:
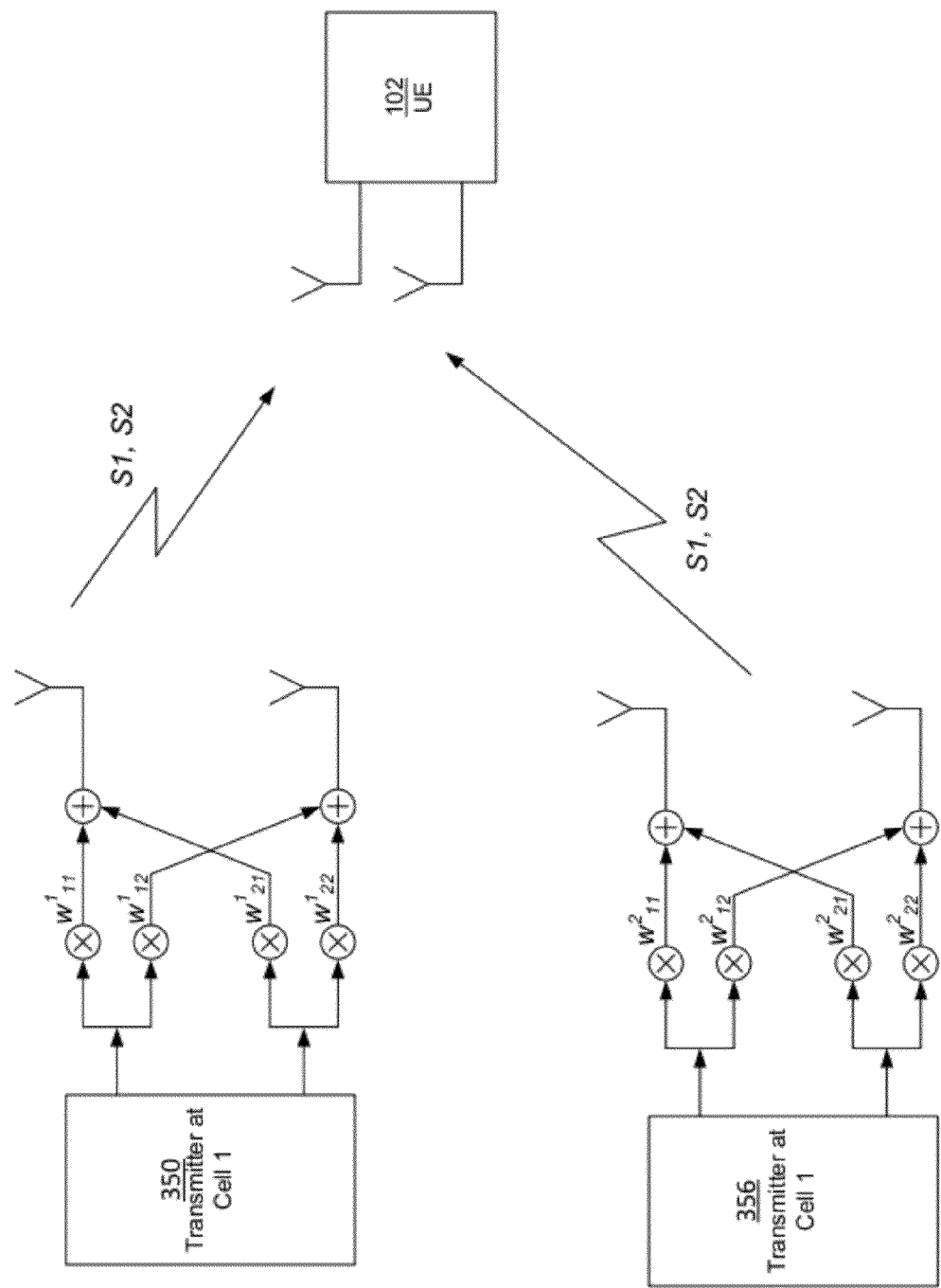
FIG. 9 depicts an example embodiment for joint transmission when the UE is configured in MIMO mode.

FIG. 9 depicts an example embodiment for joint transmission when the UE may be configured in MIMO mode. When the UE 102 may be configured in MIMO mode, where two streams of data, such as S1 and S2, may be transmitted, the joint transmission from multiple cells may still be realized in the embodiments disclosed herein. The two streams of data may be transmitted from transmitter 350, which may be a transmitter at cell 1, and transmitter 356, which may be a transmitter at cell 2. Referring to FIG. 9, while the same streams, S1 and S2, of data may be transmitted from different cells, two different sets of precoding weights may be applied to the antennas for each cell respectively.

The precoding weights for the two cells respectively, may be denoted by.

$$W^1 = \begin{bmatrix} w^1_{11} & w^1_{12} \\ w^1_{21} & w^1_{22} \end{bmatrix}, W^2 = \begin{bmatrix} w^2_{11} & w^2_{12} \\ w^2_{21} & w^2_{22} \end{bmatrix}$$

The precoding weights may be jointly optimized according to a specified optimum criterion. For example, the precoding weights may be chosen such that:

$$W = \operatorname*{argmax}_{W} tr(W^H H^H HW)$$

where:

$$W = \begin{bmatrix} W_1 \\ W_2 \end{bmatrix}, H = \begin{bmatrix} H_1 \\ H_2 \end{bmatrix},$$

with $H_1$ and $H_2$ being the CSI matrices of each cell respectively.

To facilitate a method to reduce the uplink feedback overhead, following codebook may be adopted:

$$w^1_{11} = 1/\sqrt{2}$$

$$w^1_{12}, w^2_{11}, w^2_{12} \in \left\{ \frac{1+j}{\sqrt{2}}, \frac{1-j}{\sqrt{2}}, \frac{-1+j}{\sqrt{2}}, \frac{-1-j}{\sqrt{2}} \right\}$$

Three complex precoding coefficients may need to be determined. Therefore, three sets of Precoding Control Indicators may need to be signaled to Node B to indicate the preferred selection. The rest of the precoding weights, $w_{21}^1, w_{22}^1, w_{21}^2$, $w_{22}^2$ may be chosen such that the vectors $$\begin{bmatrix} w^1_{21} \\ w^1_{22} \end{bmatrix}$$

is orthonormal to $$\begin{bmatrix} w_{11}^1 \\ w_{12}^1 \end{bmatrix} \text{ and } \begin{bmatrix} w_{21}^2 \\ w_{22}^2 \end{bmatrix}$$

is orthonormal to $$\begin{bmatrix} w_{11}^2 \\ w_{12}^2 \end{bmatrix}.$$

Figure 10:
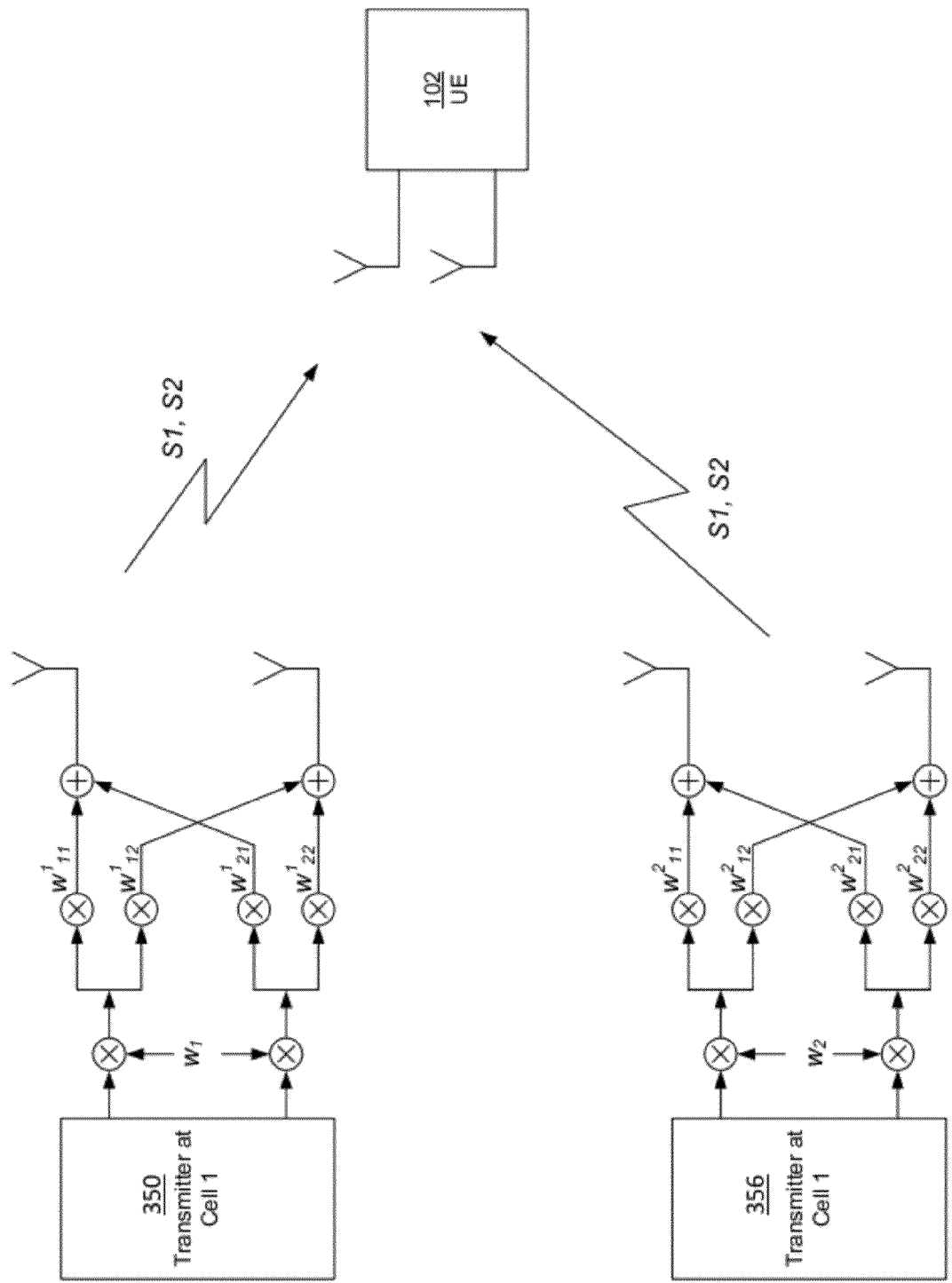
FIG. 10 depicts an example embodiment for joint transmission with cross-site precoding when the UE is configured in MIMO mode.

FIG. 10 depicts an example embodiment for joint transmission with cross-site precoding when the UE may be configured in MIMO mode. In an example embodiment, cross-site precoding adjustment may be added in addition to the MIMO precoding for each cell. Referring to FIG. 10, the MIMO precoding weights for each cell may be denoted as:

$$W^1 = \begin{bmatrix} w_{11}^1 & w_{12}^1 \\ w_{21}^1 & w_{22}^1 \end{bmatrix}, W^2 = \begin{bmatrix} w_{11}^2 & w_{12}^2 \\ w_{21}^2 & w_{22}^2 \end{bmatrix}$$

The precoding weights may be optimized individually for each. To determine the cross-site precoding weights, an optimal criterion may be used. For example, the cross-cell precoding coefficients may be selected by the rules:
1. $w_1 = 1/\sqrt{2}$
2. $w_2$ is chosen among $$\left\{ \frac{1+j}{\sqrt{2}}, \frac{1-j}{\sqrt{2}}, \frac{-1+j}{\sqrt{2}}, \frac{-1-j}{\sqrt{2}} \right\}$$

such that $$P = (w_1 H_1 W^1 + w_2 H_2 W^2)(w_1 H_1 W^1 + w_2 H_2 W^2)^H$$

may be maximized.

For the transmitter structure described above, three sets of PCIs may need to be reported to Node B: two for the MIMP precoding weights for each cell, and one for the cross-cell precoding.

In one example embodiment, transmit diversity may be used with multiflow aggregation schemes. For example, the transmitter structures shown with respect to FIG. 6 and FIG. 10 may be extended to the multiflow aggregation schemes, where different cells may transmit different data streams and these data streams may be aggregated at the UE to improve the downlink throughput.

Figure 11:
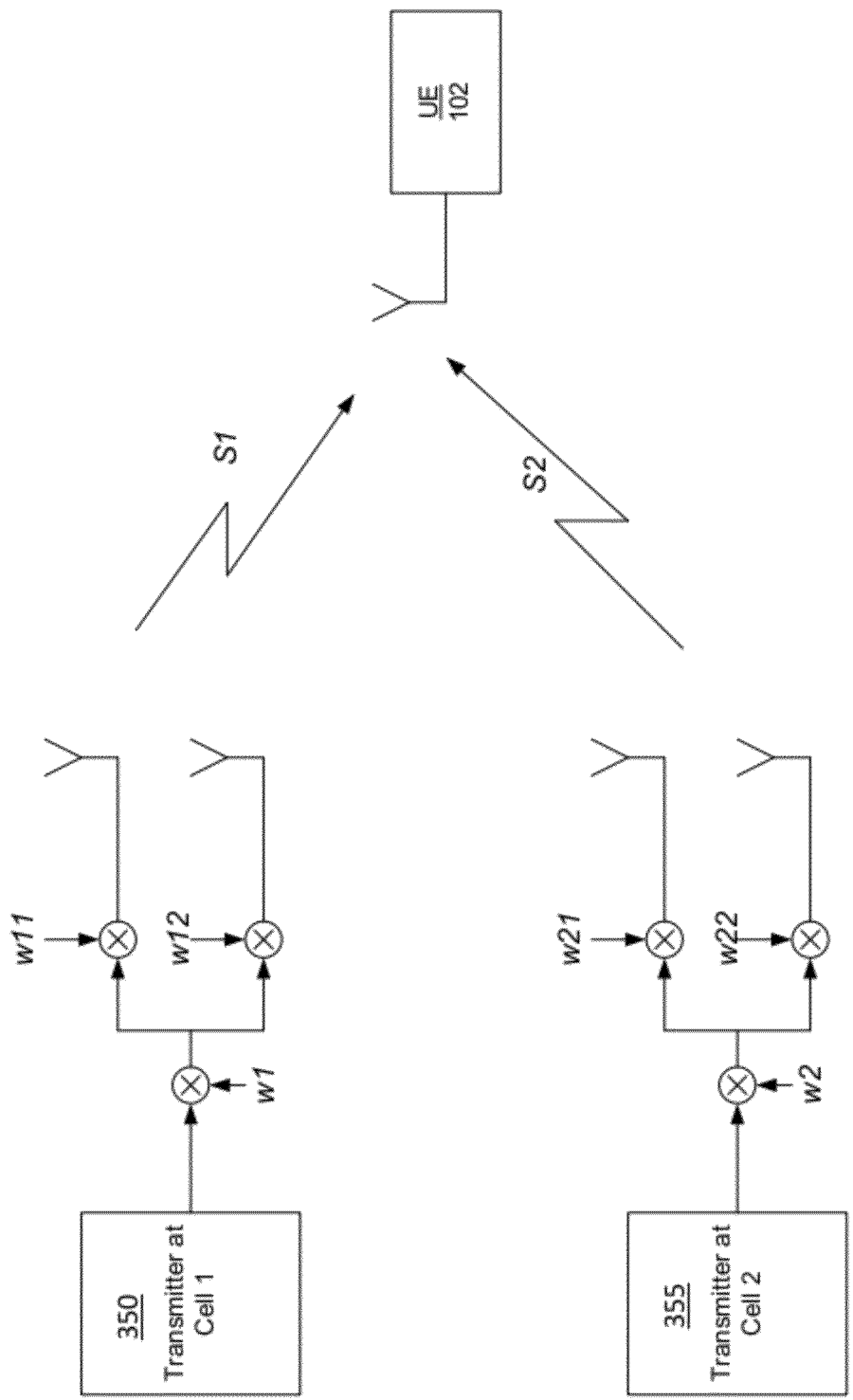
FIG. 11 depicts an example embodiment for multiflow aggregation with cross-site precoding when the UE is configured in TX diversity mode.

FIG. 11 depicts an example embodiment for multiflow aggregation with cross-site precoding when the UE 102 may be configured in TX diversity mode. As shown in FIG. 11, different cells may transmit different data streams, such as S1 and S2, and these data streams may be aggregated at the UE 102 to improve the downlink throughput. The resulting transmitter configurations may be used, for example, when UE 102 is configured in transmit diversity or MIMO mode.

Similar techniques of indicating preferred precoding weights as disclosed elsewhere herein may be used. Thus, three sets of PCI values may need to be signaled to Node B to indicate the UE selection.

Figure 12:
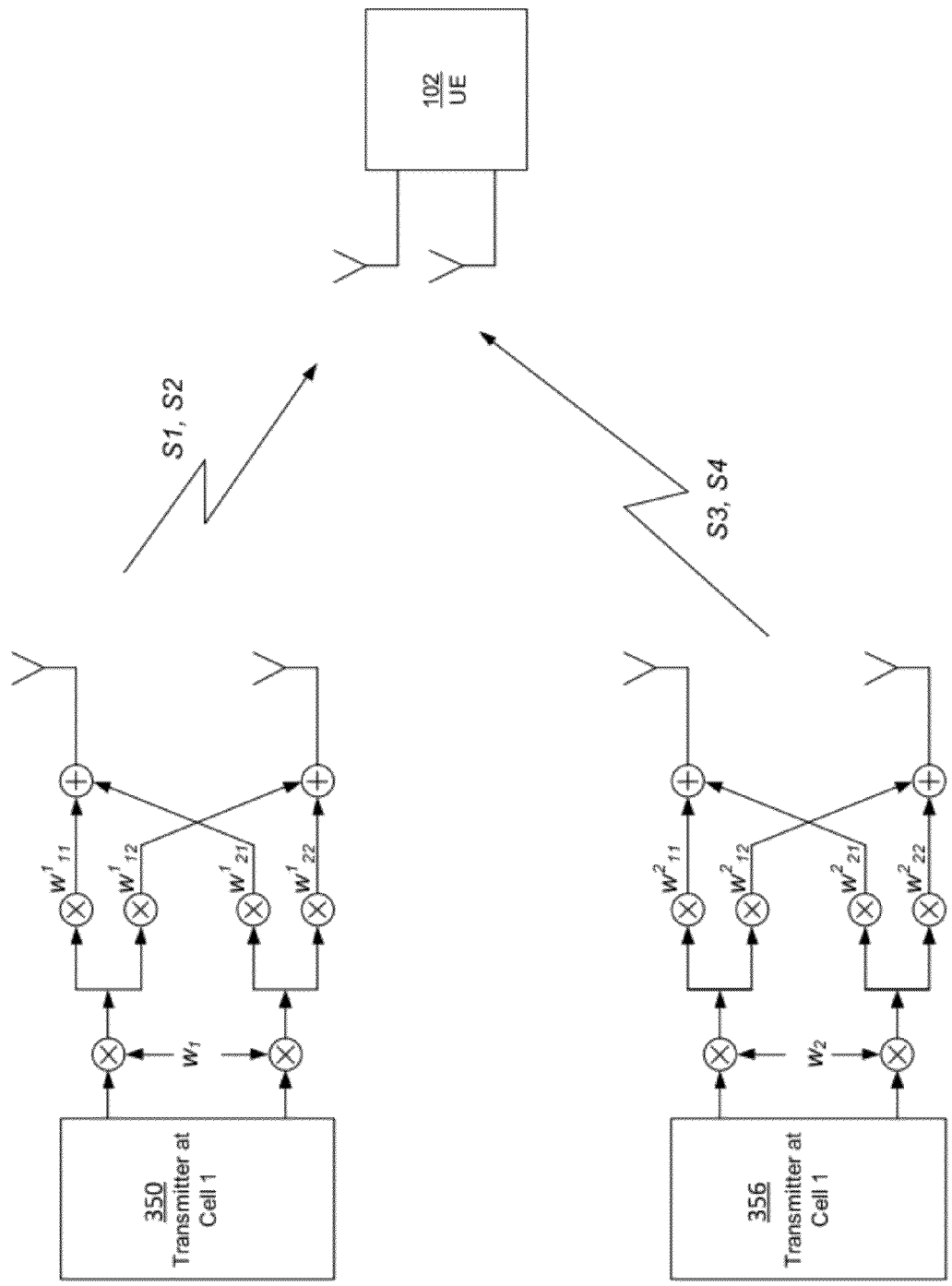
FIG. 12 depicts an example embodiment for multiflow aggregation with cross-site precoding when the UE is configured in MIMO mode.

FIG. 12 depicts an example embodiment for multiflow aggregation with cross-site precoding when the UE may be configured in MIMO mode. As shown in FIG. 12, different cells may transmit different data streams, such as S1, S2, S3, and S4. These data streams may be aggregated at the UE 102 to improve the downlink throughput. The resulting transmitter configurations may be used when UE 102 is configured in transmit diversity or MIMO mode.

Similar techniques of indicating preferred precoding weights as disclosed elsewhere herein may be used. Thus, three sets of PCI values may need to be signaled to Node B to indicate the UE selection.

In an example embodiment, cross-cell precoding weight optimization may be performed for beamforming. The concept of HS-DDTx for interference avoidance may be generalized to have more intelligent coordination when Node B is equipped with multiple antennas for beamforming. Instead of shutting down the transmission of the interfering cell, the scheduler of the Node B at the interfering cell may purposely steer its radio frequency (RF) beam away from the interfered UE such that the interference to this UE may be minimized.

Figure 13:
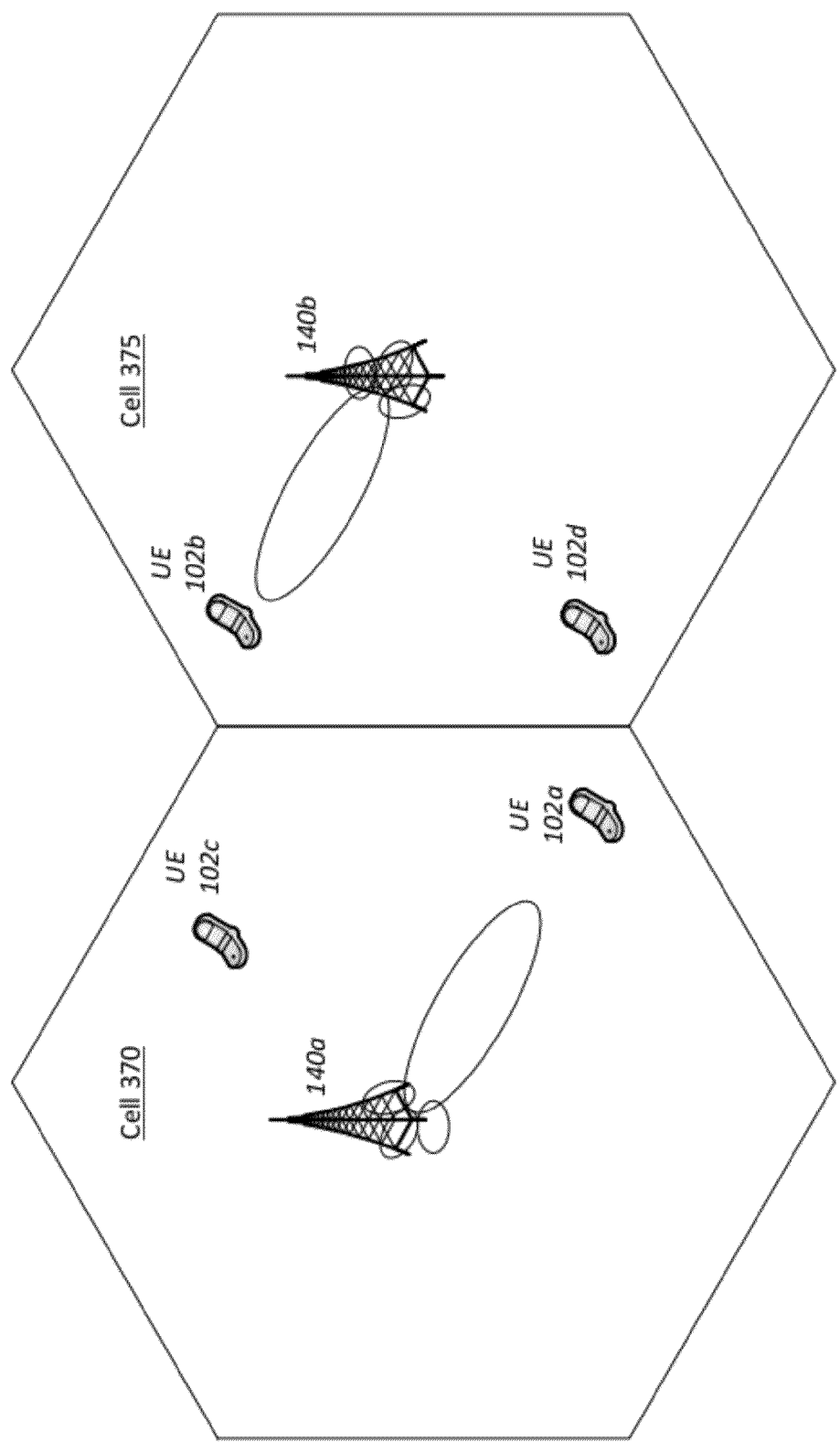
FIG. 13 depicts an example embodiment for coordinated beamforming.

FIG. 13 depicts an example embodiment for coordinated beamforming. As shown in FIG. 13, if Node B 140b at Cell 375 is aware of the transmission from Node B 140a at Cell 370 to UE 102a, it may purposely schedule data to UE102b. If both cell 370 and cell 375 are scheduling data for UE 102a and UE 102d, the cross interference may be more significant. To assist the coordinated beamforming, a UE may need to indicate its positions relative to its own serving cell and the interfering cell. This location information may be extracted from the precoding weights. Thus, the UE may be required to report the PCI for its own serving cell and an assistive PCI that indicates the most un-preferred precoding value for the interference cell. In addition, another assistive PCI may also be needed to indicate which neighboring cell creates dominant interference.

Three sets of PCIs may be necessary for the coordinated beamforming operation: one for serving cell, one for the interference cell, and one to indicate which neighboring cell may be involved in the coordination.

In one example embodiment, a new precoding control indication may be specified. As disclosed herein, a new PCI definition may be provided for the cross-cell precoding. For example, the UE may use the CPICH(s) transmitted from the primary serving cell and secondary serving cell to calculate the preferred cross-cell precoding vectors to be applied at Node Bs to maximize the aggregate transport block size that may be supported under current channel conditions. No matter whether one or two transport blocks are preferred, it may be sufficient to signal from the UE to the Node Bs the preferred primary precoding vector $(w_1^{pref}, w_2^{pref})$, sine the secondary precoding vector may be a function of the primary one. When single-stream restriction is not configured, the information on whether one or two transport blocks are preferred may be part of the CQI reporting. Since the first precoding weight $w_1^{pref}$ of the preferred primary precoding vector $(w_1^{pref}, w_2^{pref})$ may be constant, it may be sufficient to determine the precoding weight for the secondary cell. In each TTI during which the UE derives a composite PCI/CQI report, the UE may calculate the optimum precoding weight $w_2^{pref}$ for secondary serving cell, which may be taken from the set:

$$w_2^{pref} \in \left\{ \frac{1+j}{\sqrt{2}}, \frac{1-j}{\sqrt{2}}, \frac{-1+j}{\sqrt{2}}, \frac{-1-j}{\sqrt{2}} \right\}.$$

The precoding weight $w_2^{pref}$ may be mapped to PCI values as defined in the below table:

TABLE 2

Mapping of preferred precoding weight $w_2^{pref}$ to PCI values

| $w_2^{pref}$ | PCI values |
|---|---|
| $\frac{1+j}{2}$ | 0 |
| $\frac{1-j}{2}$ | 1 |
| $\frac{-1+j}{2}$ | 2 |
| $\frac{-1-j}{2}$ | 3 |

Support of the coordinated beamforming may require an assistive PCI to indicate the dominant interfering cell. An example of specifying the new PCI definition may provide that the UE may use the CPICH(s) transmitted from the cells in the neighbor to the primary serving cell and find the strongest in power. The label of this cell may be indicated by the assistive PCI values as defined in the following table:

TABLE 3

Mapping of Cell label to assistive PCI values

| Cell label | PCI value |
|---|---|
| Reserved | 0 |
| $1^{st}$ | 1 |
| $2^{nd}$ | 2 |
| $3^{rd}$ | 3 |

Uplink Feedback Design

In an example embodiment, an uplink feedback channel may be designed for MP-HSDPA. As described above, multiple CQI reports may be generated at the UE in order to provide sufficient information to the network to maximize the gain in the coordinated multiple cell HSDPA transmission. The ACK/NACK information may increase due to simultaneous downlink data transmission from multiple cells. As there may be one HS-DPCCH physical uplink feedback channel available at the single frequency uplink transmission, HS-DPCCH may need to be configured for MP-HSDPA. Although the following paragraphs may focus on dual cell operation for simplicity of presentation, the embodiments disclosed may be used in multiple cell scenarios.

Table 4 summarizes the CQI and HARQ-ACK information that the HS-DPCCH physical channel may need to carry when two cells are involved in MP-HSDPA downlink transmission.

TABLE 4

Feedback information for MP-HSDPA

| SF-MC Technologies | CQIs | Number of CQIs | ACK/NACKs | Number of HARQ-ACKs |
|---|---|---|---|---|
| HS-DDTx | $CQI_{IA}$, $CQI_{NA}$ | 2 | HARQ-ACK | 1 |
| MF | CQI1, CQI2 | 2 | HARQ-ACK1, HARQ-ACK2 | 2 |
| HS-SFN | $CQI_{SE}$, $CQI_{INT}$ | 2 | HARQ-ACK | 1 |

TABLE 4-continued

Feedback information for MP-HSDPA

| SF-MC Technologies | CQIs | Number of CQIs | ACK/NACKs | Number of HARQ-ACKs |
|---|---|---|---|---|
| DSS | $CQI1_{IA}$, $CQI1_{INT}$, $CQI2_{IA}$, $CQI2_{INT}$ | 4 | HARQ-ACK | 1 |

Note that TTIs and sub-frames may be used interchangeably throughout the present disclosure.

In one example embodiment, HS-DPCCH may be designed for CQI reports. For ease of discussion, the types of CQIs that may be used in the feedback design are not distinguished. Accordingly, the CQI reports are denoted by CQI1, CQI2, ..., CQIN, where N may be the number total of CQI reports that may need to be carried in the HS-DPCCH.

In one example embodiment, the proposed CQI coding schemes from 3GPP standard releases may be reused such that each of the CQIs may be independently coded using existing coding schemes in Table 4 and Table 5.

TABLE 5

CQI encoding using existing coding schemes

| CQI types | Coding schemes | Codeword length | Coded bits |
|---|---|---|---|
| non-MIMO CQI report | (20.5) Reed Muller coding | 20 | 5 |
| MIMO Type A CQI report | (20.10) Reed Muller coding | 20 | 10 |
| MIMO Type B CQI report | (20.7) Reed Muller coding | 20 | 7 |

In another example embodiment, two CQI reports may be jointly coded by (20,10) Reed Muller coder for non-MIMO cases.

As disclosed below, a number of implementations may be used to carry the multiple CQI/PCI reports in a single HS-DPCCH In an example embodiment, HS-DPCCH frame structure may be used with a single CQI field. For example, HS-DPCCH physical channel may maintain the slot format 0 with SF=256, in which a CQI field may take two time slots. The multiple CQI reports may be transmitted with a Time Division Multiplexing (TDM) approach, i.e., they may be carried in different sub-frames.

Figure 14:
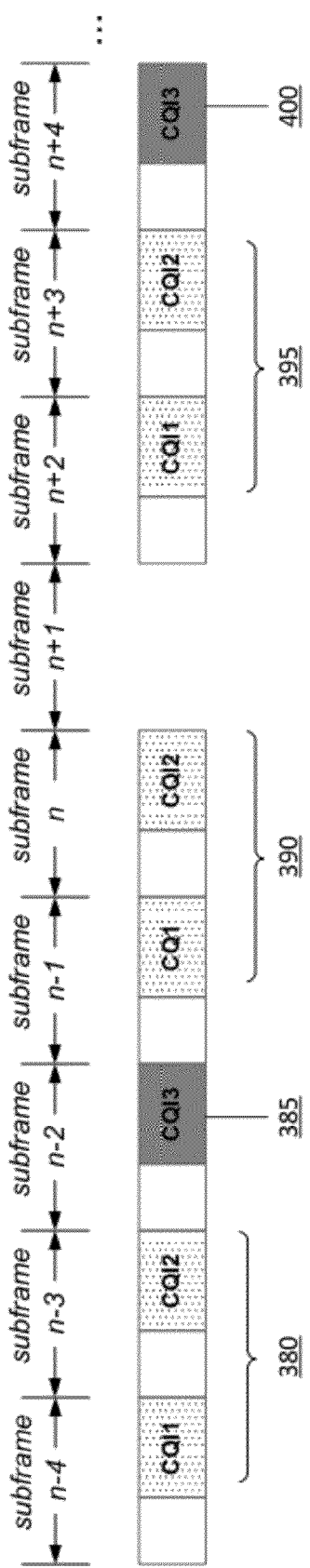
FIG. 14 depicts an example embodiment for TDM based CQI feedback with different CQI feedback cycles.

In an example embodiment for TDM based CQI, multiple feedback cycles may be used such that the CQI reports may be divided into groups with each being configured with different CQI feedback cycles. This may be done, for example, to reduce the feedback overhead. The CQI reports in the group with fast feedback cycle may be used to indicate the channel quality for active cells that may be transmitting data, while the group with slower feedback cycle may be used for monitoring purposes for the rest of cells in the active set. For example, as shown in FIG. 14 for N=3, CQI1 and CQI2 are grouped together to have feedback cycle equal to 3 sub-frames, shown at 380, 390, and 395, while CQI3 has feedback cycle of 6 sub-frames, shown at 385 and 400.

Figure 15:
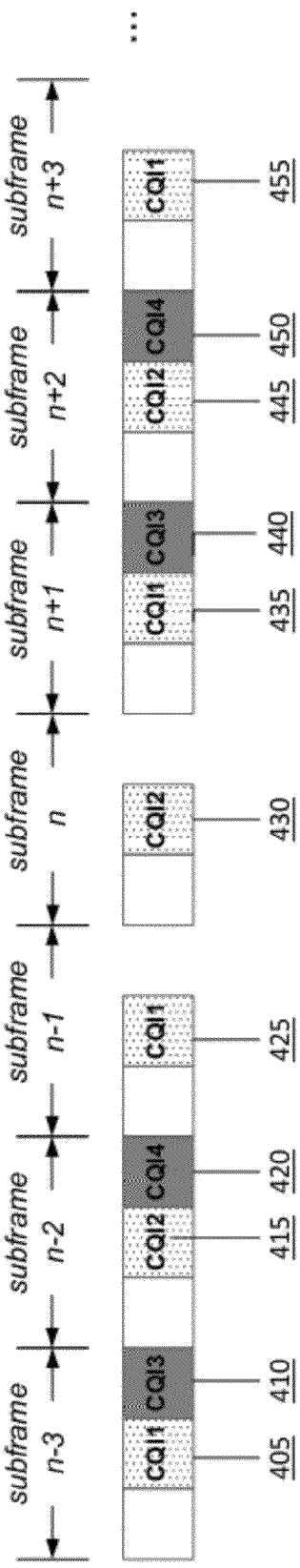
FIG. 15 depicts an example embodiment for dual CQI field HS-DPCCH design with two CQI feedback cycles.

FIG. 15 depicts an example embodiment for dual CQI field HS-DPCCH design with two CQI feedback cycles. The HS-DPCCH frame structure may be designed for Dual CQI fields For example, HS-DPCCH physical channel may maintain the slot format 1 with SF=128, in which a CQI field may take one time slot and dual CQI fields may be allocated in a sub-frame.

If N=2, the CQI reports may be transmitted on each of the CQI fields in a sub-frame. For N≥2, the CQI reports may be divided into two groups, with each being allocated to one CQI field. Time Division Multiplexing (TDM) may be used if more than one CQI report in a group needs to be allocated in the HS-DPCCH. Either one or two feedback cycles may be assigned to each of the CQI groups respectively. As illustrated in FIG. 15, the CQI reports grouped in the set with fast feedback cycle may be used to indicate the channel quality for active cells that may be transmitting data, while the set with slower feedback cycle may be used for monitoring purposes for the rest of the cells in the active set. For example, CQI1 and CQI2 may be transmitted with a feedback cycle of 2 sub-frames as shown at 405, 415, 425, 430, 435, 445, and 455. CQI3 and CQI4 may be transmitted with a feedback cycle of 4 sub-frames as shown at 410, 420, 440, and 450. The CQI reports may also be further divided into more than two groups with multiple feedback cycles associated.

Figure 16:
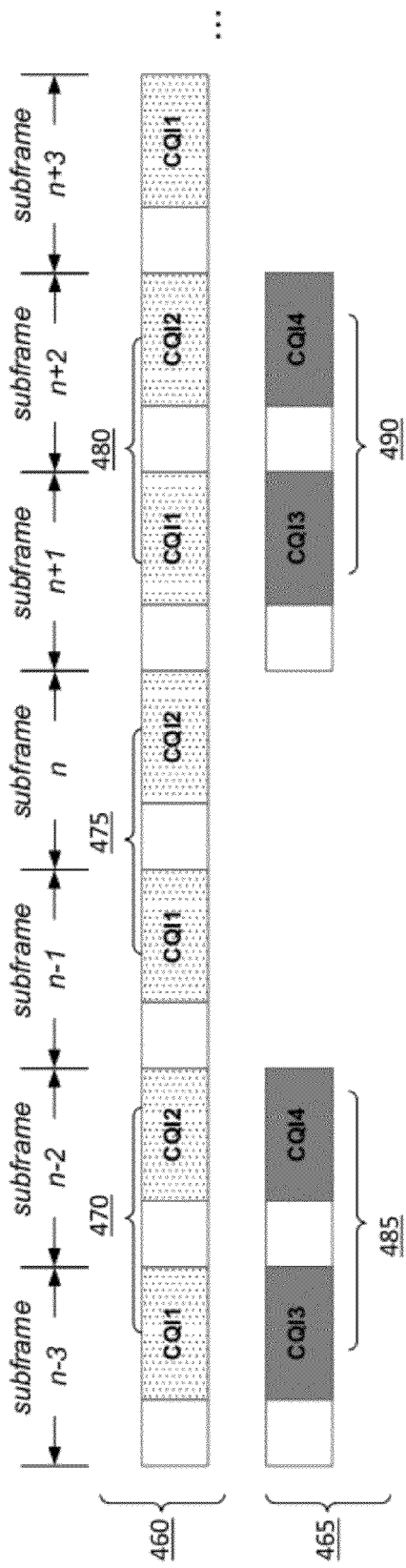
FIG. 16 depicts an example embodiment for dual channelization code HS-DPCCH design with two CQI feedback cycles.

FIG. 16 depicts an example embodiment for dual channelization code HS-DPCCH design with two CQI feedback cycles. The HS-DPCCH frame structured may be designed for dual channelization codes. For example, HS-DPCCH physical channel may maintain the slot format 0 with SF=256, in which a CQI field may take two time slots. In addition, another channelization code with SF=256 may be used to facilitate a new feedback channel, such as 465. If N=2, the CQI reports may be transmitted on each of the channelization codes. If N>2, the CQI reports may be divided into two groups, with each of which being allocated to one channelization code. Time Division Multiplexing (TDM) may be used if more than one CQI report in a group needs to be allocated. The concept of multiple CQI feedback cycles described above may also apply here. As illustrated in FIG. 16, a dual channelization code HS-DPCCH design may be used with two CQI feedback cycles. For example, CQI1 and CQI2 may be transmitted with a feedback cycle of 2 sub-frames as shown at 470, 475, and 480. CQI3 and CQI4 may be transmitted with a feedback cycle of 4 sub-frames as shown at 485 and 490.

In another example embodiment, multiple CQI reports may be performed with joint encoding. For example, HS-DPCCH physical channel structure and CQI reporting procedure may remain unchanged. To accommodate the multiple types of CQI reports required by MP-HSDPA, the additional CQI information may be packed with the conventional CQI and transmitted together. In other words, the channel coding with higher encoded bits may be used to jointly encode two CQIs while still maintaining the same 20 bit message length. Examples of such implementation are given as follows:

Rather than be encoded by the (20, 5) Reed Muller coding, the non-MIMO CQI message may be encoded by (20, 10) channel coding, which may comprise two CQIs, each of which may be 5 bits of length. The (20,10) channel coding may be the same one specified in 3GPP TS 25.212 (entitled, "Multiplexing and channel coding (FDD)") for Type A CQI. Optionally, (20,7) channel coding may be used, with 2 bits allocated for the second CQI. The (20,7) channel coding may be the same one as specified in 3GPP TS 25.212 for Type B CQI.

Rather than be encoded by the (20, 7) coding scheme, the Type B CQI message may be encoded by (20, 10) channel coding, which may comprise two CQIs, with the additional 3 bits assigned to second CQI. The (20,10) channel coding may be the same one specified in 3GPP TS 25.212 for Type A CQI.

For Type A CQI may maintain its format unchanged without sending the additional CQI information, or Type A CQI may be designed with a higher rate encoding scheme to accommodate more bits. For example, a (20, 13) channel coding may be introduced to include the second CQI of 3 bits.

From the aforementioned embodiment, it may be seen that the second CQI may be of shorter length if the existing channel coding schemes in the standard is to be reused. For MP-HSDPA operation, it may be considered sufficient accounting for the fact that the two types of CQIs may possibly be correlated, as the difference may represent the gain due to the inference avoidance or signal enhancement. To effectively make use of the second CQI of shorter length, the second CQI may represent different formats of information:

Incremental with reference to the first CQI encoded in the same message. For example, the additional bits may be interpreted as an offset. The second CQI may be calculated at the network by adjusting the first CQI based on the offset.

Coarse Index to the channel quality with larger granularity.

In one example embodiment, multiple PCI reports may be created. In the multiple cell/point transmission operation involving use of multiple antennas, particularly for HS-SFN, situations may occur that the network needs to be informed about the UE-preferred precoding weights respectively for two cells even though only one CQI may be required because the signals from the two cells may be combined to form only one downlink. Therefore, it may be necessary to report two PCIs and one CQI via the uplink feedback channel.

The following embodiments may be used to report multiple PCIs:

The type B CQI may be encode by (20,10) coding scheme, or (20,9) coding scheme derived from (20,10). The addition bits can be used for reporting the PCI for the secondary cell.

The two PCIs may be signaled in a TDM fashion in two sub-frames. For example, in even numbered sub-frame, PCI for the primary cell may be carried in the CQI/PCI message, and in odd numbered sub-frames, PCI for the secondary cell may be reported.

In an example embodiment, CQIs may be identified by specifying CQI reporting patterns. When transmitted via the uplink feedback physical channel, different types of CQIs may be identified by defining one or more reporting patterns that have the CQI/PCIs prearranged in a specific way across the sub-frames. These patterns may be known to both UE and Node B. Thus, once use of a particular reporting pattern and the timing starting the pattern is configured, the Node B may be able to identify the correct type of CQIs it receives based on the sub-frame number.

An example way to define the CQI reporting pattern may be to introduce a formula that uses a sub-frame number as an identifier. Because CFN (consecutive frame number associated to DPCH) may already be implemented in the existing HSPA cellular systems for labeling the radio frames, it may be readily related the sub-frame numbers by:

$$n = 5 \times CFN + \left\lfloor m \times \frac{256}{7680} \right\rfloor$$

where m reflects the timing relation of each sub-frames of HS-DPCCH in a radio frame to the boundary of uplink DPCH. It may take one of a set of five possible values depending on the transmission timing of HS-DSCH relative to the DPCH boundary.

In an embodiment, a formula-based CQI reporting pattern may be defined based on the sub-frame number with which the CQI may be reported. For example, if a set of conditions is met when calculating a formula specially designed for a particular type of CQI, this type of CQI may be reported.

One example may be given as follows:
1. Assume J types of CQI/PCI are to be reported, and N_cqi_Type1, N_cqi_Type2, ..., N_cqi_TypeJ are the number of each type of CQIs desired to transmit among M_cqi sub-frames.
2. if m fulfills $$\left(5 \times CFN + \left\lfloor m \times \frac{256 \text{ chip}}{7680 \text{ chip}} \right\rfloor \right) \bmod k' = 0$$

the UE shall transmit the CQI or composite PCI/CQI value(s).
3. if m fulfills $$\left\lfloor \frac{5 \times CFN + \left\lfloor m \times \frac{256 \text{ chip}}{7680 \text{ chip}} \right\rfloor}{k'} \right\rfloor \bmod M_{cqi} < \text{N\_cqi\_type\_1}$$

the UE shall report a type 1 CQI, or if $$\text{N\_cqi\_type\_}(j-1) \le$$

$$\left\lfloor \frac{5 \times CFN + \left\lfloor m \times \frac{256 \text{ chip}}{7680 \text{ chip}} \right\rfloor}{k'} \right\rfloor \bmod M_{cqi} < \text{N\_cqi\_type\_j}$$

holds, the UE shall report a type j CQI.
Where in the formula:
k' is the CQI feedback cycle represented in sub-frames
values of m is calculated
$\lfloor x \rfloor$ and $\lceil x \rceil$ represent the closest integers to x, from below or above respectively.

Note if UE may be configured with MIMO operation, the above embodiment may also be applicable where type A or and type B may be treated as one among the J types defined above.

The set of parameters used above in specifying the CQI reporting pattern, N_cqi_Type1, ..., N_cqi_TypeJ, and Mcqi, may be predefined or pre-configured by network via higher layers. To accommodate different needs at different application scenarios, the network may also configure multiple sets of such parameters, use of which may be instructed by the network via L1 or higher layer commands, or triggered by certain conditions.

Simultaneous use of mixed CQI reporting pattern may be utilized. As a result, the CQI report may sometimes conflict in a sub-frame. In this case, rules may be specified that one CQI reporting pattern may have higher priority so it may override other CQIs generated by other patterns if the conflict occurs. In another example embodiment, different types of CQIs may be prioritized such that CQI type with higher priority may be override the lower one.

CQI reporting patterns with different CQI feedback cycles (specified by k' in the formula) may also be configured and used simultaneously. For example, the CQI/PCIs to be reported frequently may be assigned to a short CQI feedback cycle and the CQI/PCIs with less variation in time may be associated with a longer feedback cycle. When a conflict of the two reporting patterns occurs in a sub-frame, rules may be set in such way that the long term CQI/PCI may be selected to transmit because it may come in less often, or the short-term CQI/PCI may be reported as it may be more important.

Note that CQI and PCI may be decoupled in their type definitions, which may mean that CQI and PCI may not always be combined with the same types to form the composite CQI/PCI. This flexibility of allowing variable types in the CQI and PCI pair may give the possibility of using individual reporting patterns or feedback cycles respectively for CQI and PCI reports even if they are combined to transmit.

In one example embodiment, specifying the CQI/PCI reporting pattern may be performed by using a defined table that shows sequential arrangement of various types of CQI/PCIs across multiple sub-frames. This table may be pre-defined by standard agreement or pre-configured by the network. For example, assuming type 1 and type 2 CQI/PCI may be the CQI/PCIs that need to be reported frequently and type 3 CQI/PCI may be for long term use, the reporting pattern may be defined as follows:

TABLE 6

An example of the CQI reporting pattern definition

| Sub-frame 1 | Sub-frame 2 | Sub-frame 3 | Sub-frame 4 | Sub-frame 5 |
|---|---|---|---|---|
| Type 1 | Type 2 | Type 1 | Type 2 | Type 3 |

In another embodiment, the following may be used to specify the CQP reporting pattern when the UE is configured in MP mode:
1) The UE may derive the PCI/CQI value for the serving HS-DSCH cell.
   If MP_Active is not 0 and Secondary_Cell_Active is not 0, the UE may also derive a CQI/PCI value(s) for the activated secondary serving HS-DSCH cells as defined in subclause 6A.2.1 of 3GPP TS 25.214.
   The CQI report(s) are constructed from the CQI/PCI value(s).
2) For k=0, the UE may not transmit the CQI/PCI report(s). For k>0 when DTX_DRX_STATUS is not TRUE, the UE may transmit the CQI/PCI report containing the CQI value for the serving HS-DSCH cell in each subframe that starts m×256 chips after the start of the associated uplink DPCCH frame with m fulfilling:

(5×CFN+⌊m×256 chip/7680 chip⌋)mod k'=0 with k'=k/(2 ms), where CFN denotes the connection frame number for the associated DPCH and the set of five possible values of m may be calculated as described in subclause 7.7 in R1-104157, which is entitled "On deploying DC-HSDPA UEs in Single Frequency Networks", and is written by Qualcomm Incorporated.
3) The UE may repeat the transmission of the CQI/PCI report containing the CQI/PCI value for the serving HS-DSCH cell derived in 1) over the next (N_cqi_transmit−1) consecutive HS-DPCCH sub frames in the slots respectively allocated to the CQI/PCI as defined in R1-104157. The UE may not support the case of k'<N_cqi_transmit.
4) If additional CQI/PCI reports are derived in 1), the UE may transmit this CQI/PCI reports according to a sequence specified in Table and repeat each of types of CQI/PCIs next N_cqi_transmit times following the transmission of the CQI/PCI report in 2) and 3). The UE may not support the case of k'<2·N_cqi_transmit.

5) The UE may not transmit CQI/PCI reports in other subframes than those described in 2), 3) and 4).

In another embodiment, if two types of CQIs are sent using a TDM approach over different sub-frames, one type of CQIs may be reported at even sub-frames and the other type of CQIs may be reported in the odd sub-frames. For example, the first type of CQI may be sent in the even numbered sub-frames, and the second type of CQI may be sent in the odd numbered sub-frames.

In another example embodiment, CQIs may be identified using different channelization codes or CQI fields. For example, if dual channelization code or dual CQI field HS-DPCCH frame structure, which are described above, are used, one type of CQI may be associated to one specific channelization code or one CQI field. Thus, the CQI type may be identified by where it is being transmitted.

In another embodiment, the CQI reporting may be network controlled. For example, the network may send a control signal, for example via L1 in a dynamic manner or over a higher layer in a semi-static manner, to control what type of CQIs may be transmitted. For example, a new order in HS-SCCH may be introduced that may be sent to UE to specifically indicate what type of CQI the network may be expecting. This embodiment may give the network the full control of the UE behavior on the CQI reporting.

In an example, the network may also configure the UE with multiple CQI/PCI reporting patterns with different CQI feedback cycles. These reporting patterns may be dynamically switched as instructed by the network via either L1 or higher layer signaling as mentioned above. A periodic CQI/PCI reporting may be also be supported by the network control signaling where the UE may transmit an on-demand CQI/PCI or a sequence of CQI/PCIs of specific types upon receiving the request from the network.

In one example embodiment, CQI reporting may be triggered. The CQI/PCIs required to support multiple point transmission as previously described herein may not need to be reported to the network at certain times. This may reduce signaling overhead. Transmitting these CQI/PCIs may be triggered at the UE by certain conditions. The triggering criterions to report the MP CQIs may include one or combination of the following:

CQI measured from the signal to the serving cell may be below a threshold, which may be pre-defined or pre-configured by network via higher layer signaling
  Alternatively, the received signal level (e.g. RSCP) or quality (e.g. Ec/Io) of a reference DL channel (e.g., CPICH) of the serving cell may be compared to a threshold, which may be optionally obtained by adding a offset to a value pre-determined or signaled by higher layers.
CQI measured from the signal to a non-serving cell in the active set may be above threshold
  In one embodiment, the received signal level (e.g. RSCP) or quality (e.g. Ec/Io) of a reference DL channel (e.g. CPICH) from non-serving cell may be compared to a threshold, which may be obtained by adding a offset to a value pre-determined or signaled by higher layers
The difference in CQI perceived between the serving cell and a non-serving cell may be below a threshold.
  In one embodiment, the difference in received signal level (e.g. RSCP) or quality (e.g. Ec/Io) of a reference DL channel (e.g. CPICH) from a serving cell and a non-serving cell may be compared to a threshold, which may be optionally obtained by adding a offset to a value pre-determined or signaled by higher layers Based on RRC measurement triggering events. For example, after UE reports event 1a and before event 1b, and the best CQI measured from the signal to non-serving cells in the active set may be above a threshold
The UE may be configured to operate in softer or softer handover mode.
The reporting of CQI information may be triggered by the network
  dynamic via L1 signaling: HS-SCCH order
  Semi-dynamic via MAC signaling.
  Semi-static via RRC signaling.
Based on downlink traffic activity. For example, the UE could trigger transmission of CQI upon reception of HS-SCCH in the DL where the UE successfully decodes its address in a non-serving cell.
  Alternatively, the UE could trigger transmission of CQI based on successful decoding of a specific identifier on HS-SCCH transmitted from any cell in an active set.

It is noted that in the following, the CQI field being trigged for reporting may include information for CQI, or PCI, or both CQI and PCI.

In one example embodiment, HS-DPCCH may be designed for HARQ-ACK feedback. For example, multiple HARQ-ACKs may be used for single frequency multiflow (MF) transmission. The design objective for inter-site and intra-site cells may need to be addressed. Therefore, they are treated separately herein.

When designing inter-site HS-DPCCH, the two cells may not be synchronized due to asynchronous nature of the UMTS system. For inter-site cells, a synchronized clock may not be assumed. As result, there may be a varying time offset between the two frame boundaries, and the sub-frames may be drifting away from each other during a certain time period because the system clocks are from different sources. Design of a single uplink feedback in such asynchronous environment may be difficult because it may be difficult to meet the timing needs from both downlink transmissions. Such a design may place very tight constraints to the UE implementation in order to meet the timing needs for two different frame boundaries.

System and method embodiments may apply a technique to have the ACK/NACK feedbacks for the two cells encoded independently, and to have two HS-DPCCH fields independent configured, with each of which being synchronized to its associated downlink frame boundary. The concept of two HS-DPCCH fields in a sub-frame may be implemented in different ways in accordance with embodiments as described herein below.

For example, the HS-DPCCH frame structure may include dual channelization codes. In an embodiment, the HS-DPCCH physical channel may maintain a slot format 0 with SF=256, in which ACK/NACK field may take the first slot and a CQI field may take following two time slots. In addition, another channelization code with SF=256 may be added to facilitate a new feedback channel. The ACK/NACK feedbacks for the two downlink data flows may be individually encoded. Thus, the ACK/NACK feedback information in respond to the downlink from the first cell may be allocated to the first feedback channel with one channelization code, and the ACK/NACK feedback information for the second cell may be allocated to the second feedback channel with another channelization code. As by design, there may be no particular requirement on the timing relation of the two feedback channels, the ACK/NACK timing may be tied to its own downlink sub-frame. Because the CQI reports may always be allocated in the two time slots following ACK/NACK field, the same timing relation may apply.

Figure 17:
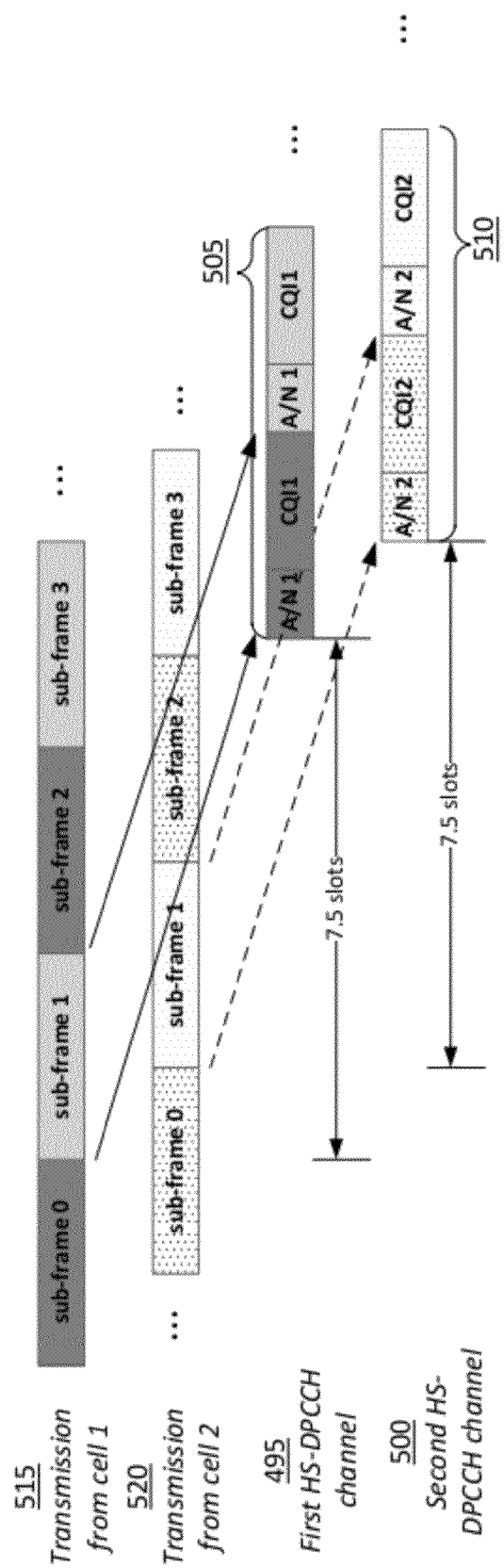
FIG. 17 shows an example embodiment for asynchronous feedback configuration using a frame structure with the dual channelization code.

FIG. 17 shows an example embodiment for asynchronous feedback configuration using a frame structure with the dual channelization code. For example, FIG. 17 shows dual channelization code HS-DPCCH with asynchronous HARQ-ACKs. It may be seen from the example that both ACK/NACK and CQI feedbacks may be allocated independently at 505 and 510 in two feedback channels, such as HS-DPCCH channel 495 and HS-DPCCH channel 500, thus allowing each of them to keep a time relation, such as 7.5 slots, to the associated downlink sub-frames, which are shown at 515 and 520.

Other than the capability of dealing with the misaligned frame structures, the additional benefit of this embodiment may be seen from its backward compatibility. When the MP-HSDPA mode is activated or deactivated, the additional HS-DPCCH channel may be simply turned off. There may not be a need to switch spreading factors or change other parameters.

Further, the ACK/NACK may be independently encoded. The HS-DPCCH receiver at one cell may not have to be provided with the knowledge whether the other HS-DPCCH channel is in use, which may be typical for intra-site configurations. Thus, the detection performance for ACK/NACK decoding may show advantage over the jointly encoded ACK/NACK schemes which may have to make decision over a much larger codeword space due to lack of transmission status information from other cell.

Figure 18:
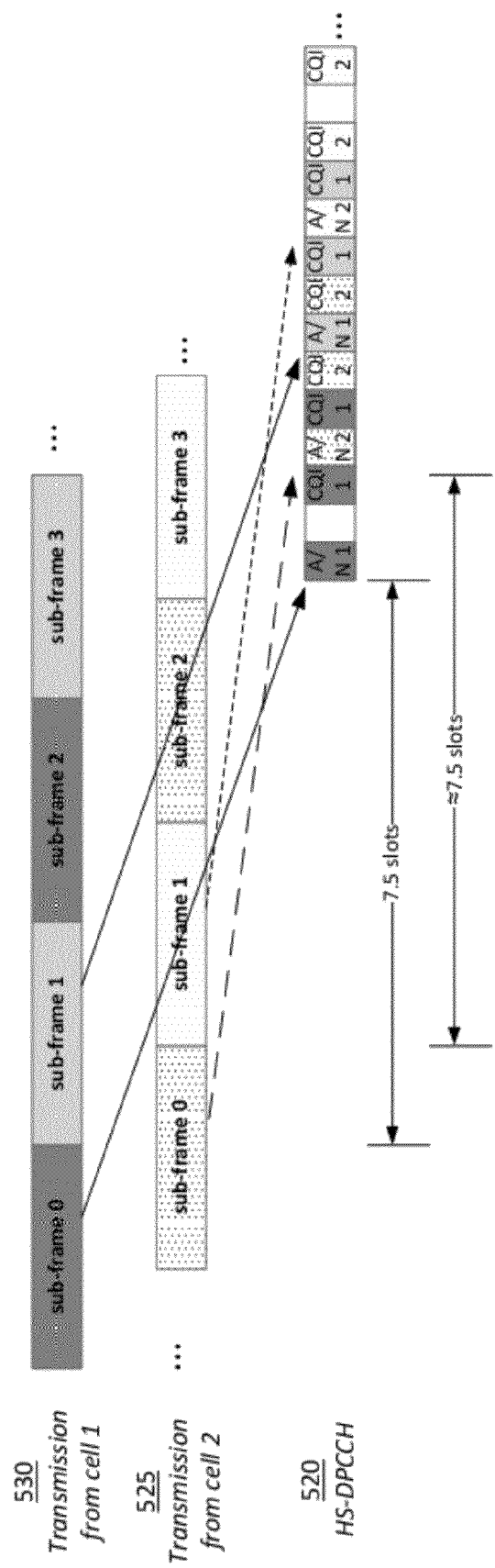
FIG. 18 depicts an example embodiment for dual fields HS-DPCCH design with asynchronous HARQ-ACKs.

FIG. 18 depicts an example embodiment for dual fields HS-DPCCH design with asynchronous HARQ-ACKs. For example, the HS-DPCCH physical channel, such as HS-DPCCH 520, may maintain the slot format 1 with SF=128, in which a HARQ-ACK1 field will take one half of a time slot and the other HARQ-ACK2 will take second half of a time slot. Note that HARQ-ACK1 and HARQ-ACK2 may not be required to be in the same time slot. The time slot to use may depend on the frame boundary of the associated downlink transmission. The CQI fields may also need to break into half slot format. For example, CQI1 will take first half slot and CQI will take the second half slot and each of CQI field consists of two half slots. As indicated by the arrows in FIG. 18, within the asynchronous HS-DPCCH, such as HS-DPCCH 520, the two uplink feedbacks, either CQI or ACK/NACK, may be tied to the timing of the downlinks shown at 530 and 535. It is noted that the timing relation to the downlink sub-frame for the second cell may be made approximately 7.5 slots because the timing offset between the two downlink sub-frames are generally not an integer relation of a time slot.

To avoid half slot transmission, repetition from the other half of the slot may be applied if there is no feedback is allocated to any of the half slots in a sub-frame.

Figure 19:
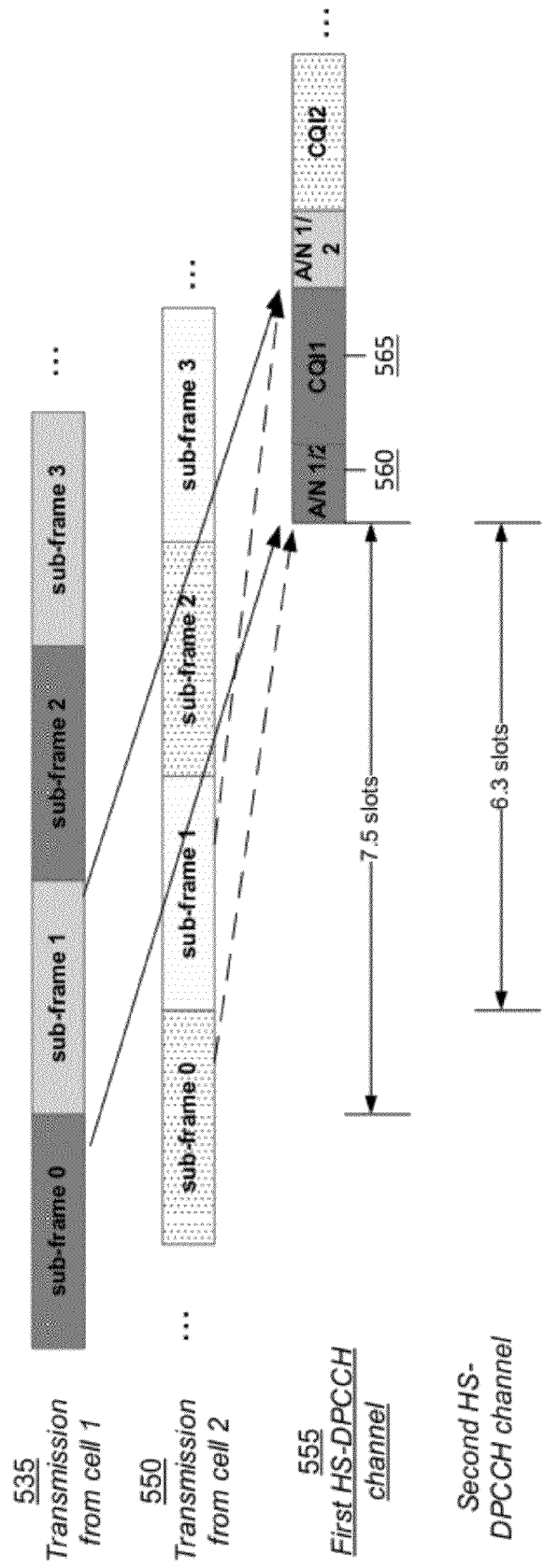
FIG. 19 depicts an example embodiment for jointly-encoded HARQ-ACK feedbacks.

FIG. 19 depicts an example embodiment for jointly-encoded HARQ-ACK feedbacks. With regard to intra-site HS-DPCCH design, for intra-site cells, it may be possible that the clock of the two cells will be synchronized while a time offset may still exist between the frame boundaries of the transmitted signals from the two cells. This time offset may keep constant once the system is configured.

As such, it may be possible to have the ACK/NACK messages for the two cells jointly encoded into one codeword using a HARQ-ACK codebook, such as codewords specified in 3GPP Release 9. For example, the codebook for dual carrier operation in MIMO mode may be used for configuration cases. This may be particularly applicable to the intra-site MF scenarios, where the frame boundary of the two downlink signals, such as 535 and 550, may be offset just by a constant timing because the two ACK/NACK message may be tied in time.

In an embodiment of an implementation, the HS-DPCCH physical channel, such as the first HS-DPCCH channel at 555, may maintain the slot format 0 with SF=256, in which the jointly encoded ACK/NACK information may take the first time slot at 560 and a CQI field may take the following two time slots, as shown at 565. The multiple CQI reports may be transmitted with a Time Division Multiplexing (TDM) approach as described previously in the present disclosure. For example, FIG. 19 shows an example of the jointly encoded HARQ-ACK feedbacks, from which it may be seen that the time duration between the reception of the sub-frame and the ACK/NACK in response to this sub-frame is 6.3 time slots, which varies as a function of timing offset between the two downlink frames, such as sub-frame 0 within 535 and sub-frame 0 within 550.

Due to this unfixed timing relation between the downlink sub-frame and the ACK/NACK feedback for the second cell, uncertainty when pairing the downlink sub-frame to the ACK/NACK message for the second cell may become an issue. According to an embodiment, a pairing rule may be defined here for this situation and may comprise at least one of the following steps:

1. Define an allowance parameter R which may take any real value between 0 and 3. Optionally, R may take any integer value between 0 and 3. The value of R may be predefined by the standard specifications or configured by the network via RRC signaling.
2. When a UE receives the downlink data from a second serving cell for a particular sub-frame, its arrival time, identified with $t_s$ with reference to the end of the sub-frame, may be compared to the sub-frame received from a first serving cell that arrives around the same time frame. The arrival time of the sub-frame received by the first cell may be denoted as $t_p$, the ACK/NACK pairing rule may be defined as:
   if $(3-R) < t_s - t_p \leq R$ the ACK/NACK messages for the two cells may be paired and jointly encoded into the same HS-DPCCH frame. Otherwise the ACK/NACK message of the secondary serving cell may be encoded into another HS-DPCCH frame that satisfies the pairing condition. Note that $t_s$ and $t_p$ are expressed in terms of time slots in the equation for simplicity of presentation.
3. Define $T_p$ as a delay parameter that could be either be predefined or configured by network via RRC signaling, the HS-DPCCH that carries the paired ACK/NACK messages may be transmitted $T_p$ slots after UE receives the sub-frame from the first cell as long as $(3-R-\Delta m2) < t_s - t_p \leq (R-\Delta m1)$ where $\Delta m1$ and $\Delta m2$ may be offset parameters introduced to avoid ambiguity in case the corresponding sub-frame of the second serving cell arrives close to the boundary of the pairing condition described in 2. As an example, $T_p$ may be set to 7.5 slots and $\Delta m1$ or $\Delta m2$ may be set to 0.5 slots. Note that the offset parameters may also be predefined or configured by the network. If $t_s$ falls into a boundary condition, i.e., $R - \Delta m1 < t_s - t_p \leq R$ the HS-DPCCH frame may be be transmitted with an additional delay by defined by $\Delta m1$, i.e., it may be transmitted $T_p+\Delta m1$ slots after UE receives the downlink sub-frame from the primary serving cell. Or if at another boundary condition, i.e., $$-(3-R)<t_s-t_p\leq(3-R-\Delta m2)$$

The HS-DPCCH may be transmitted at an earlier timing, i.e., $T_p-\Delta m2$ slots after UE receives the sub-frame from the primary serving cell 4. When a HS-DPCCH frame that carries a pair of ACK/NACK messages is received at Node B of the first serving cell at time $t_{HS\text{-}DPCCH}$, the network may associate a transmitted downlink sub-frame if its timing relation satisfies the range:

$$T_p-\Delta T_{p2}\leq t_{HS\text{-}DPCCH}\leq T_p+\Delta T_{p1}$$

where $\Delta T_{p1}$ and $\Delta T_{p2}$ may be tolerance parameters that may either be pre-defined or be configured by the network, which may be required to satisfy the following:

$$\Delta T_{p1}>\Delta m1 \text{ and } \Delta T_{p2}>\Delta m2$$

5. When a HS-DPCCH frame is received at Node B of the second serving cell, the network may associate it to a downlink sub-frame if their timing relation satisfies $$T_p-R\leq t_{HS\text{-}DPCCH}-t_s<T_p+(3-R)$$

Figure 20:
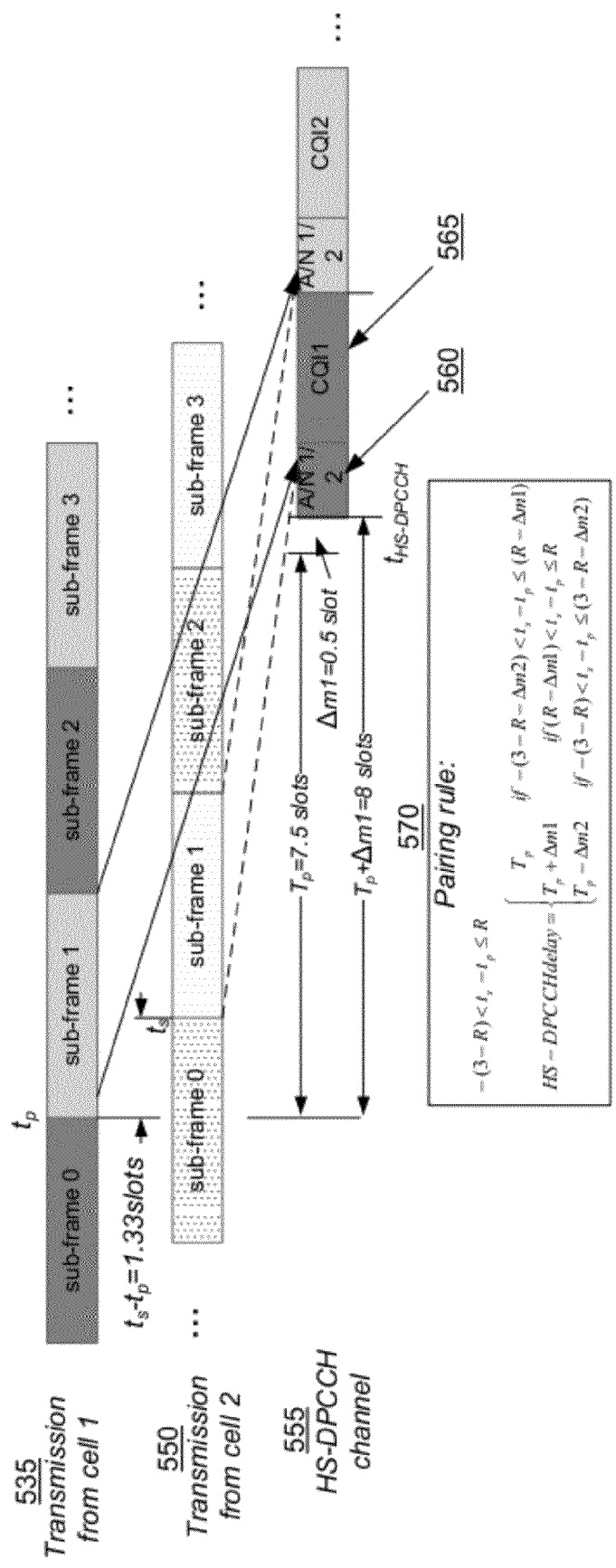
FIG. 20 depicts an example embodiment for applying a pairing rule in accordance with the present disclosure.

FIG. 20 depicts an example embodiment for applying a pairing rule in accordance with the present disclosure. The proposed pairing rule may be applied to the inter-site scenarios as described herein.

As shown in FIG. 20, pairing rule 570 may be defined as follows:

1. The ACK/NACK messages of the cell 1 and cell 2 may be paired and encoded into the same HS-DPCCH frame, such as frame 560, if the corresponding downlink data sub-frames received in the two cells satisfy the following timing relation $$-(3-R)<t_s-t_p\leq R$$

where the allowance parameter R is set to 1.5 times slot in the example embodiment.

2. The feedback frame that carries the pair of ACK/NACK messages in the HS-DPCCH 555 may be transmitted according the HS-DPCCH delay parameter calculated by $$HS\text{-}DPCCH \text{ delay} = \begin{cases} T_p & \text{if } -(3-R-\Delta m2)<t_s-t_p\leq(R-\Delta m1) \\ T_p+\Delta m1 & \text{if } (R-\Delta m1)<t_s-t_p\leq R \\ T_p-\Delta m2 & \text{if } -(3-R)<t_s-t_p\leq(3-R-\Delta m2) \end{cases}$$

where the parameters are chosen: $\Delta m1=0.5$ slots, $T_p=7.5$ slots, and $t_s-t_p=1.33$ slots. Because $t_s-t_p>R-\Delta m1=1.5-0.5=1$, an additional delay with an amount of $\Delta m1$ is added on top of $T_p=7.5$ slots according to the pairing rule.

The HS-DPCCH structures with dual channelization code of SF=256 or dual fields of SF=128 described above, may also be applicable to the intra-site scenarios. For example, the aligned feedbacks for the two cells may be possible, as the timing offset may be considered invariant. As a result, it may not be necessary to break the CQI field for the dual field structure. Thus, the CQI field may be may be maintained with one time slot.

Figure 21:
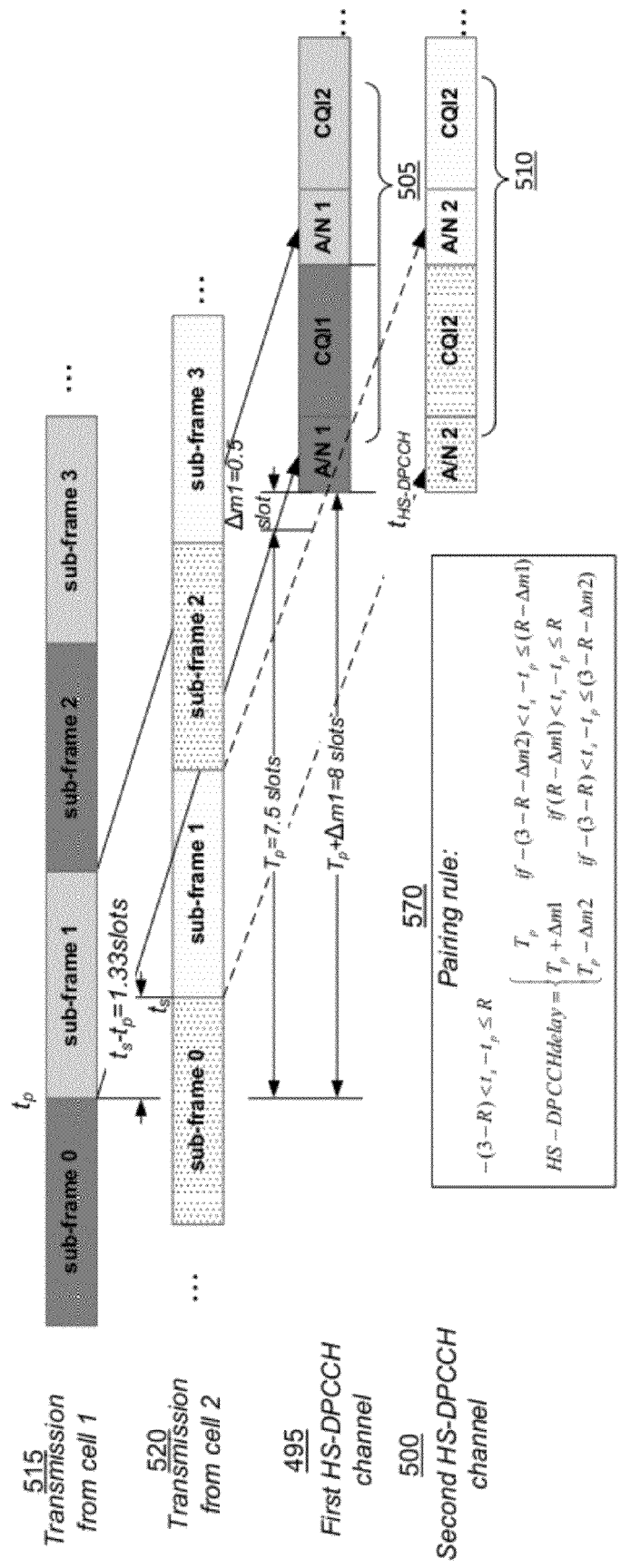
FIG. 21 depicts an example embodiment for a dual channelization code HS-DPCCH with aligned HARQ-ACKs.
Figure 22:
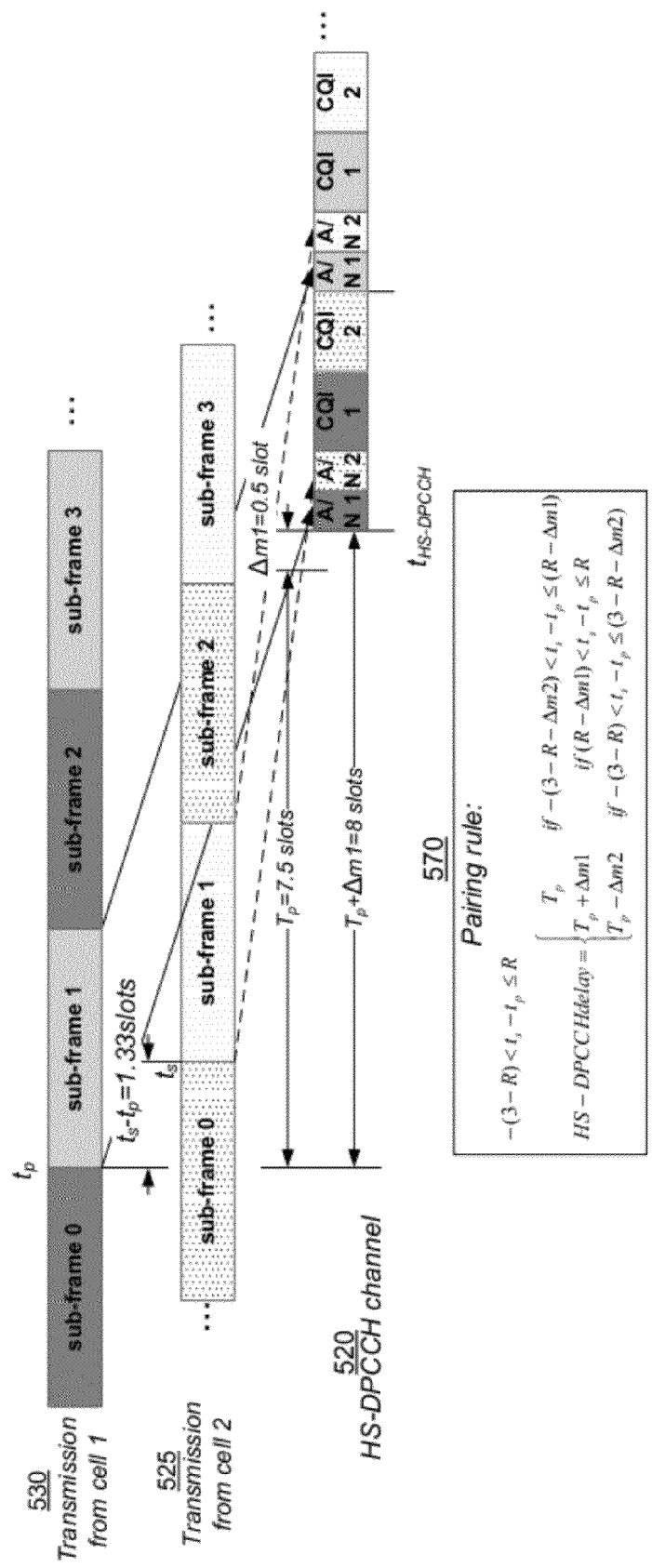
FIG. 22 depicts an example embodiment for a dual fields HS-DPCCH design with aligned HARQ-ACKs.

The pairing rule may also be applied to the embodiments described in FIG. 17 and FIG. 18 for HS-DPCCH configurations with the dual channelization code and dual fields, respectively. For example, FIG. 21 depicts an example embodiment for a dual channelization code HS-DPCCH with aligned HARQ-ACK. FIG. 22 depicts an example embodiment for a dual fields HS-DPCCH design with aligned HARQ-ACKs.

In the embodiment disclosed above, the terms "cell 1" and "cell 2" are used. However, the numbering of cell 1 and cell 2 may not distinguish whether the cell is a primary or secondary cell. For example, cell 1 may be the primary serving cell and cell 2 may be the secondary serving cell. Additionally, cell 2 may be the primary serving cell and cell 1 may be the secondary serving cell. Moreover, other naming may also be associated to the cell 1 and cell 2 without distinction.

Though described under the context of dual cell HSDPA operation, most of the proposed embodiments, concepts, systems, and methods may be applied to applications involving with more than two cells.

In one embodiment, HS-DPCCH power may be boosted to ensure the reliability of the uplink feedback. Because of operating in the same frequency, one HS-DPCCH may available. The feedback channel HS-DPCCH may have to carry the CQI and HARQ-ACK information to both of the cells involved in the multiple cell transmission. Because the radio link to these cells may vary in quality for uplink transmission due to the channel conditions, the issue of reliability in receiving the uplink feedback between the cells may need to be addressed where, for example, a direct link between the two NodeBs may not exist. Method and system embodiments may adjust the power offset settings separately for the feedback information sent to different cells. Specifically, the transmitter power of the HS-DPCCH that may carry the CQI/PCI may be a serving cell of weaker radio condition that may need to be boosted.

In one example embodiment, a power offset may be determined by monitoring the uplink power control status. For example, a UE may determine the HS-DPCCH power offsets by autonomously exploring the status of uplink power control loops pertaining to each of the cells in the active set.

In an embodiment, the UE may make a judgment about the uplink radio link conditions by monitoring the TPC commands received from downlink F-DPCH or DPCCH. A variable TPC_cmd is defined, which may be related to TPC commands received from one of the serving cells involved in the multipoint transmission may include:

If the TPC command received from the serving cell is 0 in ith slot, TPC_cmd(i) for that slot may be set to −1; and If the TPC command received from the serving cell is 1 in the ith slot, TPC_cmd(i) for that slot may be set to 1.

Over a specific number of previous time slots, denoted by N, an average may be performed on the defined variable:

$$TPC\_cmd\_average = \sum_{n=i-N+1}^{i} TPC\_cmd(n)$$

where N may be pre-defined or configured by the network at RRC connection.

TPC_cmd_average may further be compared to a pre-defined or preconfigured threshold, denoted by $T_u$. If TPC_cmd_average>$T_u$, the UE may decide that a power boost may be needed on the HS-DPCCH transmitted for the monitored serving cell. Another threshold, $T_d$, may also be introduced to handle cases where the transmit power for the HS-DPCCH for the serving cell may need to be adjusted down. If TPC_cmd_average<$T_d$, the UE may decide that a power reduction will be needed for the serving cell.

The decision on adjusting the transmit power of HS-DPCCH may be made from the TPC-based method described above, or conditional upon the power grant status received from the network for uplink transmission. If the UE does not receive sufficient power grant from the network scheduler, the HS-DPCCH power may not be allowed to boost up even though it may have been requested by the TPC-based method.

In one example embodiment, the power offset may be adjusted by moving up/down by one or more entries in a power offset table. Because the TPC commands may be received at UE on slot to slot basis, the power offset adjustment may be made dynamic, possibly on sub-frame basis. For example, an addition power offset value, denoted by $\Delta_{secondar\_boost}$ may be configured by higher layers and added on top of $\Delta_{CQI}$, $\Delta_{NACK}$ or $\Delta_{ACK}$, whenever the CQI or HARQ-ACK fields are intended to be reported to the monitored serving cell.

In an embodiment, this additional power offset, which may be identified as power boost, may be applied on entire HS-DPCCH addressed to both of the serving cells whenever the multipoint transmission mode may be enabled or configured. In this case the additional power offset may be determined by combining the decision from both serving cells using the TPC monitoring method described above. For example, if power offset is required for any one of the cells, a power boost may always be applied to the entire HS-DPCCH.

The above embodiment may be specified in an exemplary standard text as follows for algorithm 3 for processing TPC commands:

When a UE is in MP mode, the UE may process received TPC commands from one of the serving cells on an N-slot cycle, where N may be an integer configured by higher layer. A combined variable TPC_cmd_average may be calculated based on the received TPC command averaged over the N-slot cycle:

$$TPC\_cmd\_average = \sum_{i=1}^{N} TPC\_cmd(i)$$

where the value of TPC_cmd at a slot labeled with i may be derived as follows:
  if the TPC command received from the secondary serving cell is 0, TPC_cmd(i) for that may be −1; and
  if the TPC command received from the secondary serving cell is 1, TPC_cmd(i) for that may be 1.
If TPC_cmd_average>Tu, where Tu is may be an integer threshold configured by higher layer, a transmit power boost, $\Delta_{secondar\_boost}$, with its value being configured by higher layers may be added to the power offset settings of the corresponding HS-DPCCH fields if they are related to the monitored serving cell.

In another embodiment, the power control algorithm may be modified so that a power boost may be placed on the entire uplink to allow better reception in the secondary serving cell. For example, the concept may be realized by applying more weight on the TPC commands received from the primary and secondary cells when UE derives the combined TPC_cmd from TPC commands individually received from radio links in different radio link sets.

Examples of realization of the weighted TPC_cmd may be specified as follows for processing TPC commands: For each TPC command combining period, the UE may conduct a soft symbol decision $W_i$ on each of the power control commands $TPC_i$, where i=1, 2, . . . , N, where N is greater than 1 and is the number of TPC commands from radio links of different radio link sets, that may be the result of a first phase of combination.

The UE may derive a combined TPC command, TPC_cmd, as a function γ of all the N soft symbol decisions $W_i$:
  TPC_cmd=γ ($\alpha W_1$, $\alpha W_2$, . . . $W_N$), where TPC_cmd may take the values 1 or −1. where α>1 is the scaling factor applied to the soft symbol decisions for the primary and secondary serving cells and is configured by higher layers.

The function γ may fulfill the following criteria:
  if the N $TPC_i$ commands are random and uncorrelated, with equal probability of being transmitted as "0" or "1", the probability that the output of γ is equal to 1 may be greater than or equal to $1/(2^N)$, and the probability that the output of γ is equal to −1 may all be greater than or equal to 0.5. Further, the output of γ may equal 1 if the TPC commands from all the radio link sets, that are not ignored according to section 5.1.2.2.1 or 5.1.2.3 in 3GPP TS 25.214 (entitled "Physical layer procedures (FDD)") are reliably "1", and the output of γ may equal −1 if a TPC command from any of the radio link sets, that are not ignored is reliably "0".

In an example embodiment of realization of the weighted TPC_cmd, TPC processing algorithm, the value of TPC_cmd may be zero for the first 4 TPC command combining periods. After 5 TPC command combining periods have elapsed, the UE may determine the value of TPC_cmd for the fifth TPC command combining period in the following way:

The UE may determine one temporary TPC command, $TPC\_temp_i$, for each of the N sets of 5 TPC commands as follows:
  for primary and secondary serving cells involved in the MP transmission:
    If all 5 hard decisions within a set are "1", $TPC\_temp_i$=α.
    If all 5 hard decisions within a set are "0", $TPC\_temp_i$=−α.
    Otherwise, $TPC\_temp_i$=0.
  where α≥1 is configured by the higher layers.
  For other cells in the active set:
    If all 5 hard decisions within a set are "1", $TPC\_temp_i$=1.
    If all 5 hard decisions within a set are "0", $TPC\_temp_i$=−1.
    Otherwise, $TPC\_temp_i$=0.

Additionally, the UE may derive a combined TPC command for the fifth TPC command combining period, TPC_cmd, as a function γ of all the N temporary power control commands $TPC\_temp_i$: TPC_cmd(5th TPC command combining period)=γ ($TPC\_temp_1$, $TPC\_temp_2$, . . . , $TPC\_temp_N$), where TPC_cmd(5th TPC command combining period) may take the values 1, 0 or −1, and γ is given by the following definition:
  TPC_cmd is set to −1 if any of $TPC\_temp_1$ to $TPC\_temp_N$ are equal to −
  Otherwise, TPC_cmd is set to 1 if $$\frac{1}{N}\sum_{i=1}^{N} TPC\_temp_i > 0.5.$$

Otherwise, TPC_cmd is set to 0.

In one example embodiment, a power offset may be set by monitoring downlink channel status. For example, CQI values calculated at UE for the downlinks of the two cells may be compared. If the CQI for the secondary cell is worse than that of the primary cell, the higher power offset may be applied to the CQI and HARQ-field that carries the feedback information to the secondary cell. If the CQI is better, lower offset may be applied instead.

In another embodiment, the UE may determine HS-DPCCH power offsets by monitoring DL radio link conditions for different cells, such as path loss, or DL CPICH channel quality. For example, if the channel quality of the secondary is better than the primary cell, the UE may apply lower transmission power for the HS-DPCCH feedback channel for that cell. Otherwise, the UE may use higher transmission power. An additional offset may be applied on the top of adjusted power offset to compensate the difference of the downlink and uplink propagations.

In an example embodiment, a power offset rule may be based on a HS-DPCCH frame structure. Depending on what HS-DPCCH frame structure may be used, rules for HS-DPCCH power offset may be pre-defined or specified based on the SF-DC mode (which is defined as the indication of enable/disable SF-DC operation by 1/0 respectively) and MIMO configuration as follows:

If HS-DPCCH physical channel maintains the slot format 0 with SF=256, in which a CQI field may take two time slots and multiple CQI reports may be transmitted with a TDM fashion and carried in different sub-frames, the power offset for CQI filed may be given in Table 7, shown below.

If HS-DPCCH physical channel maintains the slot format 1 with SF=128, in which a CQI field may take one time slot and dual CQI fields may be allocated in a sub-frame, the power offset for CQI field may be given in Table 8, which adds 1 to power offset for scheme 1 in Table 7 to compensate the loss of processing gain due to SF128. It may be desired to add 2 to power offset for scheme 1 to compensate the loss of processing gain due to SF128.

If HS-DPCCH physical channel maintains the slot format 0 with SF=256, in which a CQI field may take two time slots, and another channelization code with SF=256 may be used to facilitate a new feedback channel (i.e., dual-channelization HS-DPCCH frame structure), the power offset for CQI filed may be given in Table 7.

TABLE 7

CQI Power Offset Scheme 1

| | | $A_{hs}$ equals the quantized amplitude ratio translated from | | |
|---|---|---|---|---|
| | | | | MIMO is configured in a cell |
| | | MIMO is not | | |
| SF-DC mode | MIMO configuration | configured in a cell | CQI of Type A | CQI of Type B |
| 0 | | $\Delta_{CQI}$ | $\Delta_{CQI}+1$ | $\Delta_{CQI}$ |
| 1 | MIMO is not configured in any cell | $\Delta_{CQI}+1$ | N/A | N/A |
| 1 | Otherwise | $\Delta_{CQI}$ | $\Delta_{CQI}+1$ | $\Delta_{CQI}$ |

TABLE 8

CQI Power Offset Scheme 2

| | | $A_{hs}$ equals the quantized amplitude ratio translated from | | |
|---|---|---|---|---|
| | | | | MIMO is configured in a cell |
| | | MIMO is not | | |
| SF-DC mode | MIMO configuration | configured in a cell | CQI of Type A | CQI of Type B |
| 0 | | $\Delta_{CQI}$ | $\Delta_{CQI}+1$ | $\Delta_{CQI}$ |
| 1 | MIMO is not configured in any cell | $\Delta_{CQI}+1$ | N/A | N/A |
| 1 | Otherwise | $\Delta_{CQI}+1$ | $\Delta_{CQI}+2$ | $\Delta_{CQI}+1$ |

Similarly, depending on what HS-DPCCH frame structure may be used, the above concept may be applied to the power offset for the HARQ ACK field:

When HS-DPCCH frame structure with dual channelization codes or jointly encoded HARQ ACK with SF=256, the existing power offset for R9 may be reused.

When HS-DPCCH frame structure with dual fields with SF=128, adding 1 (or 2) to the power offset for the existing rule used in R9 may occur to compensate the loss of processing gain due to SF128.

The above described rules may be applied to 2 HS-DPCCH channels corresponding to 2 cells in SF-DC mode when the power offset ($\Delta_{ACK,i}$, $\Delta_{NACK,i}$, $\Delta_{CQI,i}$) may be the same for 2 cells, i.e., i=1 and 2. However, as radio link condition between 2 cells and the UE may vary, it may be desired to take this into account when determine the power offset of two HS-DPCCH channels corresponding to 2 different cells. Many of the methods disclosed herein may apply different power offsets to two feedback channels. For example, the methods may be applied to make sure the reception of HS-DPCCH is reliable for both cells while considering other factors such as system performance related to noise-level rise and UE power limitation. Different power offsets may be set for different radio link from different cells to apply higher transmit power on the HS-DPCCH channel corresponding to channel condition that are worse than the other cells.

In one example embodiment, a HS-DPCCH power offset may be network controlled. For example, a network may control HS-DPCCH power offset by one or any combination of the following techniques.

In an embodiment of a network controlled method, two sets of HS-DPCCH power offset, ($\Delta_{ACK1}$, $\Delta_{NACK1}$, $\Delta_{CQI1}$) and ($\Delta_{ACK2}$, $\Delta_{NACK2}$, $\Delta_{CQI2}$), may be independently configured for two cells via RRC message at initial RRC connection. The UE may apply these two sets of values to each of the feedback channels respectively whenever the HS-DPCCH is transmitted.

In another embodiment of a network method, the network may configure one set of the power offset values, ($\Delta_{ACK}$, $\Delta_{NACK}$, $\Delta_{CQI}$) at initial RRC connection. When UE may apply this set of offset value. Additionally, the UE may add different offsets to different the feedback channels for 2 cells, $\Delta_i$. where i=1, 2 is the index of cells operating in SF-DC mode. This additional power offset may be pre-defined in the standard depending on the carrier/MIMO configurations and/or the current knowledge of two radio links.

In another embodiment of a network method, a dynamic HS-SCCH may signal two sets of power offset or the index of power offset for each of feedback channels respectively based on the knowledge of different channel condition.

In another embodiment of a network method, if the network determines that it may not be receiving the information, the secondary HS-DSCH cell may tell the UE to power up the power offset by a step in the HS-SCCH, or an absolute value. The UE may use that for a certain period of time, then reset to using the same as the primary HS-DSCH cell or a signaled one, or it keeps that until told otherwise.

In order to provide more reliable detection of the ACK/NACK feedback when MIMO mode is configured, in one embodiment, additional power offset on HARQ-ACK reporting may be used for Inter-site multipoint transmission. In the dual carrier HSDPA transmission, the HARQ-ACK codebook table, shown below in Table 4, may be used to report the ACK/NACK status of the downlink transmission. As shown in Table 9, the table may be divided into different subsets according to the number of data streams transmitted by each individual carrier. The number of streams being transmitted over the carriers may dynamically vary on per TTI basis depending upon the scheduling decision made at the network scheduler. Therefore, the codebook used to acknowledge the transmission may also dynamically switched accordingly among the subsets. Making decisions within a codebook subset of smaller size may allow improved performance for ACK/NACK detection, or lower transmitter power required to transmit HARQ-ACK fields in HS-DPCCH. Note, switching subsets of the codebook may be possible when the ACK/NACK receiver is informed about the scheduling decision of both cells as this may allow for proper decisions to be made to ensure the correct use of the codebook in that TTI.

TABLE 4

HARQ-ACK codebook tale for DC-HSDPA when UE is configure in MIMO mode

| | HARQ-ACK message | w0 | w1 | w2 | w3 | w4 | w5 | w6 | w7 | w8 | w9 |
|---|---|---|---|---|---|---|---|---|---|---|---|
| Both cells have dual single data | A/D | 1 | 1 | 1 | 1 | 1 | 1 | 1 | 1 | 1 | 1 |
| | N/D | 0 | 0 | 0 | 0 | 0 | 0 | 0 | 0 | 0 | 0 |
| | D/A | 0 | 0 | 0 | 0 | 0 | 0 | 1 | 1 | 1 | 1 |
| | D/N | 1 | 1 | 1 | 1 | 1 | 1 | 0 | 0 | 0 | 0 |
| | A/A | 1 | 1 | 0 | 0 | 0 | 0 | 0 | 0 | 1 | 1 |
| | A/N | 0 | 0 | 1 | 1 | 1 | 0 | 1 | 0 | 0 | 1 |
| | N/A | 1 | 0 | 0 | 1 | 0 | 1 | 1 | 1 | 0 | 0 |
| | N/N | 0 | 1 | 1 | 0 | 0 | 1 | 0 | 1 | 0 | 1 |
| Only primary cell has dual stream data | AA/D | 1 | 0 | 1 | 0 | 1 | 1 | 1 | 1 | 0 | 1 |
| | AN/D | 1 | 1 | 0 | 1 | 0 | 1 | 0 | 1 | 1 | 1 |
| | NA/D | 0 | 1 | 1 | 1 | 1 | 0 | 1 | 0 | 1 | 1 |
| | NN/D | 1 | 0 | 0 | 1 | 0 | 0 | 1 | 0 | 0 | 0 |
| | AA/A | 0 | 1 | 1 | 0 | 0 | 0 | 0 | 1 | 0 | 0 |
| | AA/N | 1 | 1 | 1 | 0 | 0 | 1 | 1 | 0 | 1 | 0 |
| | AN/A | 1 | 0 | 1 | 1 | 1 | 0 | 0 | 1 | 1 | 0 |
| | AN/N | 0 | 0 | 1 | 1 | 0 | 1 | 0 | 0 | 0 | 1 |
| | NA/A | 0 | 1 | 0 | 1 | 1 | 1 | 1 | 1 | 0 | 0 |
| | NA/N | 1 | 1 | 0 | 0 | 1 | 0 | 0 | 0 | 0 | 1 |
| | NN/A | 0 | 0 | 0 | 0 | 1 | 1 | 0 | 0 | 1 | 0 |
| | NN/N | 0 | 1 | 0 | 0 | 0 | 1 | 1 | 0 | 0 | 1 |
| Only secondary cell has dual stream data | D/AA | 1 | 0 | 0 | 0 | 1 | 0 | 0 | 0 | 1 | 1 |
| | D/AN | 0 | 1 | 0 | 0 | 0 | 0 | 1 | 1 | 0 | 1 |
| | D/NA | 0 | 0 | 0 | 1 | 1 | 1 | 1 | 1 | 1 | 0 |
| | D/NN | 1 | 1 | 1 | 1 | 1 | 0 | 0 | 1 | 0 | 0 |
| | A/AA | 1 | 0 | 1 | 0 | 0 | 1 | 1 | 0 | 0 | 0 |
| | A/AN | 1 | 0 | 0 | 1 | 0 | 1 | 0 | 1 | 0 | 1 |
| | A/NA | 0 | 0 | 1 | 1 | 1 | 0 | 1 | 0 | 0 | 1 |
| | A/NN | 0 | 1 | 1 | 1 | 0 | 1 | 0 | 0 | 1 | 1 |
| | N/AA | 1 | 1 | 0 | 1 | 0 | 0 | 1 | 0 | 1 | 0 |
| | N/AN | 1 | 1 | 0 | 0 | 0 | 1 | 0 | 1 | 1 | 0 |
| | N/NA | 0 | 1 | 0 | 0 | 1 | 0 | 1 | 0 | 1 | 0 |
| | N/NN | 0 | 0 | 1 | 0 | 1 | 1 | 0 | 1 | 0 | 1 |
| Both cells have dual | AA/AA | 0 | 1 | 0 | 1 | 1 | 0 | 1 | 1 | 1 | 1 |
| | AA/AN | 1 | 0 | 1 | 1 | 0 | 0 | 1 | 1 | 1 | 1 |

TABLE 4-continued

HARQ-ACK codebook tale for DC-HSDPA when UE is configure in MIMO mode

| | HARQ-ACK message | w0 | w1 | w2 | w3 | w4 | w5 | w6 | w7 | w8 | w9 |
|---|---|---|---|---|---|---|---|---|---|---|---|
| stream data | AA/NA | 1 | 1 | 0 | 1 | 1 | 1 | 1 | 0 | 0 | 1 |
| | AA/NN | 0 | 1 | 1 | 1 | 0 | 1 | 1 | 1 | 0 | 0 |
| | AN/AA | 0 | 0 | 0 | 1 | 1 | 0 | 0 | 1 | 0 | 1 |
| | AN/AN | 1 | 1 | 1 | 0 | 0 | 0 | 0 | 0 | 0 | 1 |
| | AN/NA | 1 | 0 | 0 | 0 | 0 | 1 | 0 | 1 | 0 | 0 |
| | AN/NN | 0 | 0 | 1 | 1 | 0 | 1 | 0 | 0 | 0 | 1 |
| | NA/AA | 1 | 1 | 0 | 0 | 1 | 0 | 1 | 1 | 1 | 0 |
| | NA/AN | 0 | 0 | 1 | 0 | 1 | 0 | 1 | 0 | 0 | 0 |
| | NA/NA | 1 | 0 | 1 | 1 | 1 | 1 | 0 | 0 | 1 | 0 |
| | NA/NN | 1 | 1 | 1 | 0 | 0 | 1 | 1 | 0 | 1 | 0 |
| | NN/AA | 0 | 1 | 0 | 1 | 0 | 0 | 0 | 0 | 1 | 0 |
| | NN/AN | 0 | 0 | 1 | 0 | 0 | 0 | 1 | 1 | 0 | 0 |
| | NN/NA | 0 | 1 | 0 | 0 | 1 | 1 | 0 | 0 | 0 | 1 |
| | NN/NN | 0 | 0 | 0 | 0 | 0 | 1 | 1 | 0 | 1 | 1 |
| PRE/POST | PRE | 0 | 0 | 1 | 0 | 1 | 0 | 0 | 1 | 0 | 0 |
| | POST | 0 | 1 | 0 | 0 | 1 | 0 | 0 | 1 | 0 | 0 |

For the multipoint transmission from two cells that reside at different sites, the HS-DPCCH may be demodulated and decoded at different cell while the downlink data transmission scheduling may be done individually at each cell. If the two cell are not communicating each other with regard to their scheduling decisions, the ACK/NACK detection performed at one cell may not know how many streams are being transmitting at other cell. Thus the ACK/NACK states may have to be determined by hypothesis test running through entire set of codewords in the codebook table. As a result, the ACK/NACK detection reliability may not be optimal.

As a solution to the above issue, in one example embodiment, addition power boost may be introduced to the HARQ-ACK field when the UE is transmitting HS-DPCCH. The power boost may be subset specific; different power offset parameters may be applied to different subsets in the codebook. For example, a number of power offset parameters are configured by network via RRC according to the following table:

| Codebook subset | Power offset |
|---|---|
| Both cells have dual single data | $\Delta_{11}$ |
| Only primary cell has dual stream data | $\Delta_{12}$ |
| Only secondary cell has dual stream data | $\Delta_{21}$ |
| Both cells have dual stream data | $\Delta_{22}$ |

These power offset parameters may be combined into the existing power offset setting, for example, by adjusting a few steps up or down in the power table when transmitting the HARQ-ACK.

Alternatively, a constant power boost may be applied to the entire table, which may require that only one power offset parameter from the network be configured.

In one example embodiment, HS-DPCCH may be designed for multipoint transmission of 4 cells in dual frequency (DF-4C). For the dual frequency operation involving 4 cells in the multipoint transmission, in one example embodiment, cells may be grouped by pairs with each being located in the same site and served by the same Node B. Two cells from different pairs that may be geographically separated in the two sites may operate in the one frequency, while the other two cells may operate in another frequency. All four cells may schedule data transmission to a UE simultaneously.

Thus, the data received from all cells may be aggregated to improve the cell-edge throughput.

Assuming HARQ-ACK and CQI reporting are carried in a single HS-DPCCH, as is done in the conventional four carrier operation as specified in 3GPP Release 10, Node Bs residing at different sites may individually demodulate the signal and decode necessary ACK/NACK and CQI feedback messages related to downlink transmissions from its own site.

The HS-DPCCH frame structure currently defined for the 4C-HSDPA may be reused for DF-4C multipoint transmission as depicted in FIG. 23. For example, the spreading factor may be set to 128 in order to have total of 60 bit capacity in a HS-DPCCH sub-frame. The ACK/NACK and CQI fields may be arranged according to FIG. 24, where both ACK/NACK and CQI information are split into two messages in a sub-frame. For example, A/N1 at 515 and CQI1 at 525 may be a first message, and A/N2 at 520 and CQI2 at 530 may be a second message.

Embodiments of methods and systems for HS-DPCCH design with respect to DF-4C with above configuration are further described below.

FIG. 24 depicts an example embodiment of HARQ-ACK mapping for DF-4C. The HARQ-ACK information for the cells from the same site may be purposely combined to a composite message and jointly encoded into one codeword, which may then placed in one of the half slots designated for ACK/NACK field as shown in FIG. 24 at 535 and 540. The two cells identified as C0 and C1 may be served from by one Node B, while the cells labeled by C2 and C3 may be served by another Node B. At any of the Node Bs, the HS-DPCCH decoder may only need to demodulate the signal from the corresponding half slot and provide the HARQ-ACK information to the scheduler serving the related cells.

In the above embodiment, the other half of HARQ-ACK signal may not need to be processed. Additionally, a smaller codebook may be used since the scheduling decisions for the related pair of cells may be known to the HS-DPCCH decoding residing at the same Node B.

Figure 25:
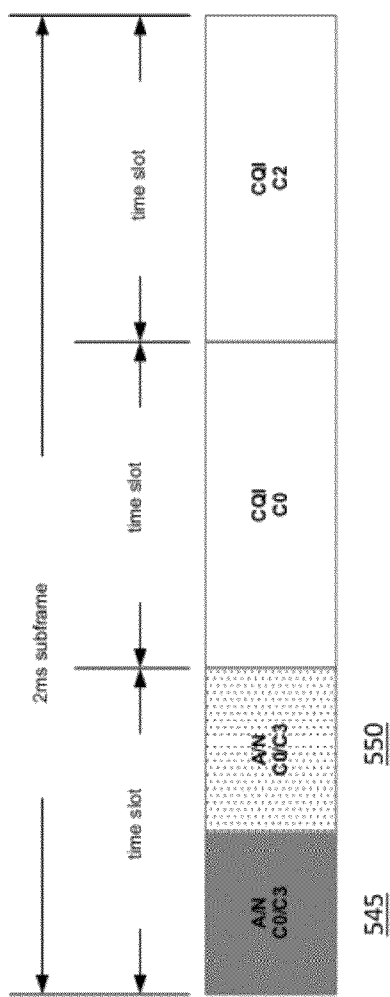
FIG. 25 depicts an example embodiment of HARQ-ACK mapping for DF-4C upon deactivation.

FIG. 25 depicts an example embodiment of HARQ-ACK mapping for DF-4C upon deactivation. Though configured to operate with four cells, any of the secondary serving cells may be dynamically deactivated/activated by a L1 order. If reusing the existing HS-DPCCH design for DC-HSDPA, upon deactivating two cells, such as from different Node Bs, the ACK/NACK messages may be remapped and repeated with intention to enhance the HS-DPCCH reception reliability. An example is shown in FIG. 25 at 545 and 550, where C1 and C2 are deactivated.

In one example embodiment, remapping and repeating of the ACK/NACK messages may not be allowed. This may be done to prevent performance degradation problem due to decoding over larger codebook may show u. Additionally, this may be done to prevent the activation status of a Node B from not being known to the other site so that the HS-DPCCH decoder may get the proper set of ACK/NACK information.

Figure 26:
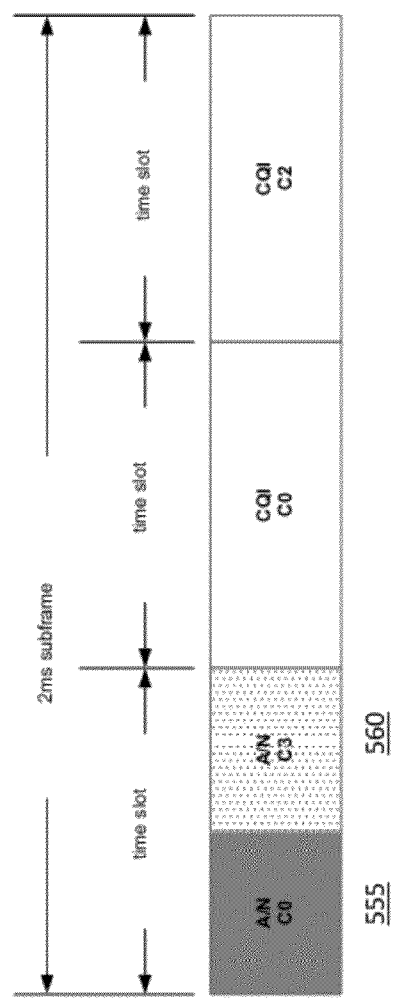
FIG. 26 depicts another embodiment of HARQ-ACK mapping for DF-4C upon deactivation.

FIG. 26 depicts another embodiment of HARQ-ACK mapping for DF-4C upon deactivation. As shown in FIG. 26 at 555 and 560, a single ACK/NACK message from one cell is encode according to the encoding method designed for single carrier.

Figure 27:
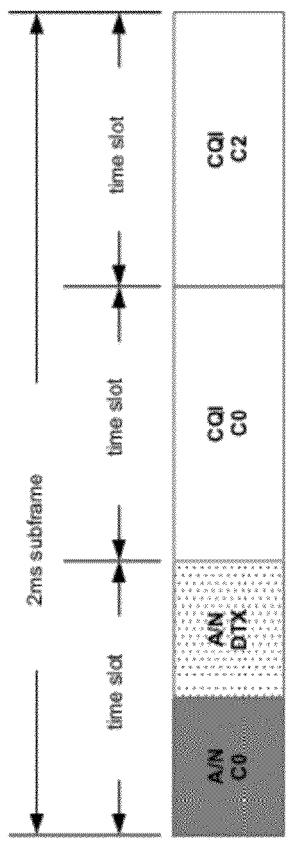
FIG. 27 depicts another embodiment of HARQ-ACK mapping for DF-4C upon deactivation.

FIG. 27 depicts another embodiment of HARQ-ACK mapping for DF-4C upon deactivation. For example, FIG. 27 depicts a HARQ-ACK mapping relation when deactivating all the three secondary cells. FIG. 27 follows a similar principle as described above with respect to FIG. 26. A noticeable difference here is that at 570, a DTX codeword is inserted in the second HARQ-ACK field to avoid half slot transmission.

Figure 28:
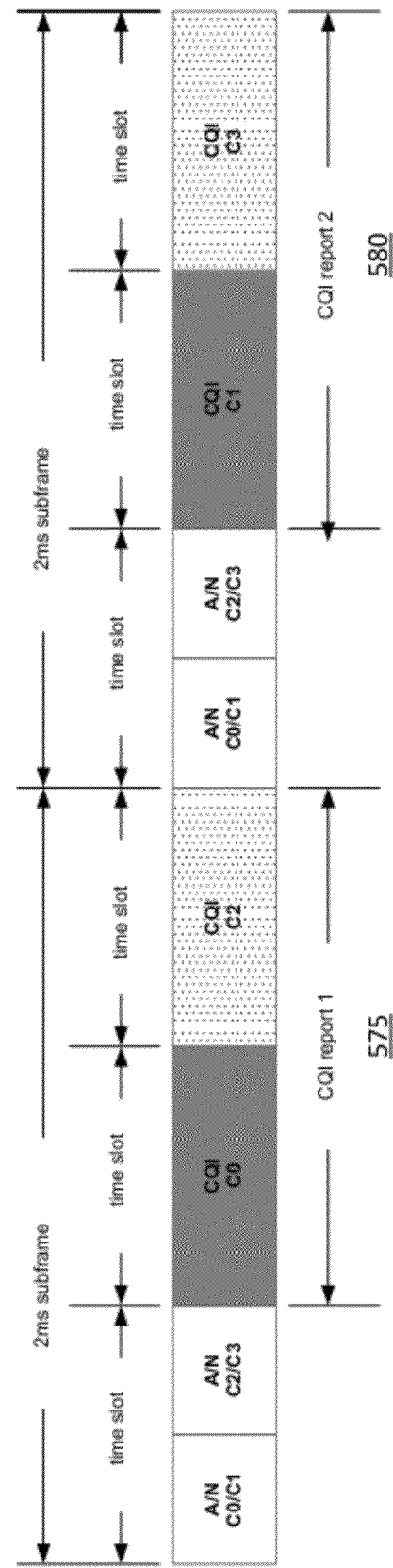
FIG. 28 depicts an embodiment of CQI mapping for DF-4C.

For DF-4C, CQI messages from each of the cells may be individually encoded and mapped to two CQI reports carried by two sub-frames. This mapping relation is shown in FIG. 28 at 575 and 580.

In the above CQI mapping design, a common timing reference known to the UE and both Node Bs may be used to identify the CQI report (whether is report1 or report 2) at HS-DPCCH decoder. If the Node B at different sites are not synchronized due to use of different clock sources, and if the timing offset information is not communicated to each of the HS-DPCCH decoders residing at each Node B, it may be difficult to identify the CQI reports, resulting in wrongly delivered CQI messages.

Figure 29:
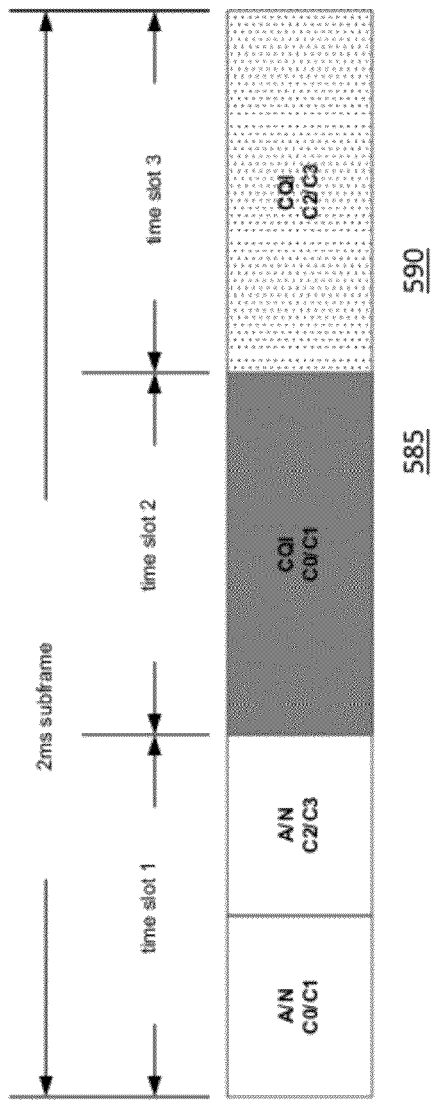
FIG. 29 depicts another embodiment of CQI mapping for DF-4C.

FIG. 29 depicts another embodiment of CQI mapping for DF-4C. In one example embodiment, the CQI messages from the cells in the same Node B may be combined and jointly encode into one CQI codeword. This codeword may then be mapped to a particular time slot. This is illustrated in FIG. 29 at 585 and 590. The CQI information for the cell in the same Node B, identified as C0 and C1, may always be mapped in the time slot 2 in a sub-frame at 585, and the rest of cells from the other Node B may always mapped to the time slot 3 at 590. For the same reason, when cells are deactivated, repeating or remapping of the CQI fields may not be allowed. Instead, the left CQI message may be encoded with the coding method for single carrier.

Figure 30:
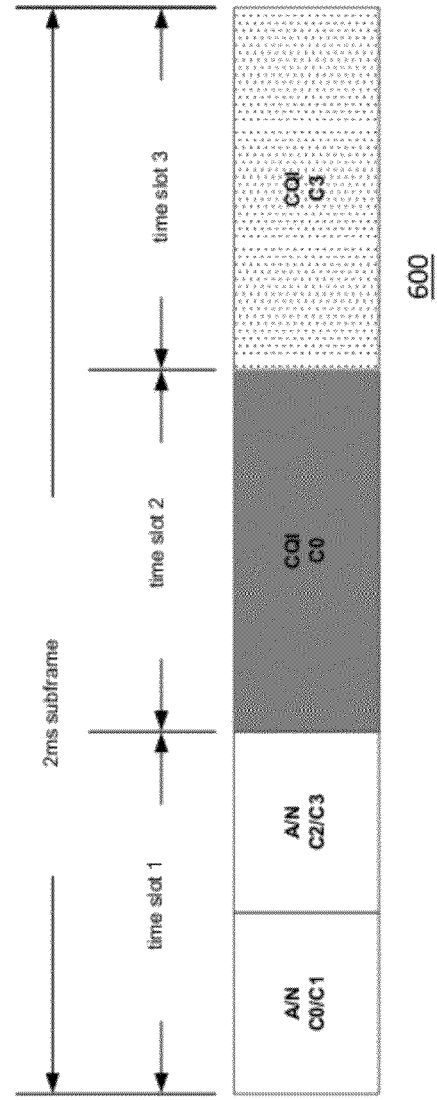
FIG. 30 depicts an example embodiment of CQI mapping when C1 and C2 are deactivated.

FIG. 30 depicts an example embodiment of CQI mapping when C1 and C2 are deactivated as illustrated at 600 of FIG. 30.

As another example embodiment, if all three secondary serving cells are deactivated, time slot 3 is simply DTXed, i.e., no signal transmission over this time slot.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A method for improving the reliability of uplink feedback in multiple point wireless transmission system by adjusting a transmission power for the uplink feedback, the method comprising:
receiving, via a wireless transmit/receive unit, transmit power control (TPC) commands from a downlink;
processing the received TPC commands on an N-slot cycle;
calculating a TPC_cmd_average based on the received TPC commands;
determining a transmit power boost when the TPC_cmd_average is greater than a threshold; and adjusting the transmission power for the uplink feedback based on the transmit power boost.

2. The method of claim 1, wherein the downlink is from a serving cell involved in the multipoint transmission.

3. The method of claim 2, wherein calculating the TPC_cmd_average comprises averaging the received TPC commands over the N-slot cycle according to the following equation:

$$TPC\_cmd\_average = \sum_{i=1}^{N} TPC\_cmd(i)$$

where the value of TPC_cmd at a slot labeled with i is derived as follows:
TPC_cmd_secondary(i) is −1 when the TPC command received from the serving cell is 0; and
TPC_cmd_secondary(i) is 1 when the TPC command received from the serving cell is 1.

4. The method of claim 2, wherein calculating the TPC_cmd_average comprises averaging the received TPC commands over the N-slot cycle.

5. The method of claim 1, wherein calculating the TPC_cmd_average comprises averaging the received TPC commands over the N-slot cycle.

6. The method of claim 1, wherein adjusting the transmission power for the uplink feedback based on the transmit power boost comprises adding the transmit power boost to a transmit power of a high-speed transmit dedicated physical control channel (HS-DPCCH) field targeted to a monitored cell.

7. The method of claim 1, wherein adjusting the transmission power for the uplink feedback based on the transmit power boost comprising adding the transmit power boost to a transmit power of an entire high-speed transmit dedicated physical control channel (HS-DPCCH) field.

* * * * *